United States Patent
Adlem et al.

(10) Patent No.: US 10,626,330 B2
(45) Date of Patent: Apr. 21, 2020

(54) METHOD FOR MANUFACTURING A LIQUID CRYSTAL DISPLAY DEVICE AND LIQUID CRYSTAL MIXTURE

(71) Applicant: MERCK PATENT GMBH, Darmstadt (DE)

(72) Inventors: Kevin Adlem, Bournemouth (GB); Alex Davis, Chandlers Ford (GB); Rachel Tuffin, Chandlers Ford (GB); Mark Goebel, Winchester (GB); Graziano Archetti, Darmstadt (DE); Rocco Fortte, Frankfurt am Main (DE); Karl Skjonnemand, Taipei (TW); Ian Charles Sage, Malvern (GB)

(73) Assignee: MERCK PATENT GMBH, Darmstadt (DE)

( * ) Notice: Subject to any disclaimer, the term of this patent is extended or adjusted under 35 U.S.C. 154(b) by 0 days.

(21) Appl. No.: 16/063,544

(22) PCT Filed: Nov. 18, 2016

(86) PCT No.: PCT/EP2016/001940
§ 371 (c)(1),
(2) Date: Jun. 18, 2018

(87) PCT Pub. No.: WO2017/102051
PCT Pub. Date: Jun. 22, 2017

(65) Prior Publication Data
US 2019/0002763 A1    Jan. 3, 2019

(30) Foreign Application Priority Data

Dec. 17, 2015 (EP) .................... 15200925

(51) Int. Cl.
| | | |
|---|---|---|
| *G02F 1/1333* | (2006.01) | |
| *C09K 19/56* | (2006.01) | |
| *C09K 19/60* | (2006.01) | |
| *C07F 7/18* | (2006.01) | |
| *C09K 19/30* | (2006.01) | |
| *C09K 19/34* | (2006.01) | |
| *G02F 1/1337* | (2006.01) | |
| *G02F 1/1341* | (2006.01) | |
| *C09K 19/04* | (2006.01) | |
| *C09K 19/20* | (2006.01) | |

(52) U.S. Cl.
CPC ............ *C09K 19/56* (2013.01); *C07F 7/1804* (2013.01); *C09K 19/3003* (2013.01); *C09K 19/3402* (2013.01); *C09K 19/601* (2013.01); *G02F 1/1341* (2013.01); *G02F 1/133788* (2013.01); *C09K 2019/0448* (2013.01); *C09K 2019/0466* (2013.01); *C09K 2019/2078* (2013.01); *C09K 2019/301* (2013.01); *C09K 2019/3004* (2013.01); *C09K 2019/3009* (2013.01); *C09K 2019/3016* (2013.01); *C09K 2019/3422* (2013.01); *G02F 2201/121* (2013.01); *G02F 2201/123* (2013.01)

(58) Field of Classification Search
CPC ................ C09K 19/56; C09K 19/3003; C09K 19/3402; C09K 19/601; C09K 2019/0448; C09K 2019/0466; C09K 2019/2078; C09K 2019/3004; C09K 2019/3009; C09K 2019/301; C09K 2019/3016; C09K 2019/3422; G02F 1/1333; G02F 1/1341; G02F 1/133788; G02F 2201/121; G02F 2201/123; C07F 7/1804
USPC ..................................................... 252/299.01
See application file for complete search history.

(56) References Cited

U.S. PATENT DOCUMENTS

| | | |
|---|---|---|
| 7,425,394 B2 | 9/2008 | Sawatari |
| 2019/0002763 A1* | 1/2019 | Adlem ................ C09K 19/601 |

FOREIGN PATENT DOCUMENTS

WO         2014198066 A1    12/2014

OTHER PUBLICATIONS

International Search Report PCT/EP2016/001940 dated Feb. 17, 2018.
A. Bisset et al: "ChemInform Abstract: Resonance Raman Spectroscopic Studies of Probe Molecules Interacting with Acidic Sites on Silica-Alumina", ChemInform, vol. 28, No. 28, Jul. 8, 1997 (Jul. 8, 1997), DE, pp. no-no, XP055342189, ISSN: 0931-7597.
Youngwoo Yi et al: "High-Sensitivity Aminoazobenzene Chemisorbed Monolayers for Photoalignment of Liquid Crystals", Langmuir, vol. 25, No. 2, Jan. 20, 2009 (Jan. 20, 2009), US, pp. 997-1003, XP055342077, ISSN: 0743-7463.
G. H. Heilmeier et al: "Guest-Host Interactions in Nematic Liquid Crystals. A New Electro-Optic Effect", Applied Physics Letters, vol. 13, No. 3, Aug. 1, 1968 (Aug. 1, 1968), US, pp. 91-92, XP055342193, ISSN: 0003-6951.
Rahman M et al: "Dielectric relaxation dynamics in liquid crystal—dye composites", Dyes and Pigments, Elsevier Applied Science Publishers. Barking, GB, vol. 84, No. 1, Jan. 1, 2010 (Jan. 1, 2010), pp. 128-133, XP026653566, ISSN: 0143-7208.
Ichimura et al:Photoregulation of in-plane reorientation of liquid crystals by azobenzenes laterally attached to substrate surfaces; Langmuir, 1993, 9 (11), pp. 3298-3304.

(Continued)

Primary Examiner — Geraldina Visconti
(74) Attorney, Agent, or Firm — Millen White Zelano and Branigan, PC; Csaba Henter

(57) ABSTRACT

The invention relates to a method of manufacturing a liquid crystal display device wherein a liquid crystal mixture having positive dielectric anisotropy or negative dielectric anisotropy is interposed between a first substrate and a second substrate, the liquid crystal mixture comprising liquid crystal molecules, a self assembling photoalignment agent, a polymerisable compound, and wherein said LC mixture is photoaligned by irradiation with linearly polarised ultraviolet light and then cured by irradiation with ultraviolet light.

20 Claims, No Drawings

(56) References Cited

OTHER PUBLICATIONS

Fang et al:Photo-Reversible Liquid Crystal Alignment using Azobenzene-Based Self-Assembled Monolayers: comparison of the Bare Monolayer and Liquid Crystal Reorientation Dynamics; Langmuir, 2010, 26 (22), pp. 17482-17488.
Fang et al: High Extinction Polarimeter for the Precision Measurement of the In-Plane Optical Anisotropy of Molecular Monolayers; Langmuir, 2010, 26 (14), pp. 11686-11689.
Shi et al:Phase Winding of a Nematic Liquid Crystal by Dynamic Localized Reorientation of an Azo-Based Self-Assembled Monolayer; Langmuir, 2014, 30 (31), pp. 9560-9566.
Youngwoo Yi et al: High-Sensitivity Aminoazobenzene Chemisorbed Monolayers for Photoalignment of Liquid Crystals; Langmuir, 2009, 25 (2), pp. 997-1003.

\* cited by examiner

METHOD FOR MANUFACTURING A LIQUID CRYSTAL DISPLAY DEVICE AND LIQUID CRYSTAL MIXTURE

The invention relates to a method of manufacturing a liquid crystal (LC) display device with homogeneous alignment by photoaligning a liquid crystal mixture with positive or negative dielectric anisotropy comprising a self assembling photoalignment agent and a polymerisable compound, to the liquid crystal mixture comprising the self assembling photoaligning agent and the polymerisable compound and to the LC display produced by said method.

Liquid-crystalline media have been used for decades in electro-optical displays (liquid crystal displays—LCD) for the purpose of information display. The liquid crystal displays (LC displays) used at present are often those of the TN ("twisted nematic") type. However, these have the disadvantage of a strong viewing-angle dependence of the contrast.

In addition, so-called VA ("vertically aligned") displays are known which have a broader viewing angle. The LC cell of a VA display contains a layer of an LC medium between two transparent electrodes, where the LC medium usually has a negative value of the dielectric (DC) anisotropy. In the switched-off state, the molecules of the LC layer are aligned perpendicular to the electrode surfaces (homeotropically) or have a tilted planar (homogeneous) alignment. On application of an electrical voltage to the two electrodes, a realignment of the LC molecules parallel to the electrode surfaces takes place. Furthermore, so-called IPS ("in plane switching") displays and later, FFS ("fringe-field switching") displays have been reported (see, inter alia, S. H. Jung et al., Jpn. J. Appl. Phys., Volume 43, No. 3, 2004, 1028), which contain two electrodes on the same substrate, one of which is structured in a comb-shaped manner and the other is unstructured. A strong, so-called "fringe field" is thereby generated, i.e. a strong electric field close to the edge of the electrodes, and, throughout the cell, an electric field which has both a strong vertical component and also a strong horizontal component. FFS displays have a low viewing-angle dependence of the contrast. FFS displays usually contain an LC medium with positive dielectric anisotropy, and an alignment layer, usually of polyimide, which provides planar alignment to the molecules of the LC medium.

Furthermore, FFS displays have been disclosed (see S. H. Lee et al., Appl. Phys. Lett. 73(20), 1998, 2882-2883 and S. H. Lee et al., Liquid Crystals 39(9), 2012, 1141-1148), which have similar electrode design and layer thickness as FFS displays, but comprise a layer of an LC medium with negative dielectric anisotropy instead of an LC medium with positive dielectric anisotropy. The LC medium with negative dielectric anisotropy shows a more favourable director orientation that has less tilt and more twist orientation compared to the LC medium with positive dielectric anisotropy; as a result these displays have a higher transmission.

A further development are the so-called PS (polymer sustained) or PSA (polymer sustained alignment) displays, for which the term "polymer stabilised" is also occasionally used. The PSA displays are distinguished by the shortening of the response times without significant adverse effects on other parameters, such as, in particular, the favourable viewing-angle dependence of the contrast.

In these displays, a small amount (for example 0.3% by weight, typically <1% by weight) of one or more polymerisable compound(s) is added to the LC medium and, after introduction into the LC cell, is polymerised or crosslinked in situ, usually by UV photopolymerisation, between the electrodes with or without an applied electrical voltage. The addition of polymerisable mesogenic or liquid-crystalline compounds, also known as reactive meso-gens or "RMs", to the LC mixture has proven particularly suitable. PSA technology has hitherto been employed principally for LC media having negative dielectric anisotropy.

Unless indicated otherwise, the term "PSA" is used below as representative of PS displays and PSA displays.

In the meantime, the PSA principle is being used in diverse classical LC displays. Thus, for example, PSA-VA, PSA-OCB, PSA-IPS, PSA-FFS and PSA-TN displays are known. The polymerisation of the polymerisable compound(s) preferably takes place with an applied electrical voltage in the case of PSA-VA and PSA-OCB displays, and with or without an applied electrical voltage in the case of PSA-IPS displays. As can be demonstrated in test cells, the PS(A) method results in a 'pretilt' in the cell. In the case of PSA-OCB displays, for example, it is possible for the bend structure to be stabilised so that an offset voltage is unnecessary or can be reduced. In the case of PSA-VA displays, the pretilt has a positive effect on the response times. A standard MVA or PVA pixel and electrode layout can be used for PSA-VA displays. In addition, however, it is also possible, for example, to manage with only one structured electrode side and no protrusions, which significantly simplifies production and at the same time results in very good contrast at the same time as very good light transmission.

PSA-VA displays are described, for example, in JP 10-036847 A, EP 1 170 626 A2, U.S. Pat. Nos. 6,861,107, 7,169,449, US 2004/0191428 A1, US 2006/0066793 A1 and US 2006/0103804 A1. PSA-OCB displays are described, for example, in T.-J-Chen et al., Jpn. J. Appl. Phys. 45, 2006, 2702-2704 and S. H. Kim, L.-C-Chien, Jpn. J. Appl. Phys. 43, 2004, 7643-7647. PSA-IPS displays are described, for example, in U.S. Pat. No. 6,177,972 and Appl. Phys. Lett. 1999, 75(21), 3264. PSA-TN displays are described, for example, in Optics Express 2004, 12(7), 1221. PSA-VA-IPS displays are disclosed, for example, in WO 2010/089092 A1.

Like the conventional LC displays described above, PSA displays can be operated as active-matrix or passive-matrix displays. In the case of active-matrix displays, individual pixels are usually addressed by integrated, non-linear active elements, such as, for example, transistors (for example thin-film transistors or "TFTs"), while in the case of passive-matrix displays, individual pixels are usually addressed by the multiplex method, both methods being known from the prior art.

In particular for monitor and especially TV applications, optimisation of the response times, but also of the contrast and luminance (i.e. also transmission), of the LC display is still sought after. The PSA method can provide crucial advantages here. In particular in the case of PSA-VA displays, a shortening of the response times, which correlate with a pretilt which can be measured in test cells, can be achieved without significant adverse effects on other parameters.

In the prior art, polymerisable compounds of the following formula, for example, are used for PSA-VA:

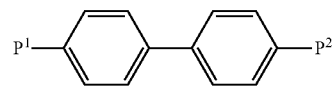

wherein P¹ and P² denote polymerisable groups, usually acrylate or methacrylate groups, as described, for example, in U.S. Pat. No. 7,169,449.

In order to achieve a uniform alignment of the liquid crystal across the whole area of the display, an alignment layer on top of the substrates is required that is in contact with the liquid crystal. Rubbed polyimide has been used for a long time to align liquid crystals. However, the rubbing process causes a number of problems: mura, contamination, problems with static discharge, debris, etc. Hence, the effort for the production of a polyimide layer, treatment of the layer and improvement with bumps or polymer layers is relatively great. A simplifying technology which on the one hand reduces production costs and on the other hand helps to optimise the image quality (viewing-angle dependence, contrast, response times) would therefore be desirable.

In the prior art, a mechanism of orienting polymers comprising a suitable chromophore is described where photomodification is initiated by irradiation with linear polarised light resulting in a preferred molecular configuration (cf. U.S. Pat. No. 5,389,698). Based on these findings, photoalignment was developed, which is a technology for achieving liquid crystal alignment that avoids rubbing by such a light-induced orientational ordering of the alignment surface. This can be achieved through the mechanisms of photodecomposition, photodimerisation, and photoisomerisation (N. A. Clark et al. Langmuir 2010, 26(22), 17482-17488, and literature cited therein) by means of linear polarised light. However, still a suitably derivatised polyimide layer is required that comprises the photoreactive group. A further improvement would be to avoid the use of polyimide at all. For VA displays this was achieved by adding a self alignment agent to the LC that induces alignment in situ by a self assembling mechanism as disclosed in WO 2012/104008 and WO 2012/038026.

Siloxanes and polysiloxanes derived thereof were proposed as alignment material for displays (e.g. WO 2014/021174 A1, WO 2008/044644 and WO 2009/025388). However, the substrates have to be coated with these materials before assembly of the display.

N. A. Clark et al., Langmuir 2010, 26(22), 17482-17488 have shown that it is possible to self assemble a compound of the following structure

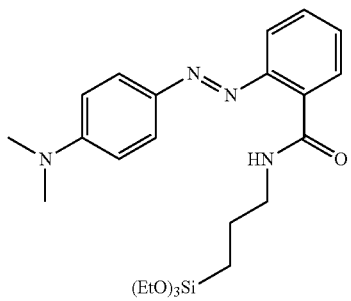

onto a substrate to give a monolayer that is able to be photoaligned to induce homogeneous alignment of a liquid crystal. However, a separate step of self assembly before manufacture of the LC cell was performed and reversibility of the alignment upon exposure to light was reported.

It is an aim of this invention to simplify the production process of an LC display by providing a method to align liquid crystals without the use of polyimide without giving up the advantages of IPS technology, such as relatively short response times, good viewing-angle dependence and high contrast.

Surprisingly it was found that it is possible to manufacture a liquid crystal display without a polyimide alignment layer by interposing a liquid crystal mixture between two substrates, the liquid crystal mixture comprising liquid crystal molecules, one or more self assembling photoalignment agents and one or more polymerisable compounds; irradiating the liquid crystal mixture with linearly polarised ultraviolet light or linearly polarised visible light causing photoalignment of the liquid crystal; and finally curing the liquid crystal mixture by irradiation with ultraviolet light.

The invention thus relates to a method of manufacturing an LC display device with homogeneous alignment, preferably of the IPS or FFS type, by photoaligning a liquid crystal mixture inside an LC cell having two substrates and at least two electrodes, where at least one substrate is transparent to light and at least one substrate has one or two electrodes, comprising at least the process steps of:

providing a first substrate which includes a pixel electrode and a common electrode;

providing a second substrate, the second substrate being disposed opposite to the first substrate;

interposing a liquid crystal mixture between the first substrate and the second substrate, the liquid crystal mixture comprising liquid crystal molecules, one or more self assembling photoalignment agents of formula S below and one or more polymerisable compounds of formula P below;

irradiating the liquid crystal mixture with linearly polarised light causing photoalignment of the liquid crystal mixture;

curing the polymerisable compound by irradiation with ultraviolet light causing fixation of alignment.

In a preferred embodiment the linearly polarised light is ultraviolet light which enables simultaneous photoalignment of the self assembling photoalignment agent and photocuring of the polymerisable compound.

A self assembling photoalignment agent (SAPA) according to the present invention is a compound comprising at least one polar lateral group and at least one photoreactive group. Considering the investigations for this invention it appears that the polar lateral group interacts with the substrate surface thus enabling the SAPA to phase separate from the LC mixture after filling of the LC cell. According to this opinion, the SAPA forms a layer on the substrate which can be photoaligned with linearly polarised UV light. The liquid crystal follows the orientation of the aligned SAPA to give uniform planar alignment across the whole display.

The photoalignment process according to the present invention causes the SAPA to undergo an isomerisation under irradiation with linearly polarised light of appropriate wavelength. The photoisomerisation is an angle-dependent process, resulting eventually in the photoselection of SAPA orientations that are preferentially perpendicular to the polarization of the actinic light and with orientational anisotropy capable of aligning LCs. The wavelength region of the polarised light is preferably chosen so as to match the absorption spectrum of the SAPA.

In case the alignment is reversible, for example under the influence of heat or light, it is desirable to fix the alignment of the SAPA and the LC. Surprisingly it was found that it is possible to fix the alignment by photopolymerising a polymerisable compound of formula P described below, with UV light inside the cell after or during the photoalignment step. As a result, the homogeneous alignment of the LC is irreversible and stable towards heat or light.

Hence, the method according to the present invention is based on the use of an LC mixture comprising a self assembling photoalignment agent of formula S

S wherein
Y denotes $(R^b)_2N-$, $R^cC(O)O-$, or a group $L^s$,
Sp denotes a spacer group as defined for formula P below,
G denotes $-OH$ or $Si(OR^a)_3$,
$R^a$, $R^b$, $R^c$ each denote, identically or differently, straight chain or branched alkyl with 1 to 6 C atoms,
$L^s$ each, identically or differently, denote a group as defined below for L in formula P,
t1,t2 denotes 0, 1, 2, 3 or 4;
and
one or more polymerisable compounds of formula P $$P^a-(Sp^a)_{s1}-A^2-(Z^a-A^1)_{n2}-(Sp^b)_{s2}-P^b \qquad P$$

wherein the individual radicals have the following meanings:
$P^a$, $P^b$ each, independently of one another, denote a polymerisable group,
$Sp^a$, $Sp^b$ on each occurrence, identically or differently, denote a spacer group,
s1, s2 each, independently of one another, denote 0 or 1,
$A^1$, $A^2$ each, independently of one another, denote a radical selected from the following groups:
 a) the group consisting of trans-1,4-cyclohexylene, 1,4-cyclo-hexenylene and 4,4'-bicyclohexylene, wherein, in addition, one or more non-adjacent CH$_2$ groups may be replaced by $-O-$ and/or $-S-$ and wherein, in addition, one or more H atoms may be replaced by F,
 b) the group consisting of 1,4-phenylene and 1,3-phenylene, wherein, in addition, one or two CH groups may be replaced by N and wherein, in addition, one or more H atoms may be replaced by L,
 c) the group consisting of tetrahydropyran-2,5-diyl, 1,3-dioxane-2,5-diyl, tetrahydrofuran-2,5-diyl, cyclobutane-1,3-diyl, piperidine-1,4-diyl, thiophene-2,5-diyl and selenophene-2,5-diyl, each of which may also be mono- or polysubstituted by L,
 d) the group consisting of saturated, partially unsaturated or fully unsaturated, and optionally substituted, polycyclic radicals having 5 to 20 cyclic C atoms, one or more of which may, in addition, be replaced by heteroatoms, preferably selected from the group consisting of where, in addition, one or more H atoms in these radicals may be replaced by L, and/or one or more double bonds may be replaced by single bonds, and/or one or more CH groups may be replaced by N,
n2 denotes 0, 1, 2 or 3,
$Z^a$ in each case, independently of one another, denotes $-CO-O-$, $-O-CO-$, $-CH_2O-$, $-OCH_2-$, $-CF_2O-$, $-OCF_2-$, or $-(CH_2)_n-$, where n is 2, 3 or 4, $-O-$, $-CO-$, $-C(R^yR^z)-$, $-CH_2CF_2-$, $-CF_2CF_2-$ or a single bond,
L on each occurrence, identically or differently, denotes F, Cl, CN, SCN, SF$_5$ or straight-chain or branched, in each case optionally fluorinated, alkyl, alkoxy, alkylcarbonyl, alkoxycarbonyl, alkylcarbonyloxy or alkoxycarbonyloxy having 1 to 12 C atoms,
$R^y$, $R^z$ each, independently of one another, denote H, F or straight-chain or branched alkyl having 1 to 12 C atoms, wherein, in addition, one or more H atoms may be replaced by F, M denotes —O—, —S—, —CH$_2$—, —CHY$^1$— or —CY$^1$Y$^2$—, and Y$^1$ and Y$^2$ each, independently of one another, have one of the meanings indicated above for R$^y$ or denote Cl or CN.

Preferred compounds of formula S are selected from the compounds of formula S-1

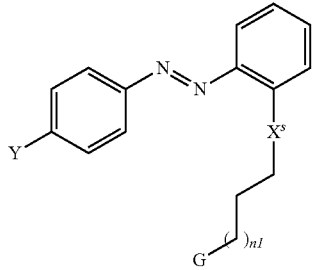

S-1 wherein the parameters have the meaning defined above and X$^s$ denotes O, —C(O)O—, C(O)NH— or a single bond.

Particularly preferred compounds of formula S-1 are the following compounds S-1-1 and S-1-2,

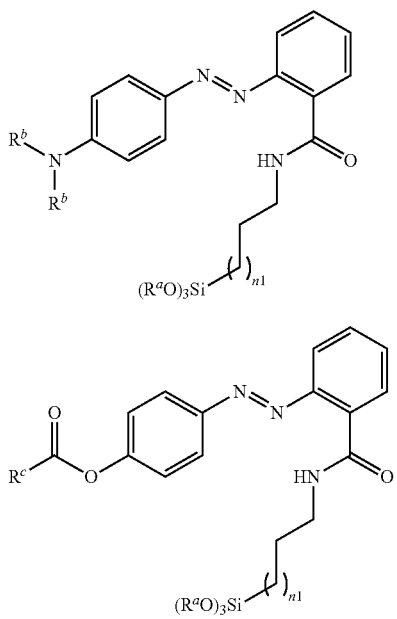

S-1-1

S-1-2 wherein the parameters have the meaning given above and preferably R$^a$ denotes methyl or ethyl, R$^b$ and R$^c$ denote methyl and n1 denotes an integer from 0 to 10, preferably 1 to 4.

The polymerisable group P$^{a,b}$ is a group which is suitable for a polymerisation reaction, such as, for example, free-radical or ionic chain polymerisation, polyaddition or polycondensation, or for a polymer-analogous reaction, for example addition or condensation onto a main polymer chain. Particular preference is given to groups for chain polymerisation, in particular those containing a C=C double bond or —C≡C— triple bond, and groups which are suitable for polymerisation with ring opening, such as, for example, oxetane or epoxide groups.

Preferred groups P$^{a,b}$ are selected from the group consisting of CH$_2$=CW$^1$—CO—O—, CH$_2$=CW$^1$—CO—,

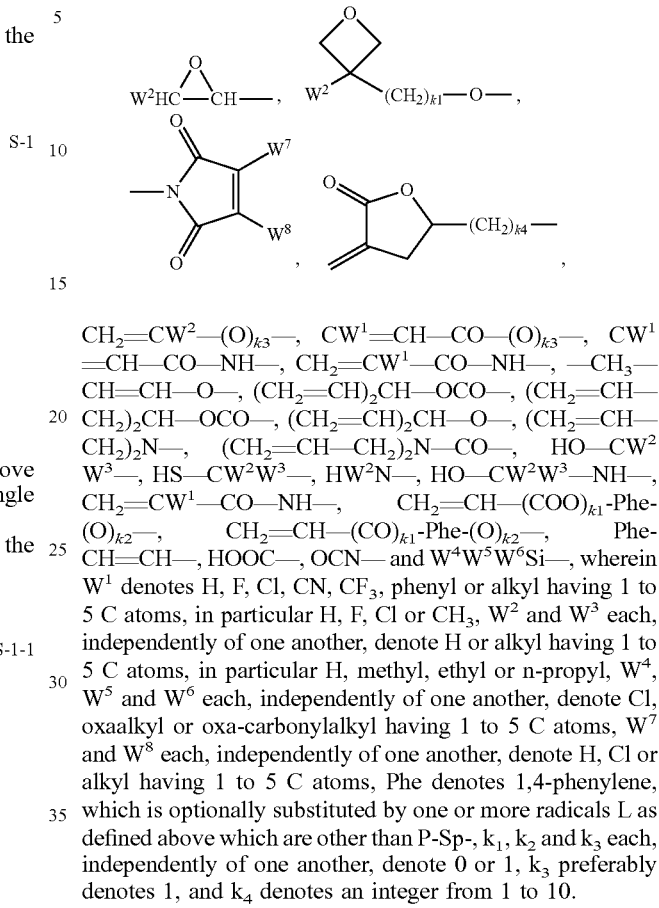

CH$_2$=CW$^2$—(O)$_{k3}$—, CW$^1$=CH—CO—(O)$_{k3}$—, CW$^1$=CH—CO—NH—, CH$_2$=CW$^1$—CO—NH—, —CH$_3$—CH=CH—O—, (CH$_2$=CH)$_2$CH—OCO—, (CH$_2$=CH—CH$_2$)$_2$CH—OCO—, (CH$_2$=CH)$_2$CH—O—, (CH$_2$=CH—CH$_2$)$_2$N—, (CH$_2$=CH—CH$_2$)$_2$N—CO—, HO—CW$^2$W$^3$—, HS—CW$^2$W$^3$—, HW$^2$N—, HO—CW$^2$W$^3$—NH—, CH$_2$=CW$^1$—CO—NH—, CH$_2$=CH—(COO)$_{k1}$-Phe-(O)$_{k2}$—, CH$_2$=CH—(CO)$_{k1}$-Phe-(O)$_{k2}$—, Phe-CH=CH—, HOOC—, OCN— and W$^4$W$^5$W$^6$Si—, wherein W$^1$ denotes H, F, Cl, CN, CF$_3$, phenyl or alkyl having 1 to 5 C atoms, in particular H, F, Cl or CH$_3$, W$^2$ and W$^3$ each, independently of one another, denote H or alkyl having 1 to 5 C atoms, in particular H, methyl, ethyl or n-propyl, W$^4$, W$^5$ and W$^6$ each, independently of one another, denote Cl, oxaalkyl or oxa-carbonylalkyl having 1 to 5 C atoms, W$^7$ and W$^8$ each, independently of one another, denote H, Cl or alkyl having 1 to 5 C atoms, Phe denotes 1,4-phenylene, which is optionally substituted by one or more radicals L as defined above which are other than P-Sp-, k$_1$, k$_2$ and k$_3$ each, independently of one another, denote 0 or 1, k$_3$ preferably denotes 1, and k$_4$ denotes an integer from 1 to 10.

Particularly preferred groups P$^{a,b}$ are selected from the group consisting of CH$_2$=CW$^1$—CO—O—, in particular CH$_2$=CH—CO—O—, CH$_2$=C(CH$_3$)—CO—O— and CH$_2$=CF—CO—O—, furthermore CH$_2$=CH—O—, (CH$_2$=CH)$_2$CH—O—CO—, (CH$_2$=CH)$_2$CH—O—,

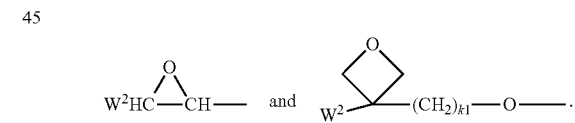

Very particularly preferred groups P$^{a,b}$ are selected from the group consisting of acrylate, methacrylate, fluoroacrylate, furthermore vinyloxy, chloroacry-late, oxetane and epoxide groups, and of these preferably an acrylate or methacrylate group.

Preferred spacer groups Sp$^{a,b}$ are selected from the formula Sp"-X", so that the radical P$^{a/b}$-Sp$^{a/b}$- conforms to the formula P$^{a/b}$-Sp"-X"—, where Sp" denotes alkylene having 1 to 20, preferably 1 to 12, C atoms, which is optionally mono- or polysubstituted by F, Cl, Br, I or CN and wherein, in addition, one or more non-adjacent CH$_2$ groups may each be replaced, independently of one another, by —O—, —S—, —NH—, —N(R$^0$)—, —Si(R$^{00}$R$^{000}$)—, —CO—, —CO—O—, —O—CO—, —O—CO—O—, —S—CO—, —CO—S—, —N(R$^0$)—CO—O—, —O—CO—N(R$^{00}$)—, —N(R$^{00}$)—CO—N(R$^{00}$)—, —CH=CH— or —C≡C— in such a way that O and/or S atoms are not linked directly to one another, X" denotes —O—, —S—, —CO—, —CO—O—, —O—CO—, —O—CO—O—, —CO—N(R$^{00}$)—, —N(R$^{00}$)—CO—, —N(R$^{00}$)—CO—N(R$^{00}$)—, —OCH$_2$—, —CH$_2$O—, —SCH$_2$—, —CH$_2$S—, —CF$_2$O—, —OCF$_2$—, —CF$_2$S—, —SCF$_2$—, —CF$_2$CH$_2$—, —CH$_2$CF$_2$—, —CF$_2$CF$_2$—, —CH=N—, —N=CH—, —N=N—, —CH=CR$^0$—, —CY$^3$=CY$^4$—, —C≡C—, —CH=CH—CO—O—, —O—CO—CH=CH— or a single bond, R$^0$, R$^{00}$ and R$^{000}$ each, independently of one another, denote H or alkyl having 1 to 12 C atoms, and Y$^3$ and Y$^4$ each, identically or differently, denote H, F, Cl or CN.

X" is preferably —O—, —S—, —CO—, —C(O)O—, —OC(O)—, —O—C(O)O—, —CO—NR$^0$—, —NR$^0$—CO—, —NR$^0$—CO—NR$^0$— or a single bond.

Typical spacer groups Sp" are, for example, —(CH$_2$)$_{p1}$—, —(CH$_2$CH$_2$O)$_{q1}$—CH$_2$CH$_2$—, —CH$_2$CH$_2$—S—CH$_2$CH$_2$—, —CH$_2$CH$_2$—NH—CH$_2$CH$_2$— or —(SiR$^{00}$R$^{000}$—O)$_{p1}$—, wherein p1 is an integer from 1 to 12, q1 is an integer from 1 to 3, and R$^{00}$ and R$^{000}$ have the meanings indicated above.

Particularly preferred groups -Sp"-X"— are —(CH$_2$)$_{p1}$—, —(CH$_2$)$_{p1}$—O—, —(CH$_2$)$_{p1}$—O—CO—, —(CH$_2$)$_{p1}$—O—CO—O—, wherein p1 and q1 have the meanings indicated above.

Particularly preferred groups Sp" are, for example, in each case straight-chain ethylene, propylene, butylene, pentylene, hexylene, heptylene, octyl-ene, nonylene, decylene, undecylene, dodecylene, octadecylene, ethylene-oxyethylene, methyleneoxybutylene, ethylenethioethylene, ethylene-N-methyliminoethylene, 1-methylalkylene, ethenylene, propenylene and butenylene.

Particularly preferred monomers of formula P are the following:

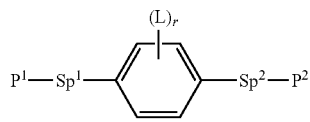

P1

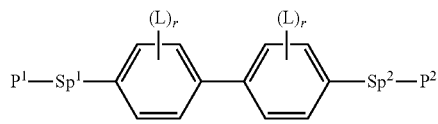

P2

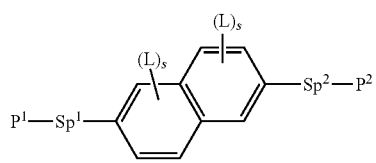

P3

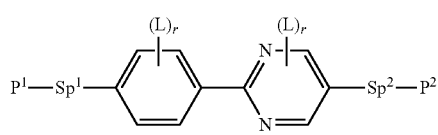

P4

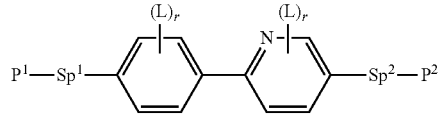

P5

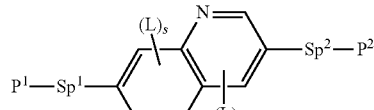

P6

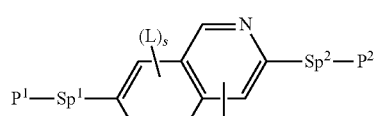

P7

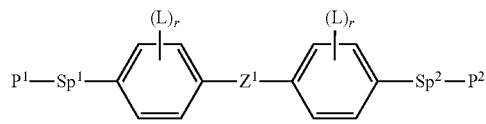

P8

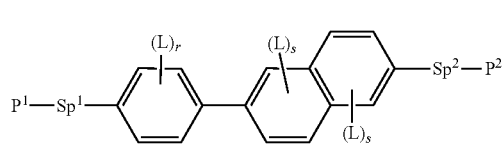

P9

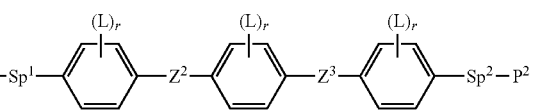

P10

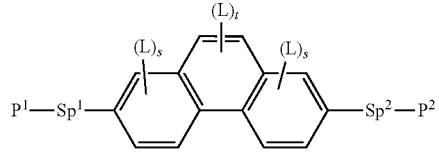

P11

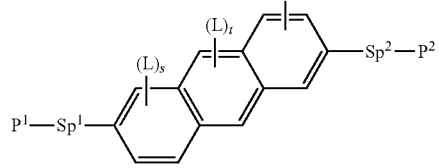

P12

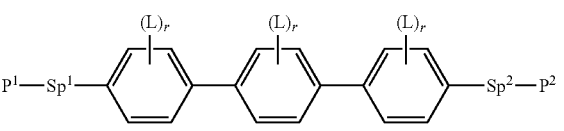

P13

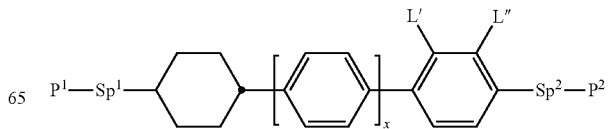

P14

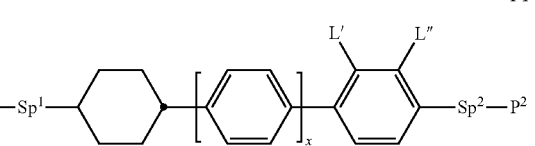

P15 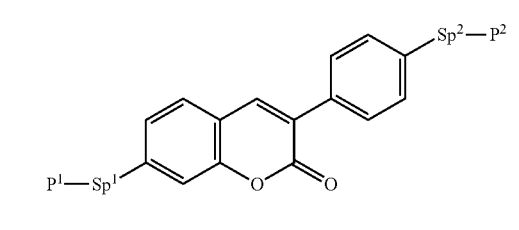
P16 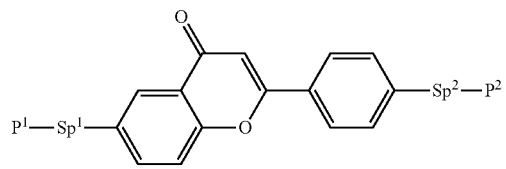
P17 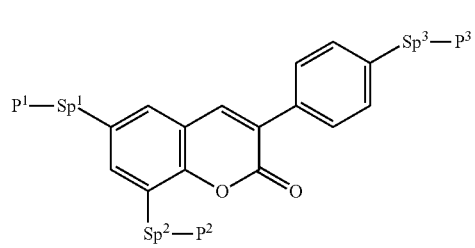
P18 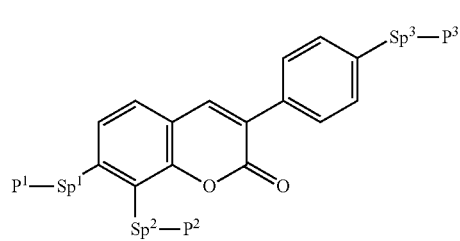
P19 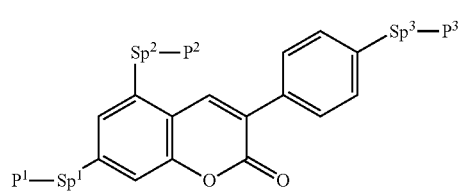
P20 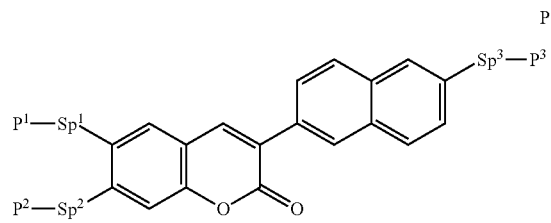
P21 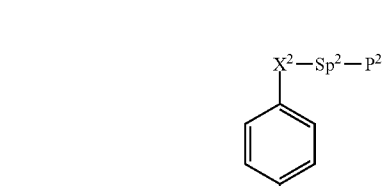
P22 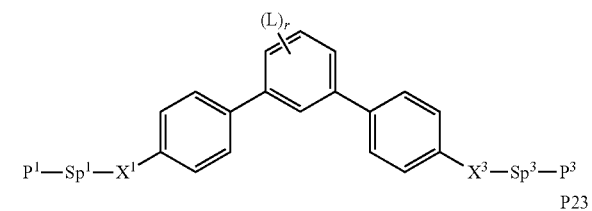
P23 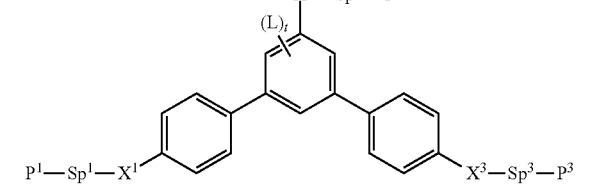
P24 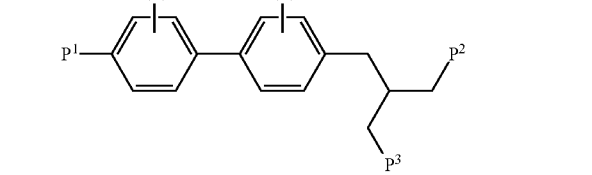
P25 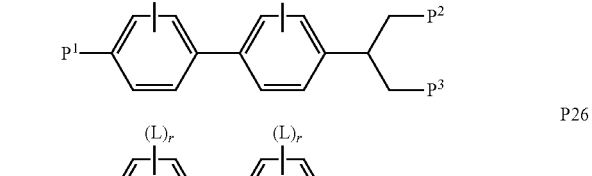
P26 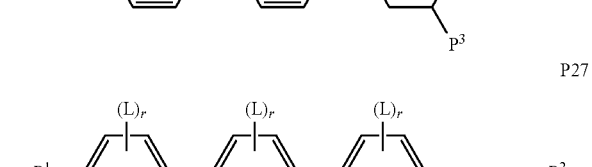
P27 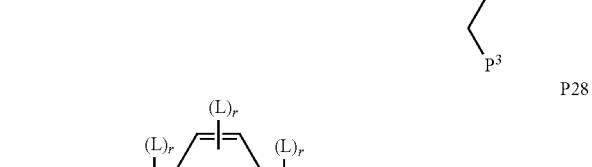
P28 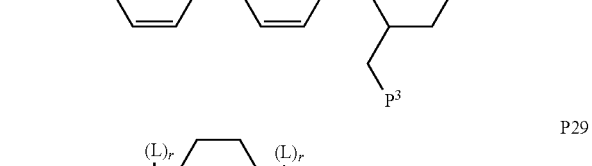
P29 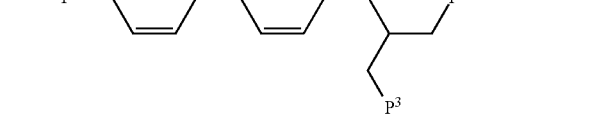

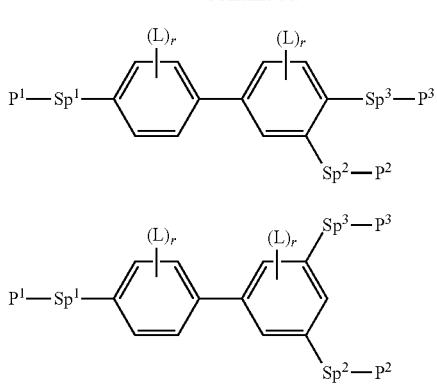

wherein the individual radicals have the following meanings:

$P^1$, $P^2$ and $P^2$ each, independently of one another, denote a polymerisable group as defined for formula P, preferably an acrylate, methacrylate, fluoroacrylate, oxetane, vinyloxy or epoxide group, $Sp^1$, $Sp^2$ and $Sp^3$ each, independently of one another, denote a single bond or a spacer group, preferably having one of the meanings indicated above and below for $Sp^a$, and particularly preferably —(CH$_2$)$_{p1}$—, —(CH$_2$)$_{p1}$—O—, —(CH$_2$)$_{p1}$—CO—O— or —(CH$_2$)$_{p1}$—O—CO—O—, wherein p1 is an integer from 1 to 12, and where the linking to the adjacent ring in the last-mentioned groups takes place via the O atom, where, in addition, one or more of the radicals $P^1$-$Sp^1$-, $P^2$—$Sp^2$- and $P^3$—$Sp^3$- may denote a radical $R^{aa}$, with the proviso that at least one of the radicals $P^1$-$Sp^1$-, $P^2$—$Sp^2$- and $P^3$—$Sp^3$- present does not denote $R^{aa}$, $R^{aa}$ denotes H, F, Cl, CN or straight-chain or branched alkyl having 1 to 25 C atoms, wherein, in addition, one or more non-adjacent CH$_2$ groups may each be replaced, independently of one another, by C(R$^0$)=C(R$^{00}$)—, —C≡C—, —N(R$^0$)—, —O—, —S—, —CO—, —CO—O—, —O—CO—, —O—CO—O— in such a way that —O— and/or —S— atoms are not linked directly to one another, and wherein, in addition, one or more H atoms may be replaced by F, Cl, CN or $P^1$—$Sp^1$-, particularly preferably straight-chain or branched, optionally mono- or polyfluorinated alkyl, alkoxy, alkenyl, alkynyl, alkylcarbonyl, alkoxycarbonyl or alkylcarbonyloxy having 1 to 12 C atoms (where the alkenyl and alkynyl radicals have at least two C atoms and the branched radicals have at least three C atoms), $R^0$, $R^{00}$ each, independently of one another, denote H or alkyl having 1 to 12 C atoms, $R^y$ and $R^z$ each, independently of one another, denote H, F, CH$_3$ or CF$_3$, $Z^{p1}$ denotes —O—, —CO—, —C(R$^y$R$^z$)— or —CF$_2$CF$_2$—, $Z^{p2}$ and $Z^{p3}$ each, independently of one another, denote —CO—O—, —O—CO—, —CH$_2$O—, —OCH$_2$—, —CF$_2$O—, —OCF$_2$— or —(CH$_2$)$_{n3}$—, where n3 is 2, 3 or 4, L on each occurrence, identically or differently, denotes F, Cl, CN, SCN, SF$_5$ or straight-chain or branched, optionally mono- or polyfluorinated alkyl, alkoxy, alkenyl, alkynyl, alkylcarbonyl, alkoxycarbonyl, alkylcarbonyloxy or alkoxycarbonyloxy having 1 to 12 C atoms, preferably F, L' and L'' each, independently of one another, denote H, F or Cl, r denotes 0, 1, 2, 3 or 4, s denotes 0, 1, 2 or 3, t denotes 0, 1 or 2, and x denotes 0 or 1.

In a particularly preferred embodiment of the present invention the LC mixture comprises one or more compounds or formula P10-1

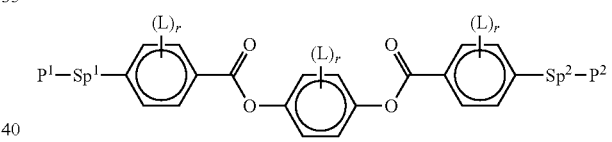

wherein the parameters are defined as described above and $P^1$ and $P^2$ preferably denote acrylate or methacrylate.

Particularly preferred compounds of formula P10-1 are selected from the group of the following subformulae

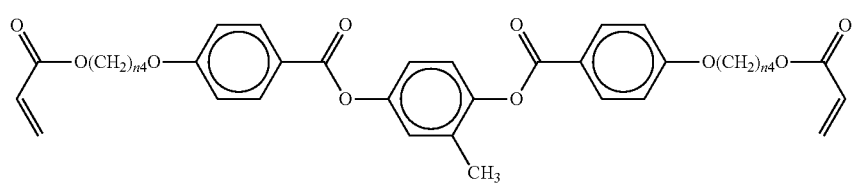

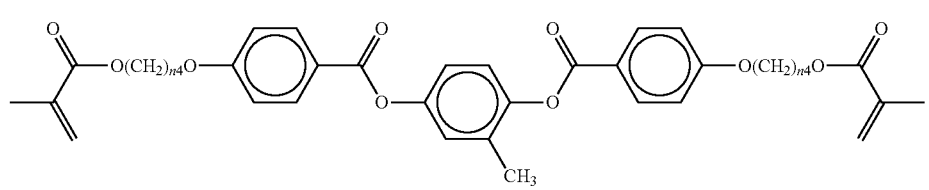

wherein each n4 denote independently of each other an integer between 2 and 10, preferably 3, 4, 5 or 6.

In one embodiment of the present invention the liquid crystal composition is injected between the first and second substrates or is filled into the cell by capillary force after combining the first and second substrates. In an alternative embodiment, the liquid crystal composition may be interposed between the first and second substrates by combining the second substrate to the first substrate after loading the liquid crystal composition on the first substrate.

For the production of the displays according to the present invention, the SAPA is preferably allowed to self assemble after filling of the display for a time between 1 min and 3 h, preferably between 10 min and 1 h and most preferably between 20 min and 30 min. The self assembly is preferably performed at room temperature.

In another preferred embodiment the self assembly is performed at elevated temperature, preferably at above 20° C. and below 120° C., more preferably above 40° C. and below 100° C. and most preferably above 50° C. and below 80° C.

In a preferred embodiment, one or more of the process steps of filling the display, self assembly of the SAPA, photoalignment and curing of the polymerisable compound is performed at a temperature above the clearing point of the liquid crystal host mixture.

During the photoalignment of the liquid crystal inside the liquid crystal panel, anisotropy is induced by exposing the display or the liquid crystal layer to linearly polarised light from an oblique direction.

The polymerisable compounds are polymerised or cross-linked (if a polymerisable compound contains two or more polymerisable groups) by in-situ polymerisation in the LC medium between the substrates of the LC display, optionally with application of a voltage. The polymerisation can be carried out in one step or in more than one step ("end curing").

Suitable and preferred polymerisation methods are, for example, thermal or photopolymerisation, preferably photopolymerisation, in particular UV photopolymerisation. One or more initiators can optionally also be added here. Suitable conditions for the polymerisation and suitable types and amounts of initiators are known to the person skilled in the art and are described in the literature. Suitable for free-radical polymerisation are, for example, the commercially available photoinitiators Irgacure651®, Irgacure184®, Irgacure907®, Irgacure369® or Darocure1173® (BASF SE). If an initiator is employed, its proportion is preferably 0.001 to 5% by weight, particularly preferably 0.001 to 1% by weight.

The polymerisable compounds according to the invention are also suitable for polymerisation without an initiator, which is associated with considerable advantages, such as, for example, lower material costs and, in particular, reduced contamination of the LC medium by possible residual amounts of the initiator or degradation products thereof. The polymerisation can thus also be carried out without addition of an initiator. The LC medium thus, in a preferred embodiment, comprises no polymerisation initiator.

The polymerisable component or the LC medium may also comprise one or more stabilisers in order to prevent undesired spontaneous polymerisation of the RMs, for example during storage or transport. Suitable types and amounts of stabilisers are known to the person skilled in the art and are described in the literature. Particularly suitable are, for example, the commercially available stabilisers from the Irganox® series (BASF SE), such as, for example, Irganox® 1076. If stabilisers are employed, their proportion, based on the total amount of the RMs or the polymerisable component, is preferably 10-10,000 ppm, particularly preferably 50-500 ppm.

Besides the SAPA of formula S described above and the polymerisable compounds of formula P described above, the LC media for use in the LC displays according to the invention comprise an LC mixture ("host mixture") comprising one or more, preferably two or more, low-molecular-weight (i.e. monomeric or unpolymerised) compounds. The latter are stable or unreactive with respect to a polymerisation reaction or photoalignment under the conditions used for the polymerisation of the polymerisable compounds or photoalignment of the SAPA. In principle, a suitable host mixture is any dielectrically negative or positive LC mixture which is suitable for use in conventional VA, IPS or FFS displays.

Suitable LC mixtures are known to the person skilled in the art and are described in the literature. LC media for VA displays having negative dielectric anisotropy are described for example in EP 1 378 557 A1.

Suitable LC mixtures having positive dielectric anisotropy which are suitable for LCDs and especially for IPS displays are known, for example, from JP 07-181 439 (A), EP 0 667 555, EP 0 673 986, DE 195 09 410, DE 195 28 106, DE 195 28 107, WO 96/23 851, WO 96/28 521 and WO2012/079676.

Preferred embodiments of the liquid-crystalline medium having negative or positive dielectric anisotropy according to the invention are indicated below.

As already mentioned, the compounds of the general formula S and of the general formula P can be used in liquid-crystalline media. Thus, the present invention also relates to liquid-crystalline media comprising 2 to 40, preferably 4 to 30, components as further constituents besides one or more compounds of the formula P and one or more compounds of formula S according to the invention. These media particularly preferably comprise 7 to 25 components besides one or more compounds according to the invention. These further constituents are preferably selected from nematic or nemato-genic (monotropic or isotropic) substances, in particular substances from the classes of the azoxybenzenes, benzylideneanilines, biphenyls, terphenyls, 1,3-dioxanes, 2,5-tetrahydropyrans, phenyl or cyclohexyl benzoates, phenyl or cyclohexyl esters of cyclohexanecarboxylic acid, phenyl or cyclohexyl esters of cyclohexylbenzoic acid, phenyl or cyclohexyl esters of cyclohexylcyclohexanecarboxylic acid, cyclohexylphenyl esters of benzoic acid, of cyclohexanecarboxylic acid or of cyclohexylcyclohexanecarboxylic acid, phenylcyclohexanes, cyclohexylbiphenyls, phenylcyclohexylcyclohexanes, cyclohexylcyclohexanes, cyclohexylcyclohexylcyclohexenes, 1,4-biscyclohexylbenzenes, 4',4'-biscyclohexylbiphenyls, phenyl- or cyclohexylpyrimi-dines, phenyl- or cyclohexylpyridines, phenyl- or cyclohexyldioxanes, phenyl- or cyclohexyl-1,3-dithianes, 1,2-diphenylethanes, 1,2-dicyclohexylethanes, 1-phenyl-2-cyclohexylethanes, 1-cyclohexyl-2-(4-phenylcyclohexyl)ethanes, 1-cyclohexyl-2-biphenylethanes, 1-phenyl-2-cyclohexylphenylethanes, optionally halogenated stilbenes, benzyl phenyl ethers, tolanes and substituted cinnamic acids. The 1,4-phenylene groups in these compounds may also be mono- or polyfluorinated.

Hence, the LC media for use in the LC displays according to the invention comprise an LC mixture ("host mixture") comprising one or more, preferably two or more mesogenic compounds and one or more compounds selected from compounds of the formula S and one or more compounds of formula P described above.

The media according to the invention preferably comprise from 0.01 to 10%, particularly preferably from 0.05 to 5% and most preferably from 0.1 to 2% of the compounds of the formula S according to the invention. The media preferably comprise one, two or three, more preferably one or two and most preferably one compound of the formula S according to the invention.

The media according to the invention preferably comprise from 0.01 to 10%, particularly preferably from 0.05 to 7.5% and most preferably from 2 to 5% of the compounds of the formula P according to the invention. The media preferably comprise one, two or three, more preferably one or two and most preferably one compound of the formula P according to the invention.

The LC host mixture is preferably a nematic LC mixture, and preferably does not have a chiral LC phase.

In one embodiment of the present invention the LC medium contains an LC host mixture with negative dielectric anisotropy. Preferred embodiments of such an LC medium, and the corresponding LC host mixture, are those of sections a)-z) below:

a) LC medium which comprises one or more compounds of the formulae CY and/or PY:

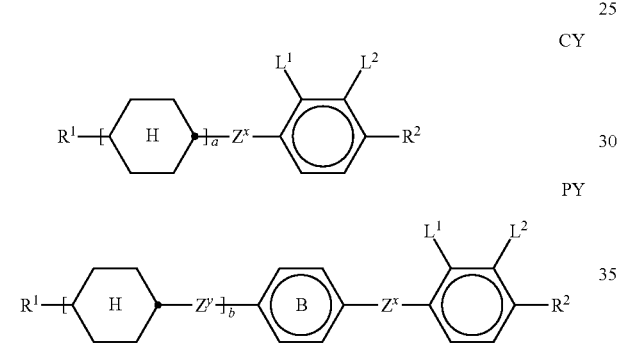

wherein
a denotes 1 or 2,
b denotes 0 or 1,

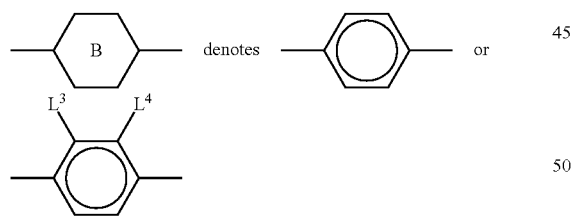

$R^1$ and $R^2$ each, independently of one another, denote alkyl having 1 to 12 C atoms, where, in addition, one or two non-adjacent CH$_2$ groups may be replaced by —O—, —CH=CH—, —CO—, —OCO— or —COO— in such a way that 0 atoms are not linked directly to one another, preferably alkyl or alkoxy having 1 to 6 C atoms, $Z^x$ and $Z^y$ each, independently of one another, denote —CH$_2$CH$_2$—, —CH=CH—, —CF$_2$O—, —OCF$_2$—, —CH$_2$O—, —OCH$_2$—, —CO—O—, —O—CO—, —C$_2$F$_4$—, —CF=CF—, —CH=CH—CH$_2$O— or a single bond, preferably a single bond, $L^{1-4}$ each, independently of one another, denote F, Cl, OCF$_3$, CF$_3$, CH$_3$, CH$_2$F, CHF$_2$.

Preferably, both $L^1$ and $L^2$ denote F or one of $L^1$ and $L^2$ denotes F and the other denotes Cl, or both $L^3$ and $L^4$ denote F or one of $L^3$ and $L^4$ denotes F and the other denotes Cl.

The compounds of the formula CY are preferably selected from the group consisting of the following sub-formulae:

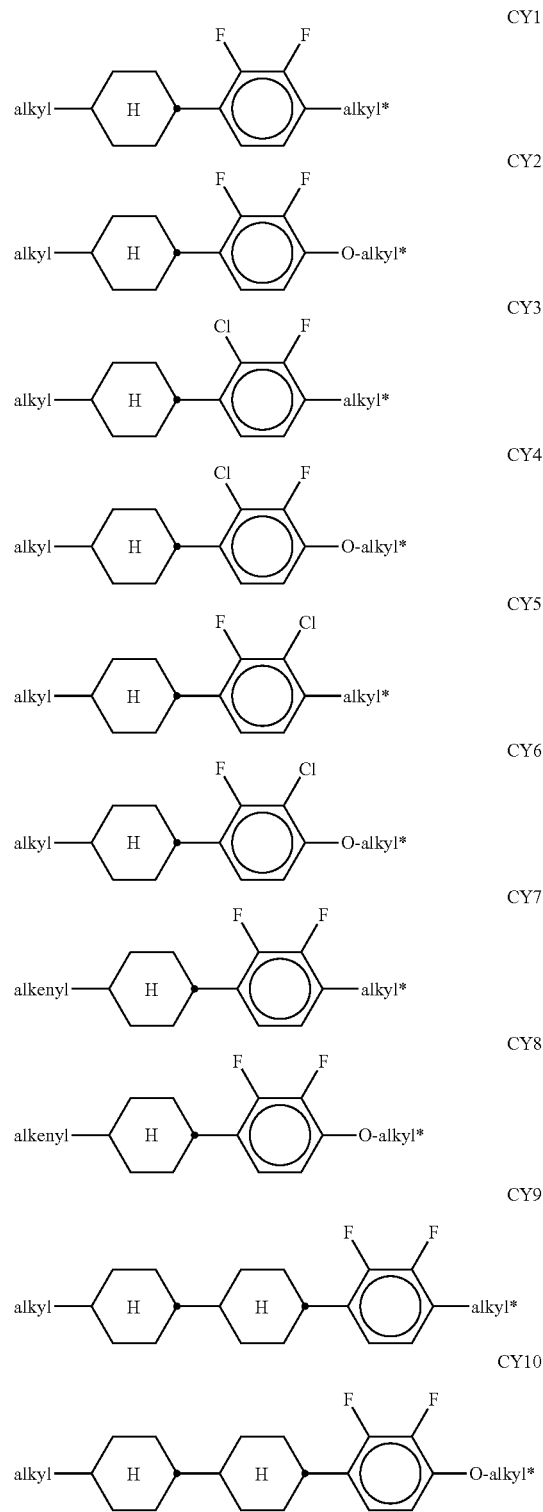

CY11
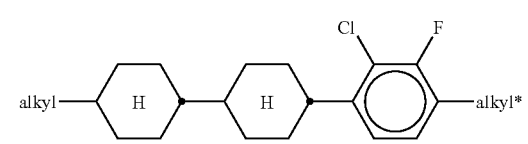
CY12
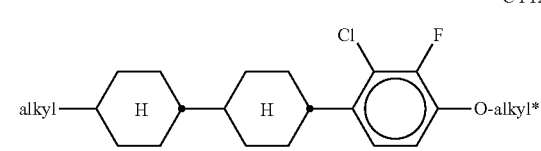
CY13
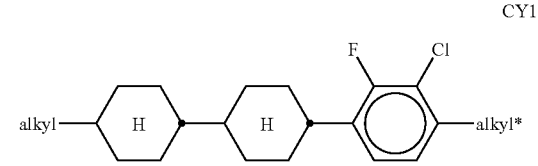
CY14
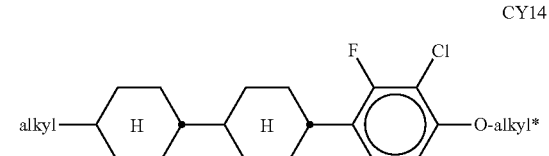
CY15
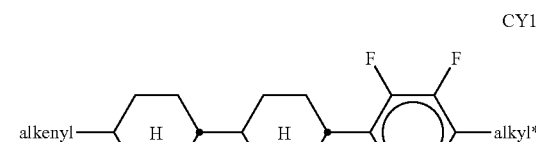
CY16
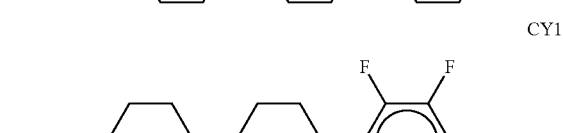
CY17
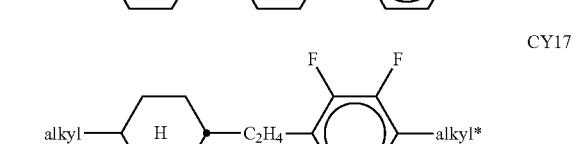
CY18
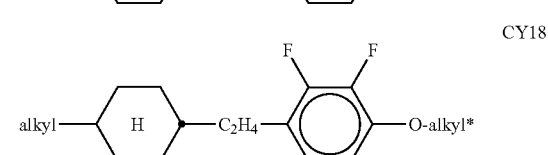
CY19
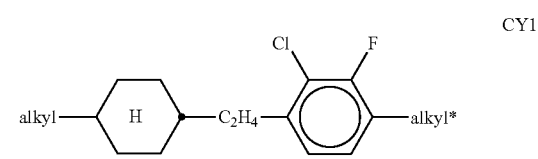
CY20
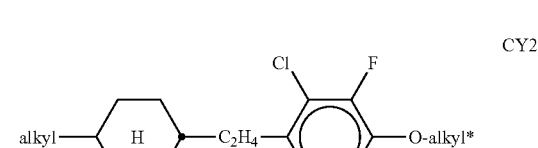
CY21
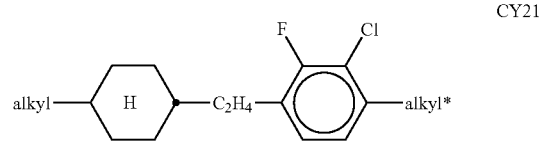
CY22
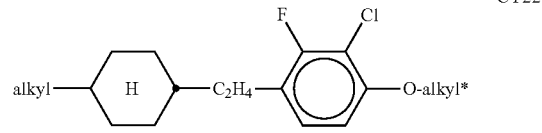
CY23
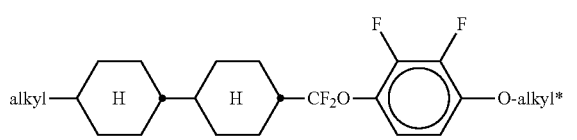
CY24
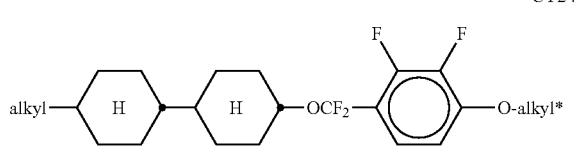
CY25
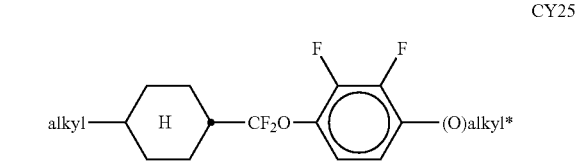
CY26
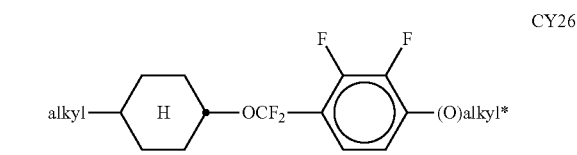
CY27
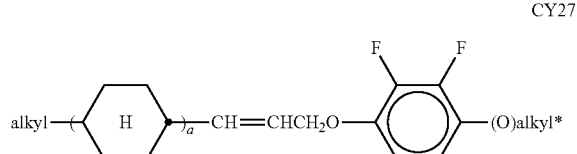
CY28
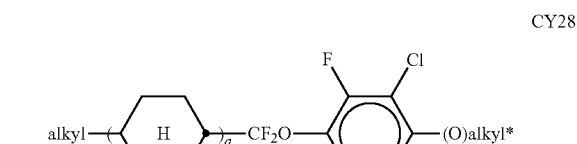
CY29
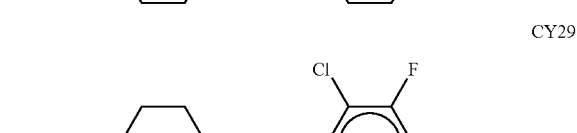
CY30
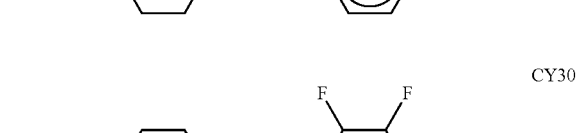

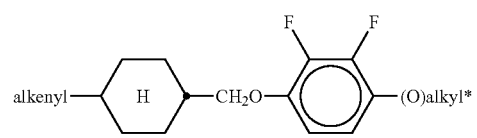
CY31

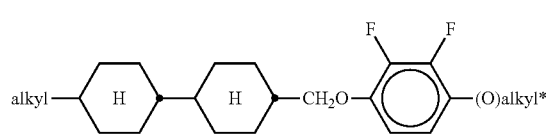
CY32

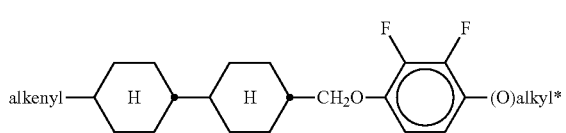
CY33 wherein a denotes 1 or 2, alkyl and alkyl* each, independently of one another, denote a straight-chain alkyl radical having 1-6 C atoms, and alkenyl denotes a straight-chain alkenyl radical having 2-6 C atoms, and (O) denotes an oxygen atom or a single bond. Alkenyl preferably denotes $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

The compounds of the formula PY are preferably selected from the group consisting of the following sub-formulae:

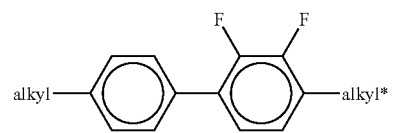
PY1

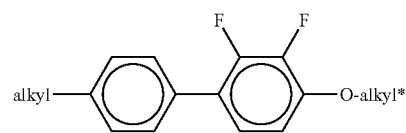
PY2

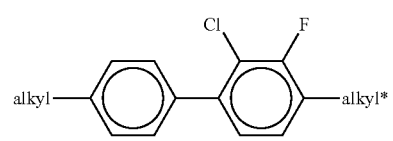
PY3

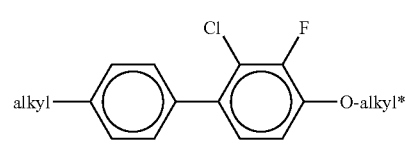
PY4

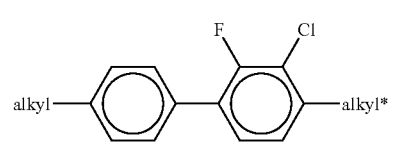
PY5

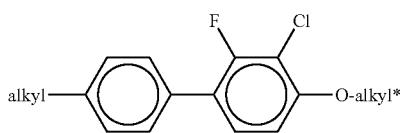
PY6

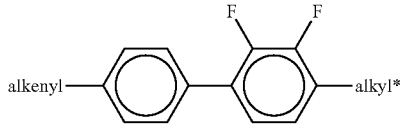
PY7

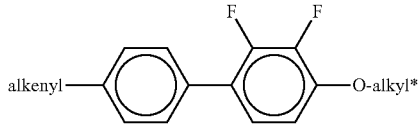
PY8

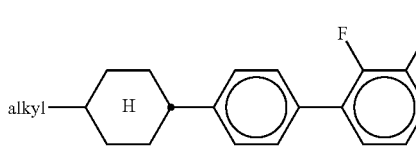
PY9

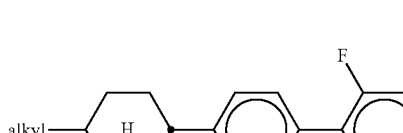
PY10

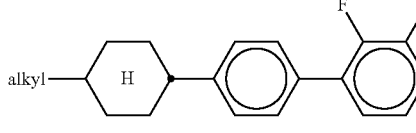
PY11

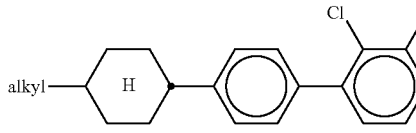
PY12

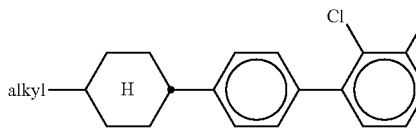
PY13

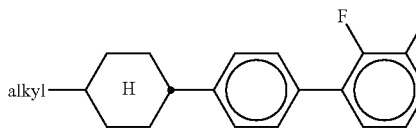
PY14

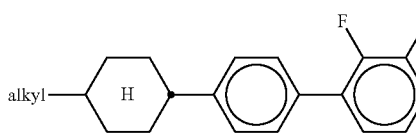
PY15

-continued

PY16
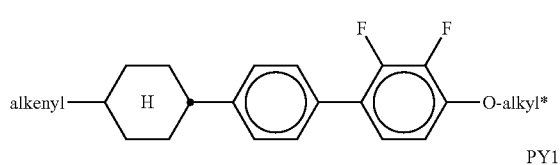

PY17
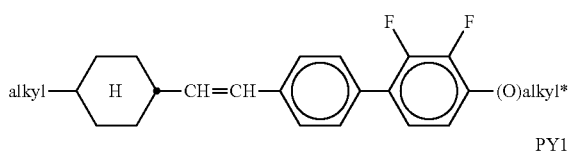

PY18
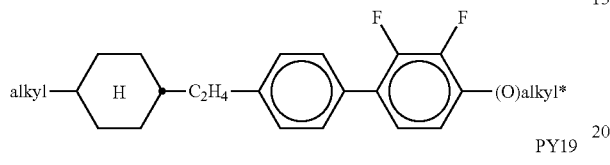

PY19
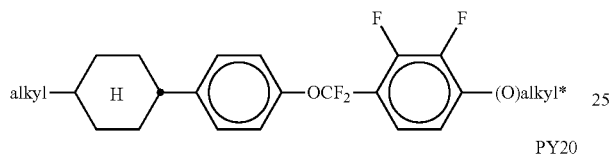

PY20
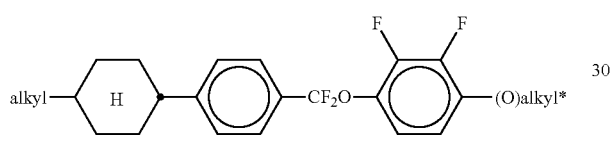

wherein alkyl and alkyl* each, independently of one another, denote a straight-chain alkyl radical having 1-6 C atoms, and alkenyl denotes a straight-chain alkenyl radical having 2-6 C atoms, and (O) denotes an oxygen atom or a single bond. Alkenyl preferably denotes CH$_2$=CH—, CH$_2$=CHCH$_2$CH$_2$—, CH$_3$—CH=CH—, CH$_3$—CH$_2$—CH=CH—, CH$_3$—(CH$_2$)$_2$—CH=CH—, CH$_3$—(CH$_2$)$_3$—CH=CH— or CH$_3$—CH=CH—(CH$_2$)$_2$—.

b) LC medium which additionally comprises one or more compounds of the following formula:

ZK
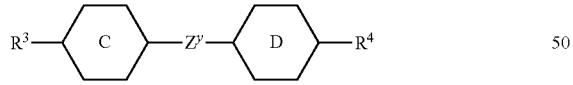

in which the individual radicals have the following meanings:

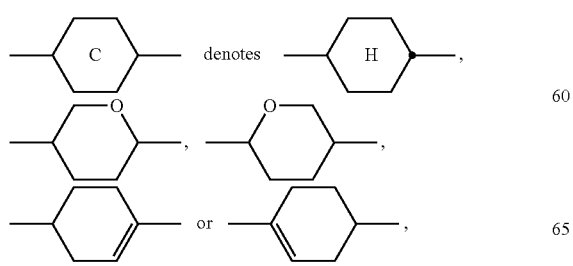

-continued

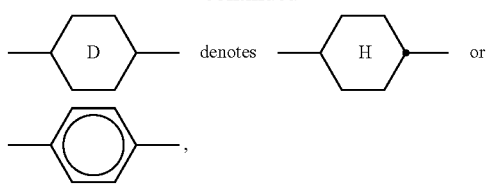

$R^3$ and $R^4$ each, independently of one another, denote alkyl having 1 to 12 C atoms, in which, in addition, one or two non-adjacent CH$_2$ groups may be replaced by —O—, —CH=CH—, —CO—, —O—CO— or —CO—O— in such a way that O atoms are not linked directly to one another, $Z^y$ denotes —CH$_2$CH$_2$—, —CH=CH—, —CF$_2$O—, —OCF$_2$—, —CH$_2$O—, —O CH$_2$—, —CO—O—, —O—CO—, —C$_2$F$_4$—, —CF=CF—, —CH=CH—CH$_2$O— or a single bond, preferably a single bond.

The compounds of the formula ZK are preferably selected from the group consisting of the following sub-formulae:

ZK1
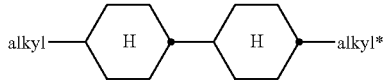

ZK2
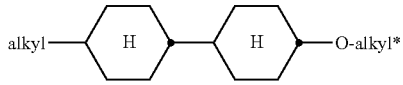

ZK3
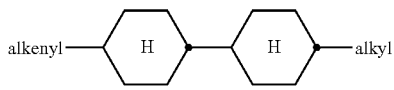

ZK4
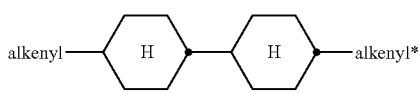

ZK5
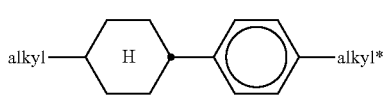

ZK6
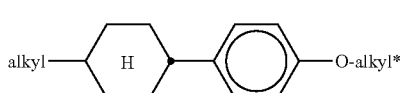

ZK7
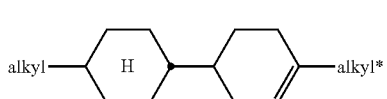

ZK8

ZK9
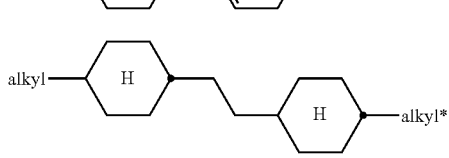

-continued

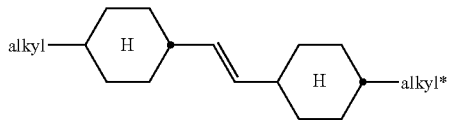
ZK10 in which alkyl and alkyl* each, independently of one another, denote a straight-chain alkyl radical having 1-6 C atoms, and alkenyl denotes a straight-chain alkenyl radical having 2-6 C atoms. Alkenyl preferably denotes $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

Especially preferred are compounds of formula ZK1 and ZK3.

Particularly preferred compounds of formula ZK are selected from the following sub-formulae:

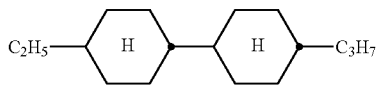
ZK1a

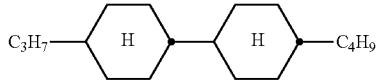
ZK1b

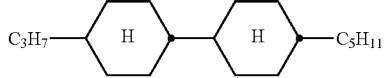
ZK1c

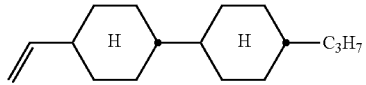
ZK3a

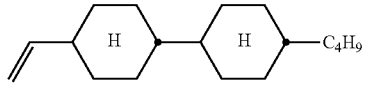
ZK3b

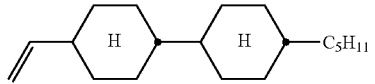
ZK3c

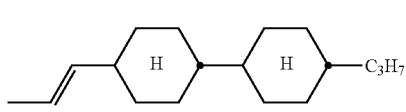
ZK3d wherein the propyl, butyl and pentyl groups are straight-chain groups.

Most preferred are compounds of formula ZK1a and ZK3a.

c) LC medium which additionally comprises one or more compounds of the following formula:

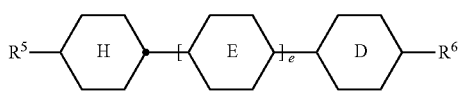
DK in which the individual radicals on each occurrence, identically or differently, have the following meanings:

$R^5$ and $R^6$ each, independently of one another, denote alkyl having 1 to 12 C atoms, where, in addition, one or two non-adjacent $CH_2$ groups may be replaced by —O—, —CH=CH—, —CO—, —OCO— or —COO— in such a way that O atoms are not linked directly to one another, preferably alkyl or alkoxy having 1 to 6 C atoms,

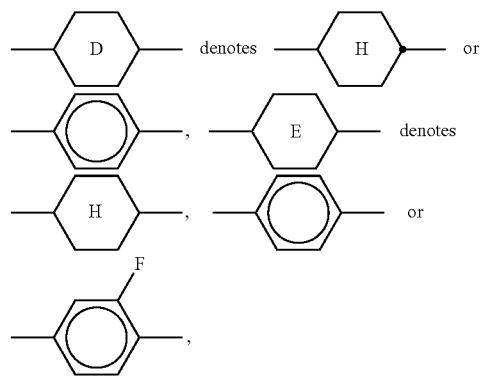

e denotes 1 or 2.

The compounds of the formula DK are preferably selected from the group consisting of the following sub-formulae:

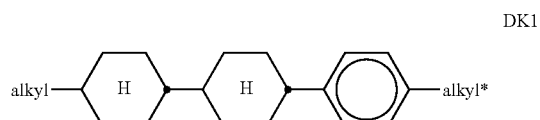
DK1

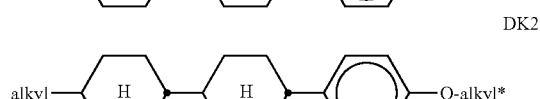
DK2

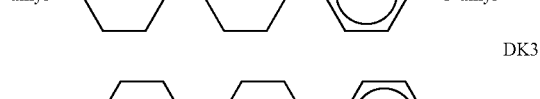
DK3

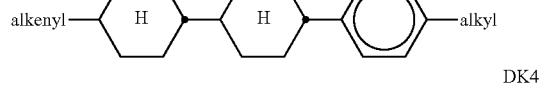
DK4

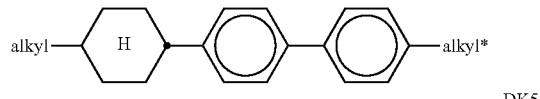
DK5

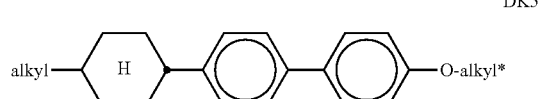
DK6

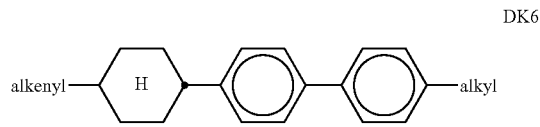
DK7

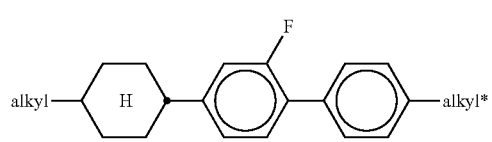

-continued

DK8
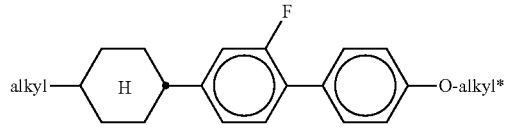

DK9
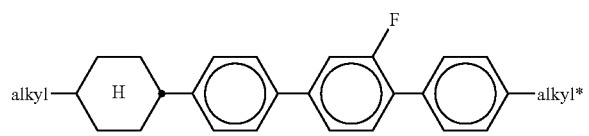

DK10
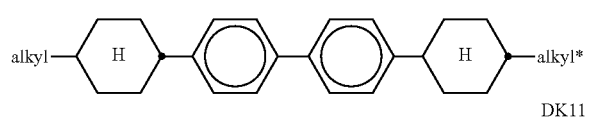

DK11
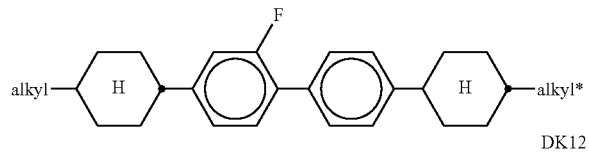

DK12
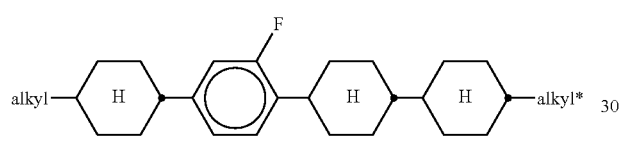

in which alkyl and alkyl* each, independently of one another, denote a straight-chain alkyl radical having 1-6 C atoms, and alkenyl denotes a straight-chain alkenyl radical having 2-6 C atoms. Alkenyl preferably denotes CH$_2$=CH—, CH$_2$=CHCH$_2$CH$_2$—, CH$_3$—CH=CH—, CH$_3$—CH$_2$—CH=CH—, CH$_3$—(CH$_2$)$_2$—CH=CH—, CH$_3$—(CH$_2$)$_3$—CH=CH— or CH$_3$—CH=CH—(CH$_2$)$_2$—.

d) LC medium which additionally comprises one or more compounds of the following formula:

LY
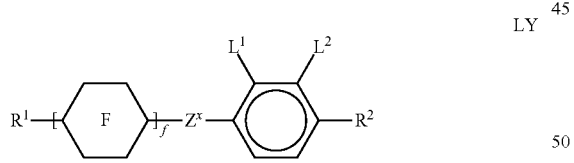

in which the individual radicals have the following meanings:

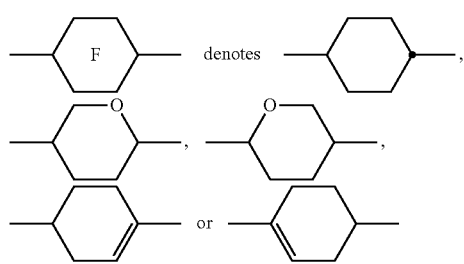

with at least one ring F being different from cyclohexylene, f denotes 1 or 2,

R$^1$ and R$^2$ each, independently of one another, denote alkyl having 1 to 12 C atoms, where, in addition, one or two non-adjacent CH$_2$ groups may be replaced by —O—, —CH=CH—, —CO—, —OCO— or —COO— in such a way that O atoms are not linked directly to one another, Z$^x$ denotes —CH$_2$CH$_2$—, —CH=CH—, —CF$_2$O—, —OCF$_2$—, —CH$_2$O—, —O CH$_2$—, —CO—O—, —O—CO—, —O$_2$F$_4$—, —CF=CF—, —CH=CH—CH$_2$O— or a single bond, preferably a single bond, L$^1$ and L$^2$ each, independently of one another, denote F, Cl, OCF$_3$, CF$_3$, CH$_3$, CH$_2$F, CHF$_2$.

Preferably, both radicals L$^1$ and L$^2$ denote F or one of the radicals L$^1$ and L$^2$ denotes F and the other denotes Cl.

The compounds of the formula LY are preferably selected from the group consisting of the following sub-formulae:

LY1
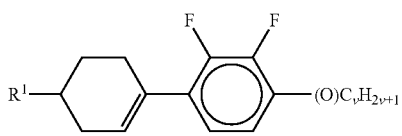

LY2
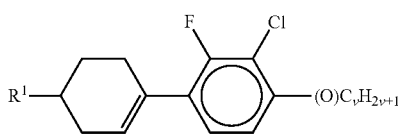

LY3
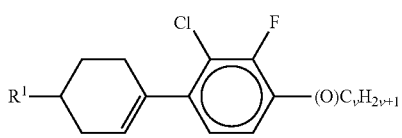

LY4
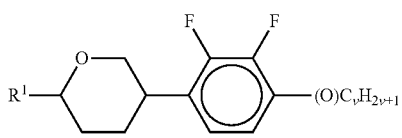

LY5
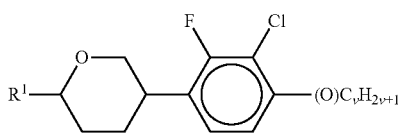

LY6
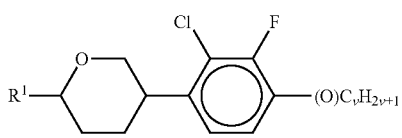

LY7
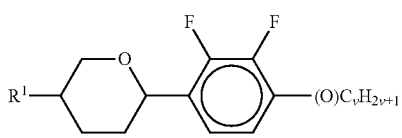

-continued

LY8 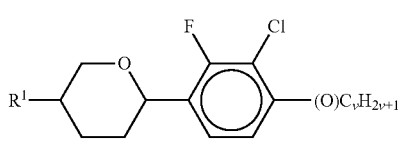

LY9 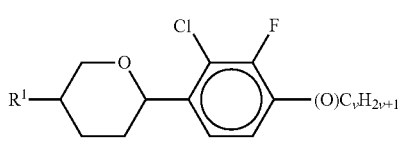

LY10 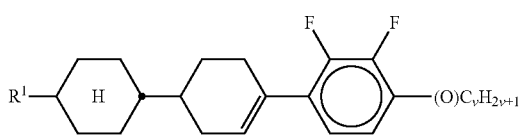

LY11 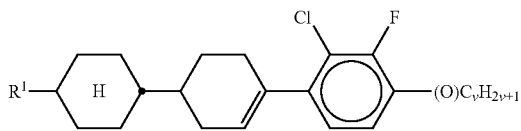

LY12 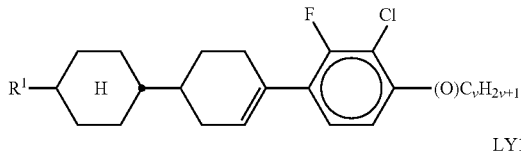

LY13 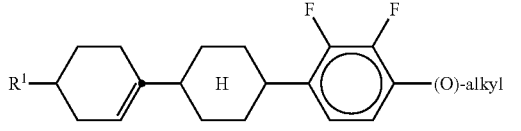

LY14 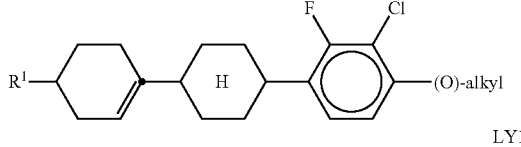

LY15 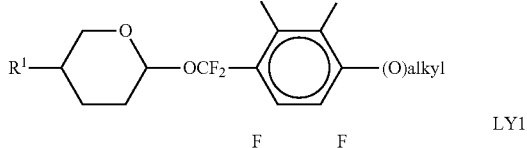

LY16 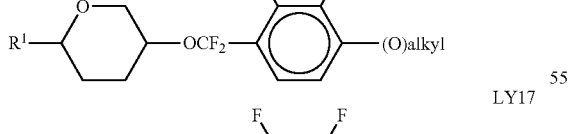

LY17 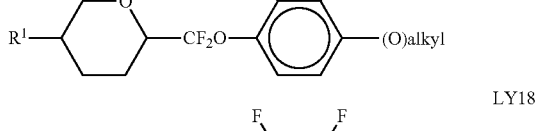

LY18 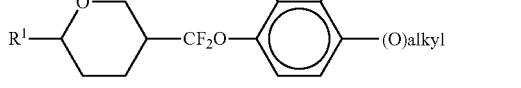

-continued

LY19 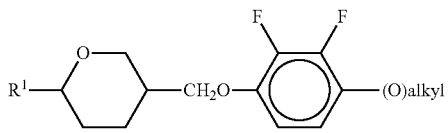

LY20 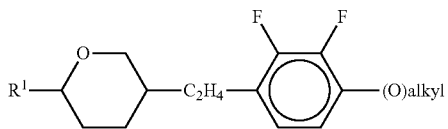

LY21 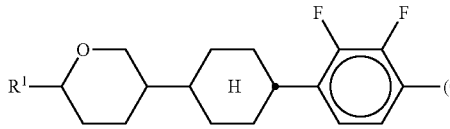

LY22 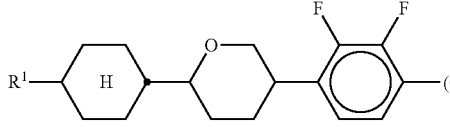

LY23 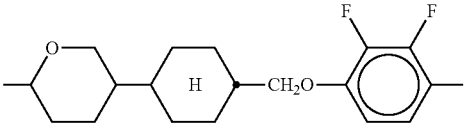

LY24 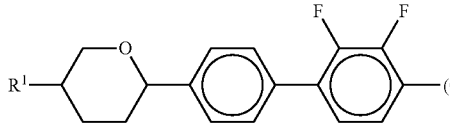

in which $R^1$ has the meaning indicated above, alkyl denotes a straight-chain alkyl radical having 1-6 C atoms, (O) denotes an oxygen atom or a single bond, and v denotes an integer from 1 to 6. $R^1$ preferably denotes straight-chain alkyl having 1 to 6 C atoms or straight-chain alkenyl having 2 to 6 C atoms, in particular $CH_3$, $C_2H_5$, n-$C_3H_7$, n-$C_4H_9$, n-$C_5H_{11}$, $CH_2$=CH—, $CH_2$=CHCH$_2$CH$_2$—, $CH_3$—CH=CH—, $CH_3$—CH$_2$—CH=CH—, $CH_3$—(CH$_2$)$_2$—CH=CH—, $CH_3$—(CH$_2$)$_3$—CH=CH— or $CH_3$—CH=CH—(CH$_2$)$_2$—.

e) LC medium which additionally comprises one or more compounds selected from the group consisting of the following formulae:

G1 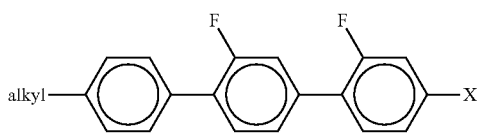

G2 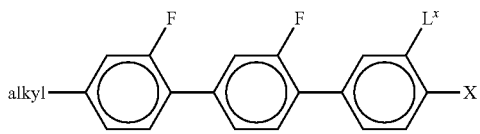

-continued

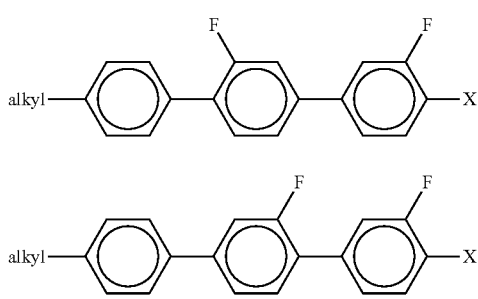
G3

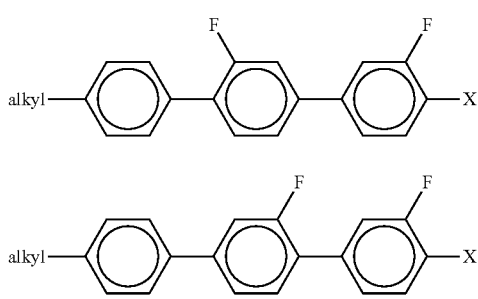
G4 in which alkyl denotes $C_{1-6}$-alkyl, $L^x$ denotes H or F, and X denotes F, Cl, $OCF_3$, $OCHF_2$ or $OCH=CF_2$. Particular preference is given to compounds of the formula G1 in which X denotes F.

f) LC medium which additionally comprises one or more compounds selected from the group consisting of the following formulae:

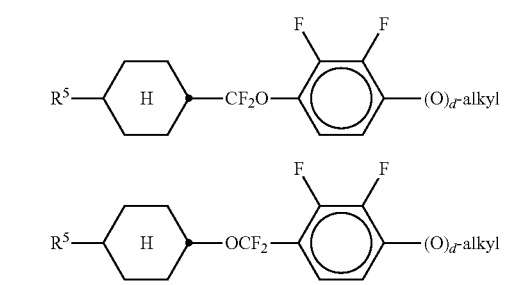
Y1

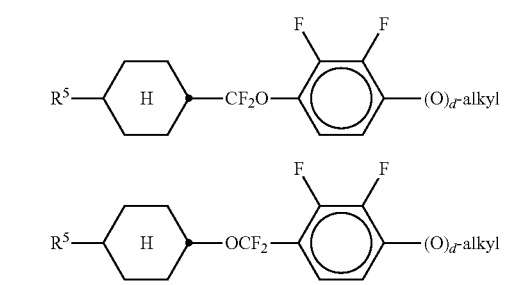
Y2

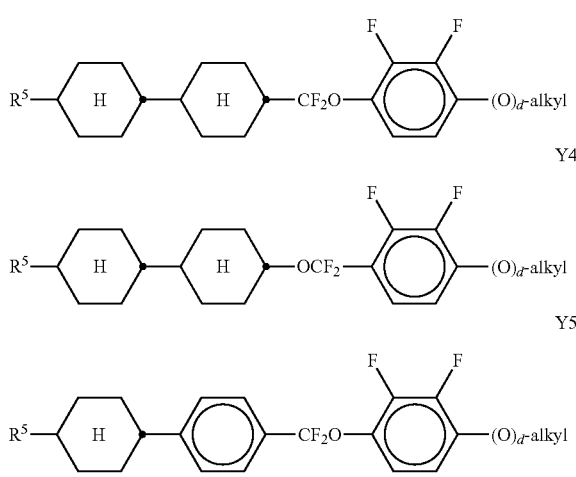
Y3

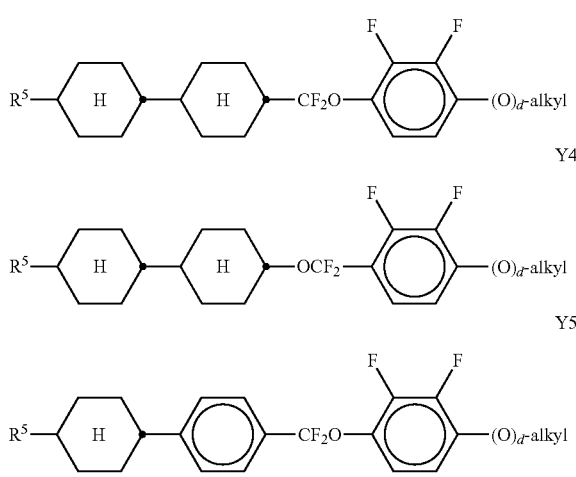
Y4

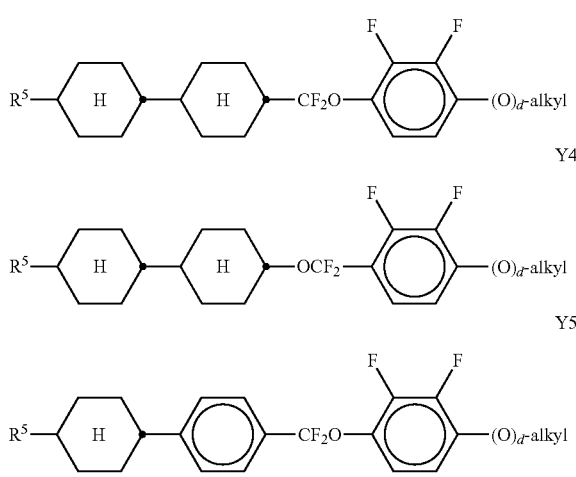
Y5

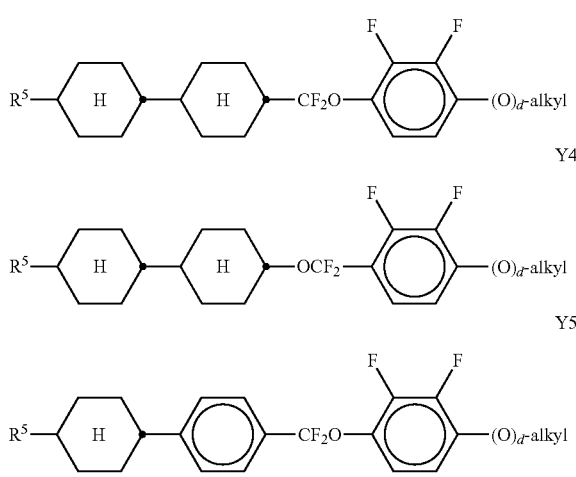
Y6

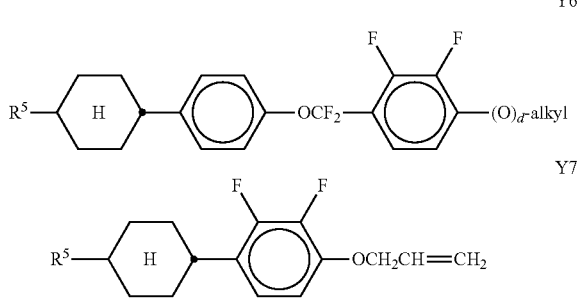
Y7

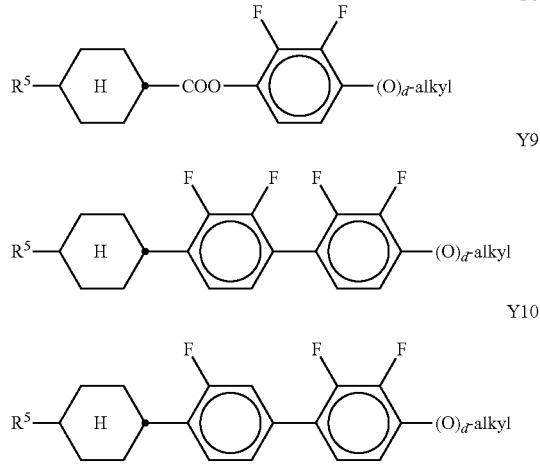
Y8

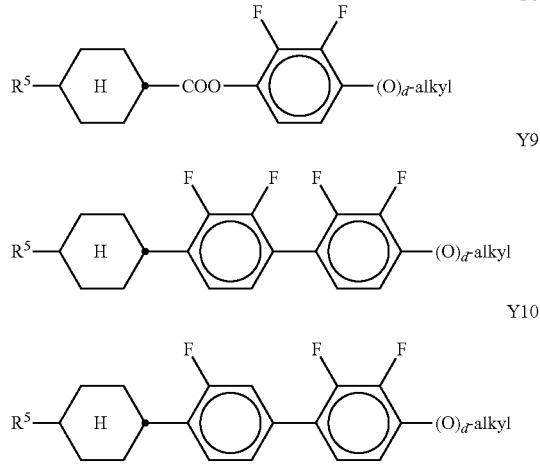
Y9

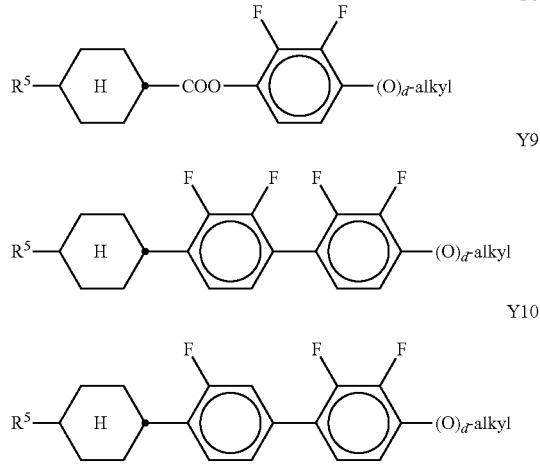
Y10

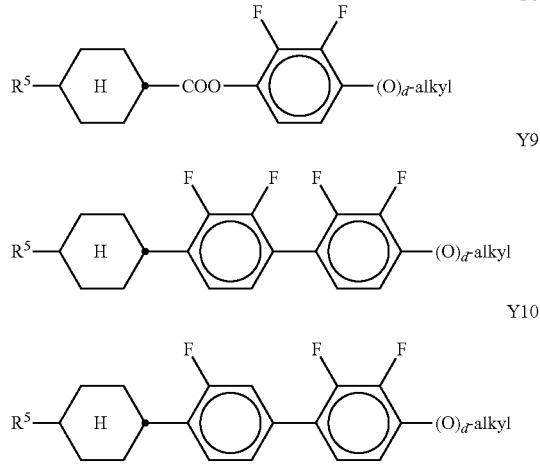
Y11

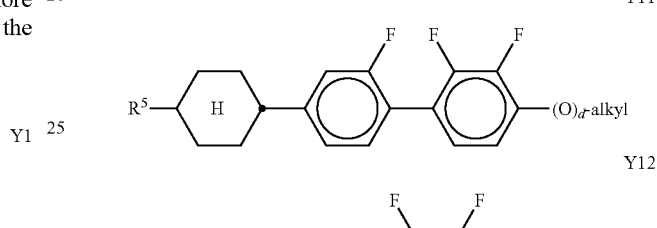
Y12

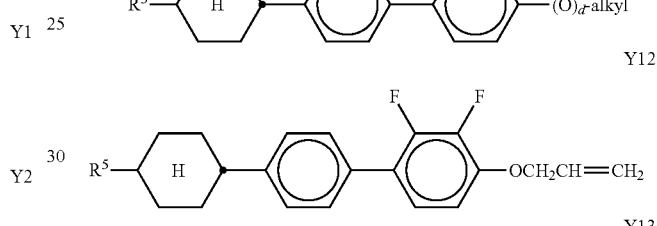
Y13

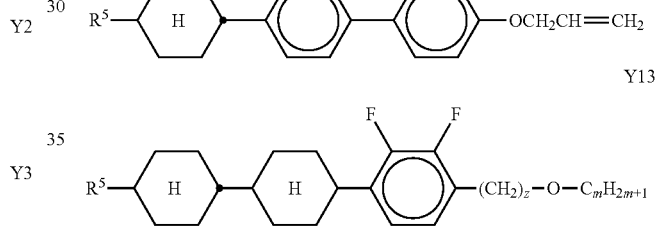
Y14

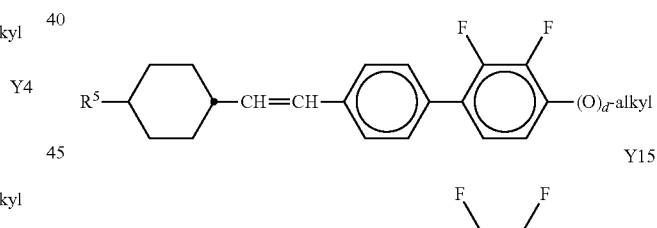
Y15

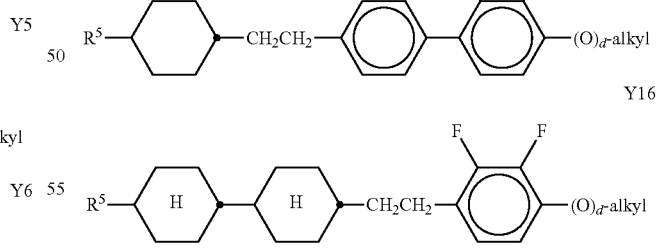
Y16 in which $R^5$ has one of the meanings indicated above for $R^1$, alkyl denotes $C_{1-6}$-alkyl, d denotes 0 or 1, and z and m each, independently of one another, denote an integer from 1 to 6. $R^5$ in these compounds is particularly preferably $C_{1-6}$-alkyl or -alkoxy or $C_{2-6}$-alkenyl, d is preferably 1. The LC medium according to the invention preferably comprises one or more compounds of the above-mentioned formulae in amounts of ≥5% by weight.

g) LC medium which additionally comprises one or more biphenyl compounds selected from the group consisting of the following formulae:

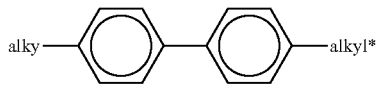
B1

B2

B3 in which alkyl and alkyl* each, independently of one another, denote a straight-chain alkyl radical having 1-6 C atoms, and alkenyl and alkenyl* each, independently of one another, denote a straight-chain alkenyl radical having 2-6 C atoms. Alkenyl and alkenyl* preferably denote $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

The proportion of the biphenyls of the formulae B1 to B3 in the LC mixture is preferably at least 3% by weight, in particular ≥5% by weight.

The compounds of the formula B2 are particularly preferred.

The compounds of the formulae B1 to B3 are preferably selected from the group consisting of the following sub-formulae:

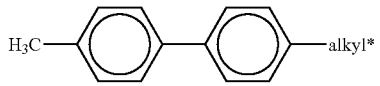
B1a

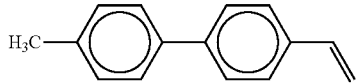
B2a

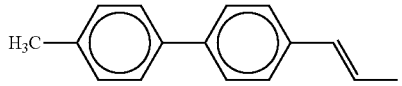
B2b

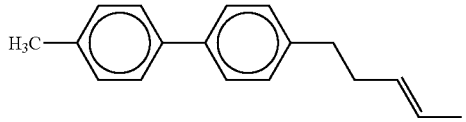
B2c in which alkyl* denotes an alkyl radical having 1-6 C atoms. The medium according to the invention particularly preferably comprises one or more compounds of the formulae B1a and/or B2c.

h) LC medium which additionally comprises one or more terphenyl compounds of the following formula:

T in which $R^5$ and $R^6$ each, independently of one another, have one of the meanings indicated above, and

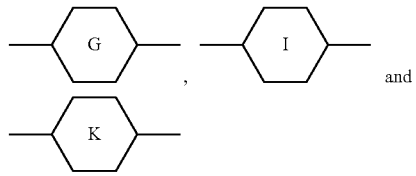

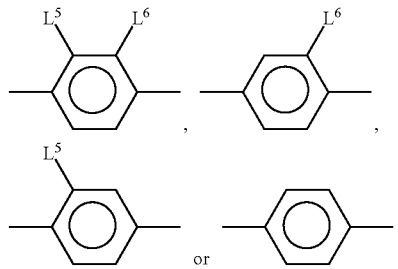

each, independently of one another, denote in which $L^5$ denotes F or Cl, preferably F, and $L^6$ denotes F, Cl, $OCF_3$, $CF_3$, $CH_3$, $CH_2F$ or $CHF_2$, preferably F.

The compounds of the formula T are preferably selected from the group consisting of the following sub-formulae:

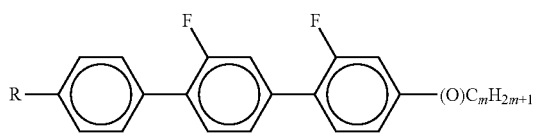
T1

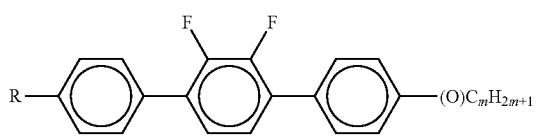
T2

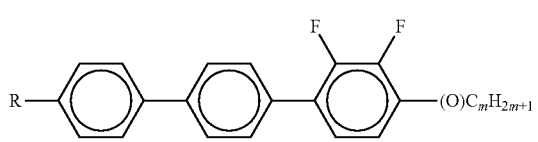
T3

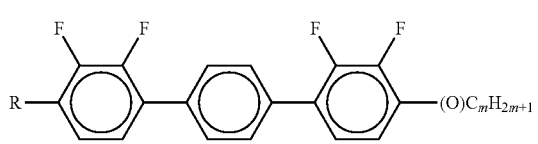
T4

T5
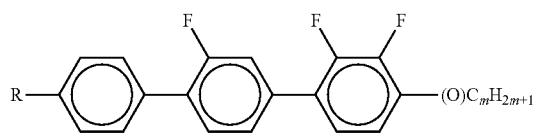
T6
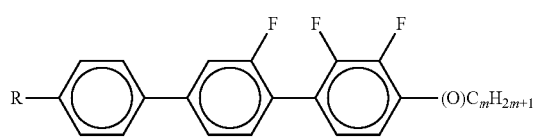
T7
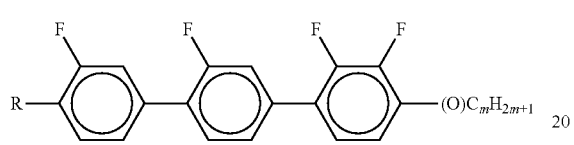
T8
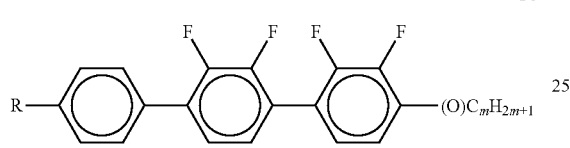
T9
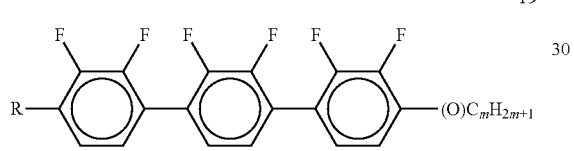
T10
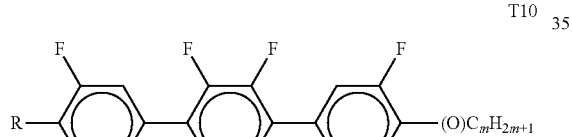
T11
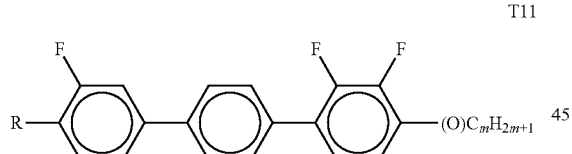
T12
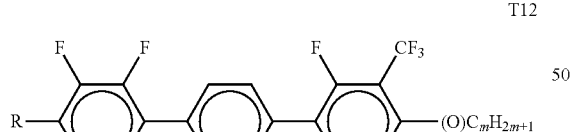
T13
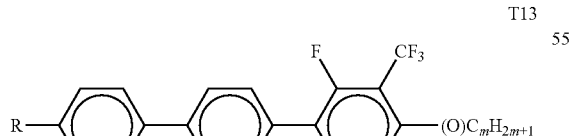
T14
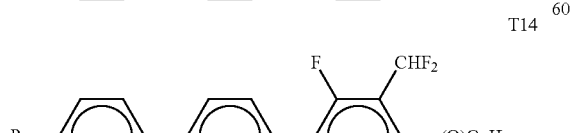
T15
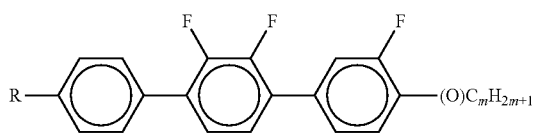
T16
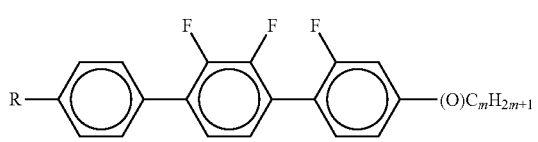
T17
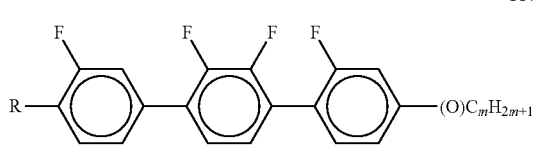
T18
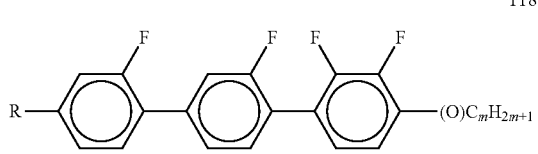
T19
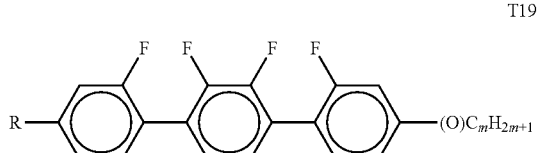
T20
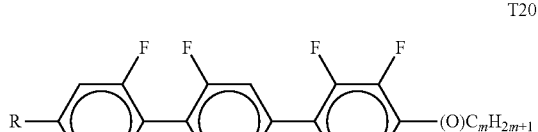
T21
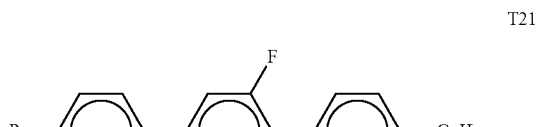
T22
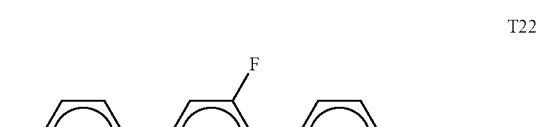
T23
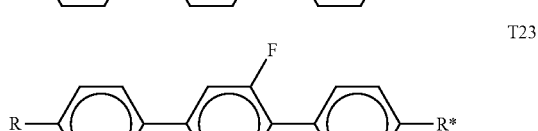
T24
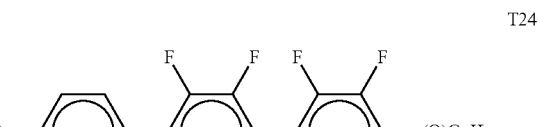

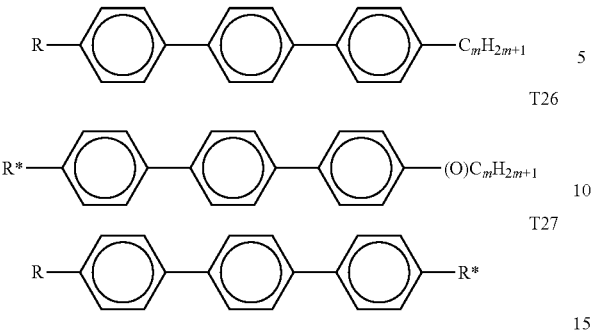

in which R denotes a straight-chain alkyl or alkoxy radical having 1-7 C atoms, R* denotes a straight-chain alkenyl radical having 2-7 C atoms, (O) denotes an oxygen atom or a single bond, and m denotes an integer from 1 to 6. R* preferably denotes $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

R preferably denotes methyl, ethyl, propyl, butyl, pentyl, hexyl, methoxy, ethoxy, propoxy, butoxy or pentoxy.

The LC medium according to the invention preferably comprises the terphenyls of the formula T and the preferred sub-formulae thereof in an amount of 0.5-30% by weight, in particular 1-20% by weight.

Particular preference is given to compounds of the formulae T1, T2, T3 and T21. In these compounds, R preferably denotes alkyl, furthermore alkoxy, each having 1-5 C atoms.

The terphenyls are preferably employed in mixtures according to the invention if the Δn value of the mixture is to be ≥0.1. Preferred mixtures comprise 2-20% by weight of one or more terphenyl compounds of the formula T, preferably selected from the group of compounds T1 to T22.

i) LC medium which additionally comprises one or more compounds selected from the group consisting of the following formulae:

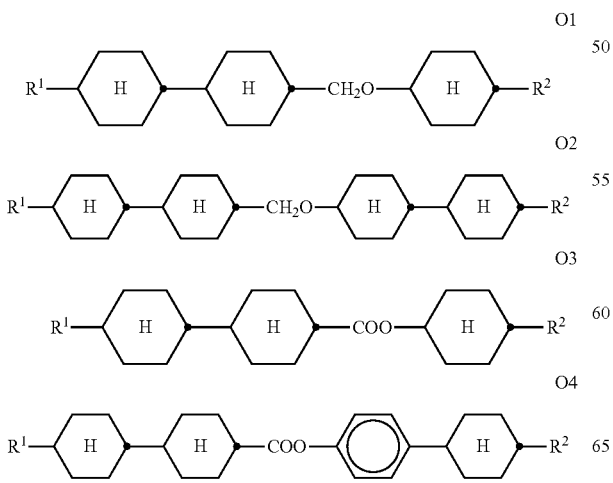

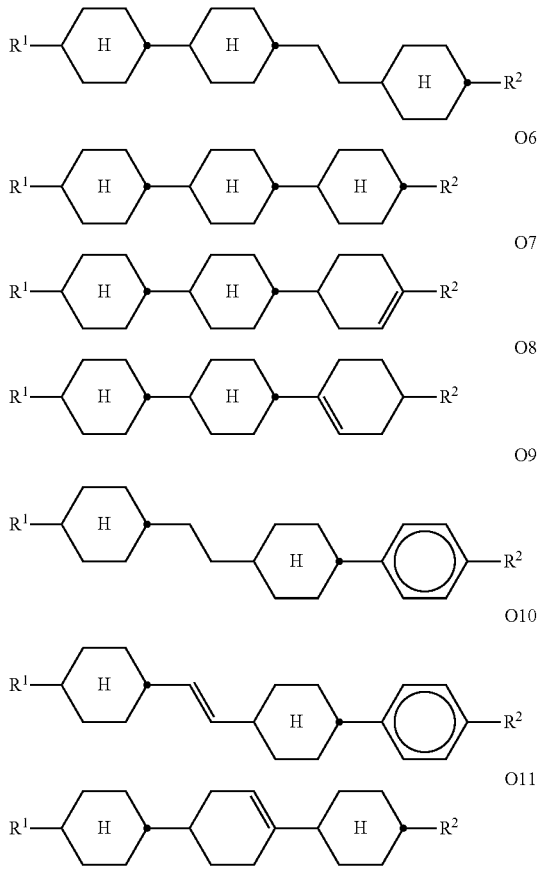

in which $R^1$ and $R^2$ have the meanings indicated above and preferably each, independently of one another, denote straight-chain alkyl having 1 to 6 C atoms or straight-chain alkenyl having 2 to 6 C atoms.

Preferred media comprise one or more compounds selected from the formulae O1, O3 and O4.

k) LC medium which additionally comprises one or more compounds of the following formula:

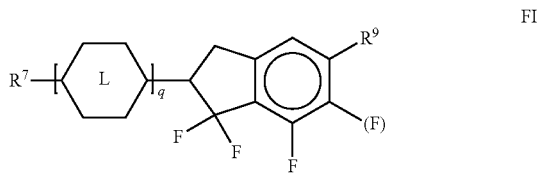

in which

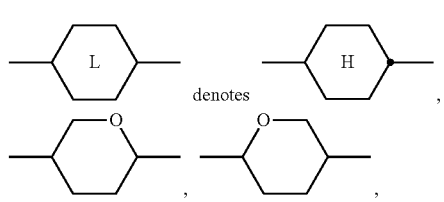

denotes

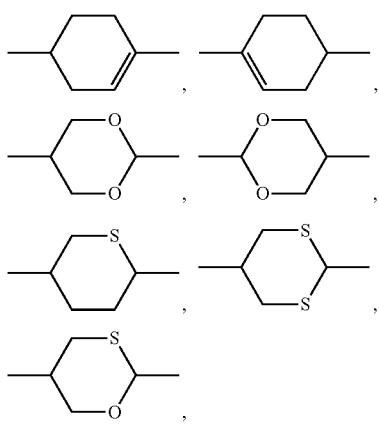

R⁹ denotes H, CH₃, C₂H₅ or n-C₃H₇, (F) denotes an optional fluorine substituent, and q denotes 1, 2 or 3, and R⁷ has one of the meanings indicated for R¹, preferably in amounts of >3% by weight, in particular ≥5% by weight and very particularly preferably 5-30% by weight.

Particularly preferred compounds of the formula FI are selected from the group consisting of the following sub-formulae:

FI1

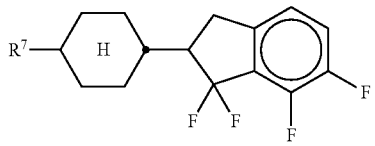

FI2

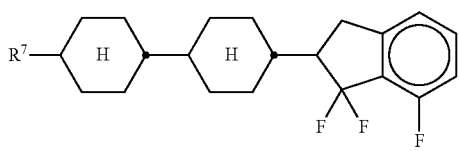

FI3

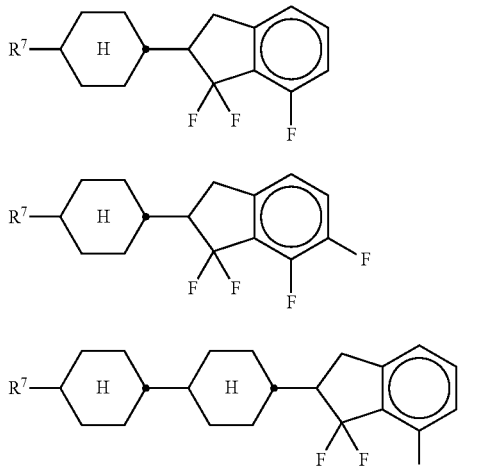

FI4

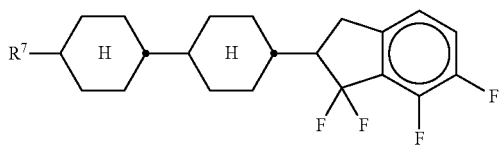

FI5

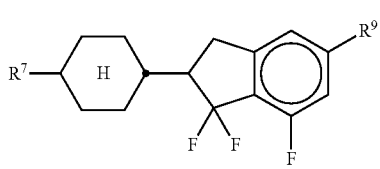

FI6

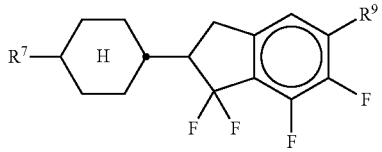

FI7

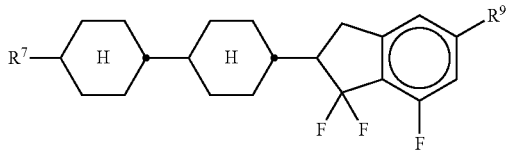

FI8

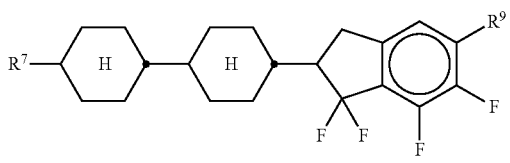

in which R⁷ preferably denotes straight-chain alkyl, and R⁹ denotes CH₃, C₂H₅ or n-C₃H₇. Particular preference is given to the compounds of the formulae FI1, FI2 and FI3.

l) LC medium which additionally comprises one or more compounds selected from the group consisting of the following formulae:

VK1

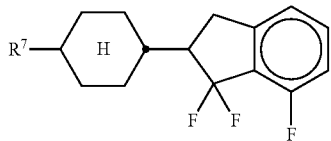

VK2

VK3

VK4

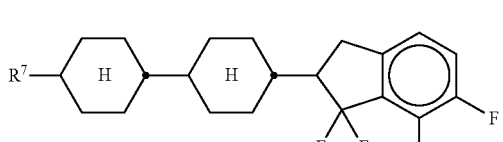

in which R⁸ has the meaning indicated for R¹, and alkyl denotes a straight-chain alkyl radical having 1-6 C atoms.

m) LC medium which additionally comprises one or more compounds which contain a tetrahydronaphthyl or naphthyl unit, such as, for example, the compounds selected from the group consisting of the following formulae:

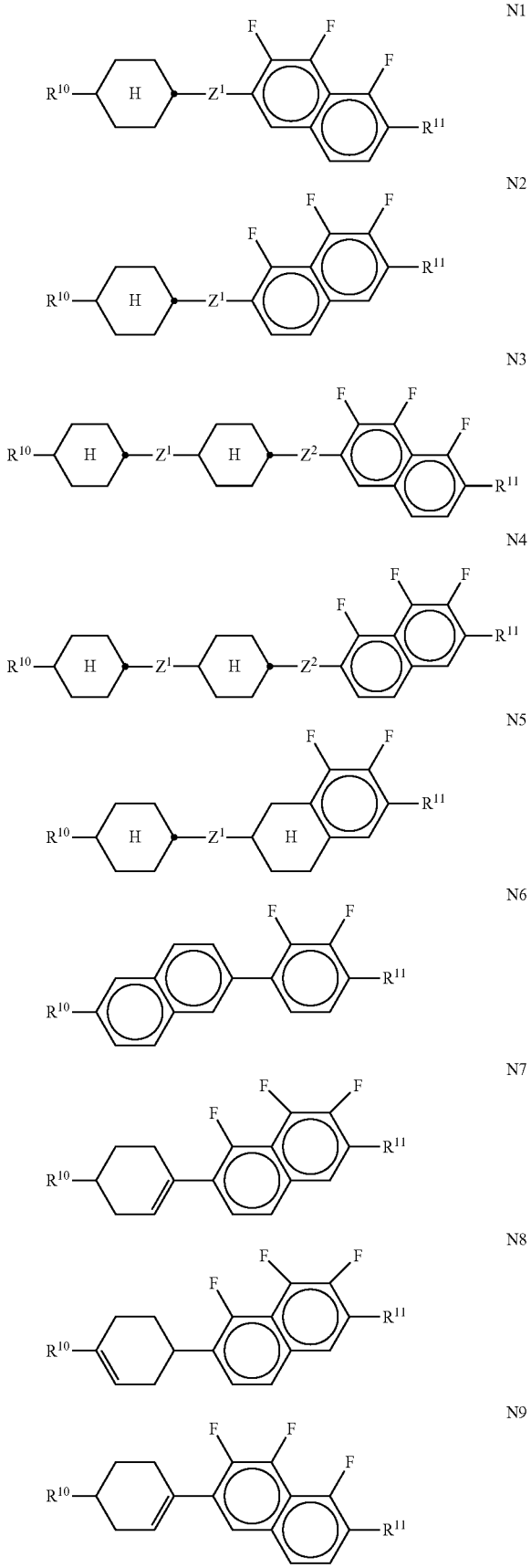

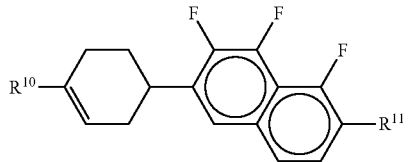

in which
R¹⁰ and R¹¹ each, independently of one another, denote alkyl having 1 to 12 C atoms, where, in addition, one or two non-adjacent CH₂ groups may be replaced by —O—, —CH=CH—, —CO—, —OCO— or —COO— in such a way that O atoms are not linked directly to one another, preferably alkyl or alkoxy having 1 to 6 C atoms,
and R¹⁰ and R¹¹ preferably denote straight-chain alkyl or alkoxy having 1 to 6 C atoms or straight-chain alkenyl having 2 to 6 C atoms, and
$Z^1$ and $Z^2$ each, independently of one another, denote —C₂H₄—, —CH=CH—, —(CH₂)₄—, —(CH₂)₃O—, —O(CH₂)₃—, —CH=CH—CH₂CH₂—, —CH₂CH₂CH=CH—, —CH₂O—, —OCH₂—, —CO—O—, —O—CO—, —C₂F₄—, —CF=CF—, —CF=CH—, —CH=CF—, —CH₂— or a single bond.

n) LC medium which additionally comprises one or more difluorodibenzo-chromans and/or chromanes of the following formulae:

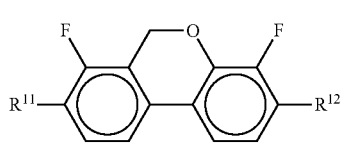

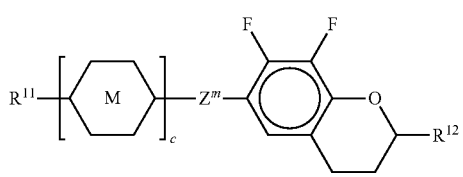

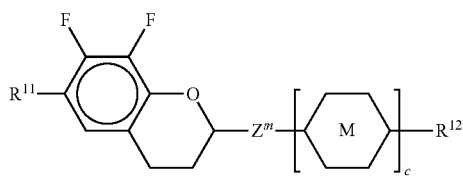

in which
$R^{11}$ and $R^{12}$ each, independently of one another, have one of the meanings indicated above for $R^{11}$,
ring M is trans-1,4-cyclohexylene or 1,4-phenylene,
$Z^m$ —C₂H₄—, —CH₂O—, —OCH₂—, —CO—O— or —O—CO—,
c is 0, 1 or 2,
preferably in amounts of 3 to 20% by weight, in particular in amounts of 3 to 15% by weight.
Particularly preferred compounds of the formulae BC, CR and RC are selected from the group consisting of the following sub-formulae:

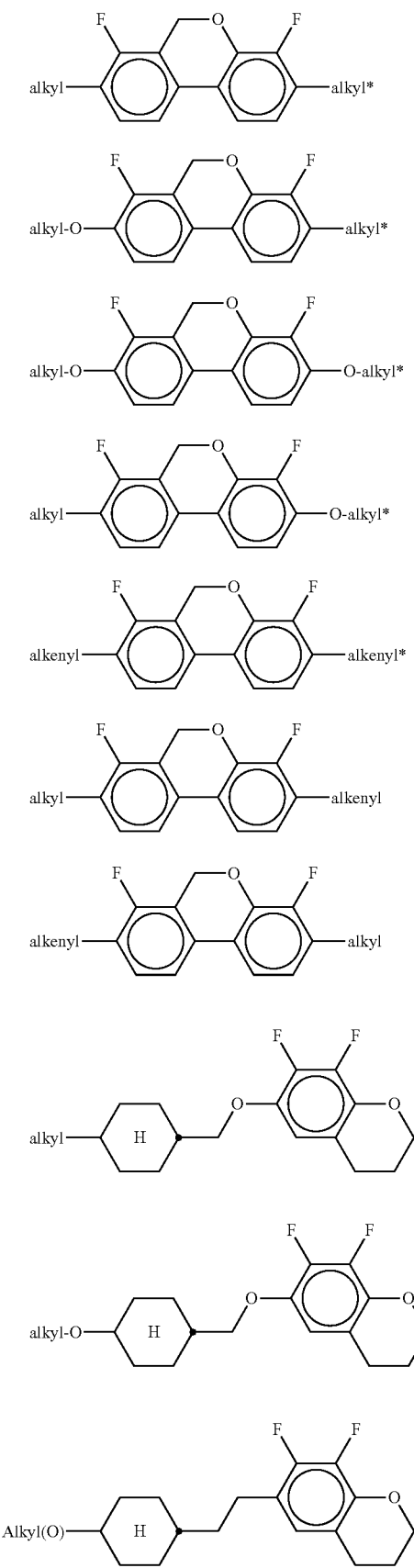
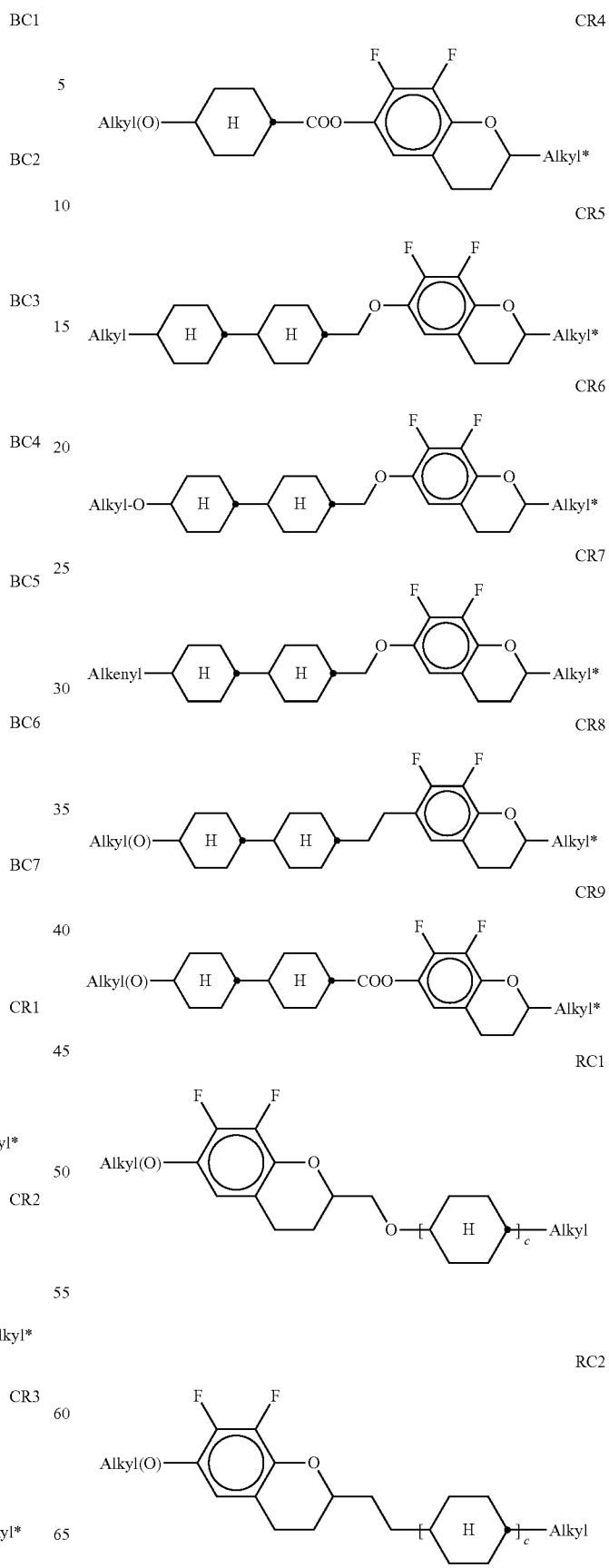

-continued

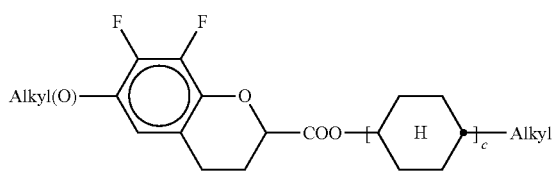
RC3 in which alkyl and alkyl* each, independently of one another, denote a straight-chain alkyl radical having 1-6 C atoms, (O) denotes an oxygen atom or a single bond, c is 1 or 2, and alkenyl and alkenyl* each, independently of one another, denote a straight-chain alkenyl radical having 2-6 C atoms. Alkenyl and alkenyl* preferably denote $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

Very particular preference is given to mixtures comprising one, two or three compounds of the formula BC-2.

o) LC medium which additionally comprises one or more fluorinated phenanthrenes and/or dibenzofurans of the following formulae:

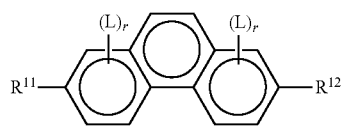
PH

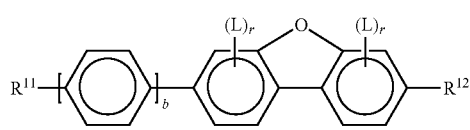
BF in which $R^{11}$ and $R^{12}$ each, independently of one another, have one of the meanings indicated above for $R^{11}$, b denotes 0 or 1, L denotes F, and r denotes 1, 2 or 3.

Particularly preferred compounds of the formulae PH and BF are selected from the group consisting of the following sub-formulae:

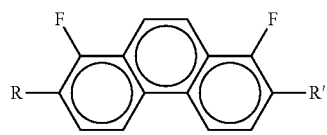
PH1

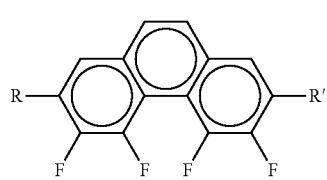
PH2

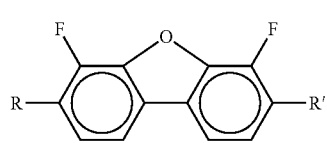
BF1

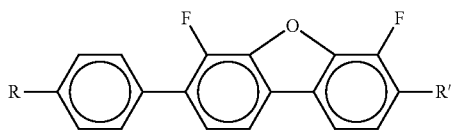
BF2 in which R and R' each, independently of one another, denote a straight-chain alkyl or alkoxy radical having 1-7 C atoms.

p) LC medium which additionally comprises one or more monocyclic compounds of the following formula

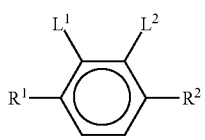
Y wherein $R^1$ and $R^2$ each, independently of one another, denote alkyl having 1 to 12 C atoms, where, in addition, one or two non-adjacent $CH_2$ groups may be replaced by $-O-$, $-CH=CH-$, $-CO-$, $-OCO-$ or $-COO-$ in such a way that O atoms are not linked directly to one another, preferably alkyl or alkoxy having 1 to 6 C atoms, $L^1$ and $L^2$ each, independently of one another, denote F, Cl, $OCF_3$, $CF_3$, $CH_3$, $CH_2F$, $CHF_2$.

Preferably, both $L^1$ and $L^2$ denote F or one of $L^1$ and $L^2$ denotes F and the other denotes Cl, The compounds of the formula Y are preferably selected from the group consisting of the following sub-formulae:

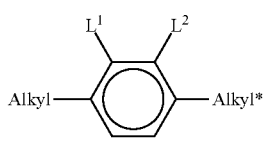
Y1

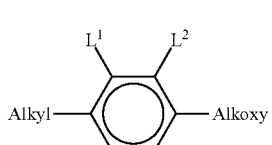
Y2

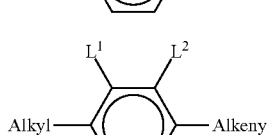
Y3

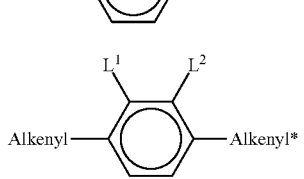
Y4

-continued

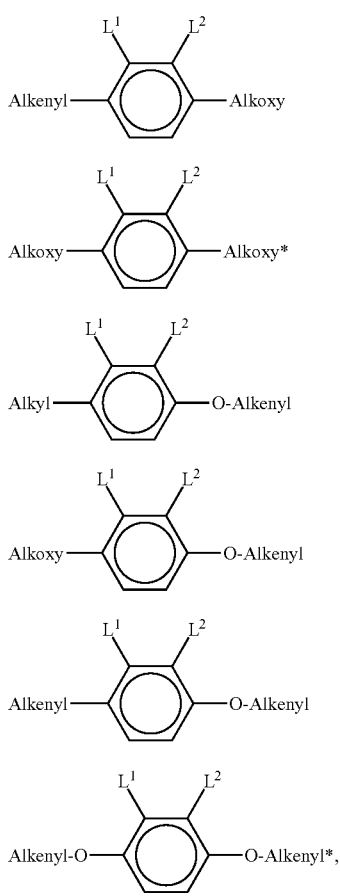

Y5
Y6
Y7
Y8
Y9
Y10 in which, Alkyl and Alkyl* each, independently of one another, denote a straight-chain alkyl radical having 1-6 C atoms, Alkoxy denotes a straight-chain alkoxy radical having 1-6 C atoms, Alkenyl and Alkenyl* each, independently of one another, denote a straight-chain alkenyl radical having 2-6 C atoms, and O denotes an oxygen atom or a single bond. Alkenyl and Alkenyl* preferably denote $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

Particularly preferred compounds of the formula Y are selected from the group consisting of the following sub-formulae:

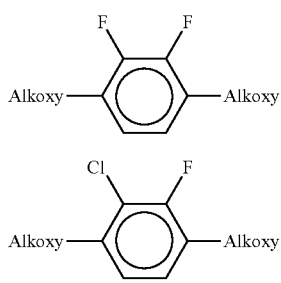

Y6A
Y6B wherein Alkoxy preferably denotes straight-chain alkoxy with 3, 4, or 5 C atoms.

q) LC medium which, apart from the stabilisers according to the invention, in particular of the formula I or sub-formulae thereof and the comonomers, comprises no compounds which contain a terminal vinyloxy group ($-O-CH=CH_2$).

r) LC medium which comprises 1 to 5, preferably 1, 2 or 3, stabilisers, preferably selected from stabilisers according to the invention, in particular of the formula I or sub-formulae thereof.

s) LC medium in which the proportion of stabilisers, in particular of the formula I or sub-formulae thereof, in the mixture as a whole is 1 to 1500 ppm, preferably 100 to 1000 ppm.

t) LC medium which comprises 1 to 8, preferably 1 to 5, compounds of the formulae CY1, CY2, PY1 and/or PY2. The proportion of these compounds in the mixture as a whole is preferably 5 to 60%, particularly preferably 10 to 35%. The content of these individual compounds is preferably in each case 2 to 20%.

u) LC medium which comprises 1 to 8, preferably 1 to 5, compounds of the formulae CY9, CY10, PY9 and/or PY10. The proportion of these compounds in the mixture as a whole is preferably 5 to 60%, particularly preferably 10 to 35%. The content of these individual compounds is preferably in each case 2 to 20%.

v) LC medium which comprises 1 to 10, preferably 1 to 8, compounds of the formula ZK, in particular compounds of the formulae ZK1, ZK2 and/or ZK6. The proportion of these compounds in the mixture as a whole is preferably 3 to 25%, particularly preferably 5 to 45%. The content of these individual compounds is preferably in each case 2 to 20%.

w) LC medium in which the proportion of compounds of the formulae CY, PY and ZK in the mixture as a whole is greater than 70%, preferably greater than 80%.

x) LC medium in which the LC host mixture contains one or more compounds containing an alkenyl group, preferably selected from the group consisting of formula CY, PY and LY, wherein one or both of $R^1$ and $R^2$ denote straight-chain alkenyl having 2-6 C atoms, formula ZK and DK, wherein one or both of $R^3$ and $R^4$ or one or both of $R^5$ and $R^6$ denote straight-chain alkenyl having 2-6 C atoms, and formula B2 and B3, very preferably selected from formulae CY15, CY16, CY24, CY32, PY15, PY16, ZK3, ZK4, DK3, DK6, B2 and B3, most preferably selected from formulae ZK3, ZK4, B2 and B3. The concentration of these compounds in the LC host mixture is preferably from 2 to 70%, very preferably from 3 to 55%.

y) LC medium which contains one or more, preferably 1 to 5, compounds selected of formula PY1-PY8, very preferably of formula PY2. The proportion of these compounds in the mixture as a whole is preferably 1 to 30%, particularly preferably 2 to 20%. The content of these individual compounds is preferably in each case 1 to 20%.

z) LC medium which contains one or more, preferably 1, 2 or 3, compounds of formula T2. The content of these compounds in the mixture as a whole is preferably 1 to 20%.

In another embodiment of the present invention the LC medium contains an LC host mixture with positive dielectric anisotropy. Preferred embodiments of such an LC medium, and the corresponding LC host mixture, are those of sections aa)-mmm) below:

aa) LC-medium, characterised in that it comprises one or more compounds selected from the group of compounds of the formulae II and III

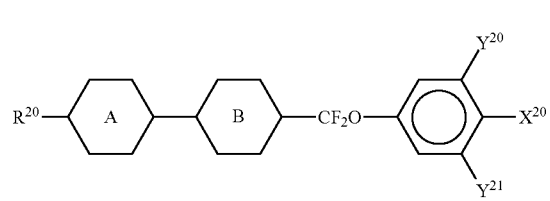

II

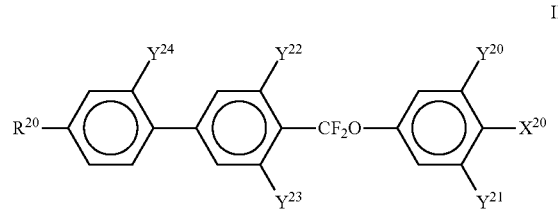

III wherein

R[20] each, identically or differently, denote a halogenated or unsubstituted alkyl or alkoxy radical having 1 to 15 C atoms, where, in addition, one or more CH$_2$ groups in these radicals may each be replaced, independently of one another, by —C≡C—, —CF$_2$O—, —CH=CH—,

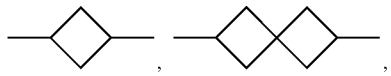

—O—, —CO—O— or —O—CO— in such a way that O atoms are not linked directly to one another, X[20] each, identically or differently, denote F, Cl, CN, SF$_5$, SCN, NCS, a halogenated alkyl radical, a halogenated alkenyl radical, a halogenated alkoxy radical or a halogenated alkenyloxy radical, each having up to 6 C atoms, and Y[20-24] each, identically or differently, denote H or F;

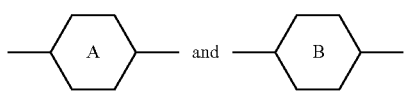

each, independently of one another, denote

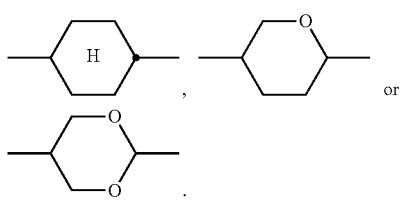

The compounds of the formula II are preferably selected from the following formulae:

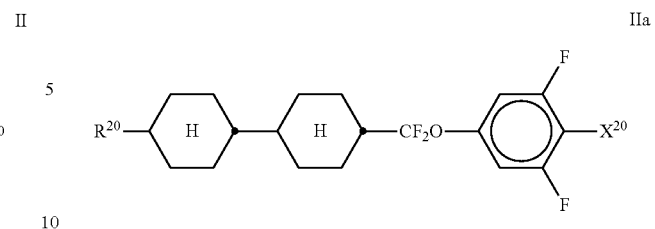

IIa

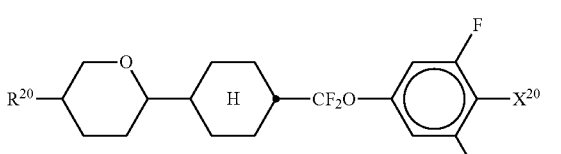

IIb

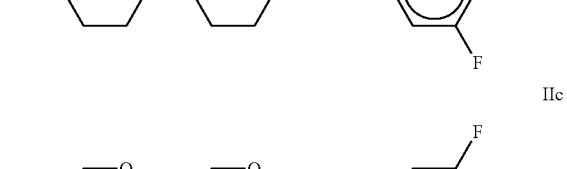

IIc

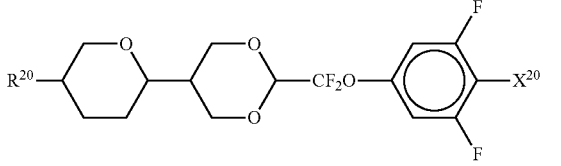

IId

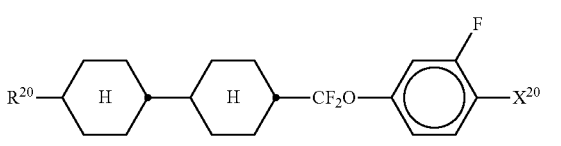

IIe

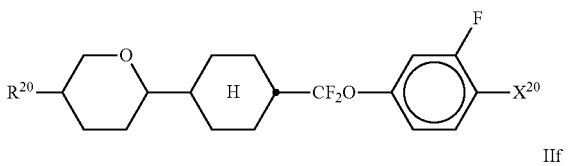

IIf

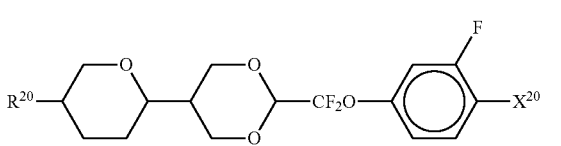

wherein R[20] and X[20] have the meanings indicated above.

R[20] preferably denotes alkyl having 1 to 6 C atoms. X[20] preferably denotes F. Particular preference is given to compounds of the formulae IIa and IIb, in particular compounds of the formulae IIa and IIb wherein X denotes F.

The compounds of the formula III are preferably selected from the following formulae:

IIIa

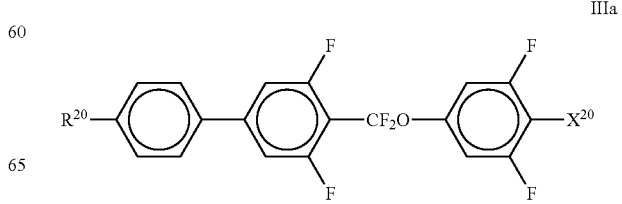

-continued

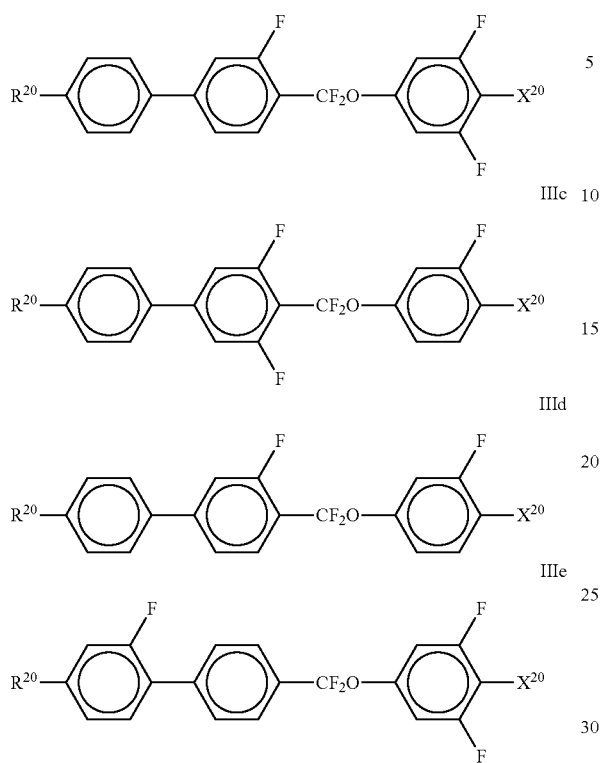

wherein $R^{20}$ and $X^{20}$ have the meanings indicated above. $R^{20}$ preferably denotes alkyl having 1 to 6 C atoms. $X^{20}$ preferably denotes F. Particular preference is given to compounds of the formulae IIIa and IIIe, in particular compounds of the formula IIIa;

bb) LC-medium additionally comprising one or more compounds selected from the following formulae:

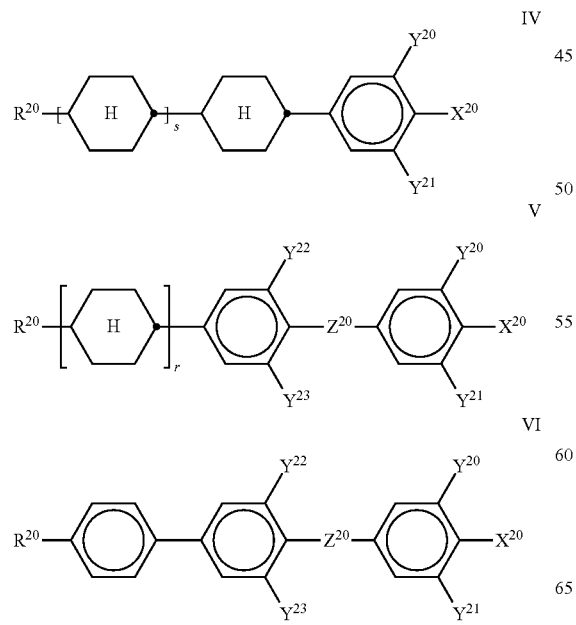

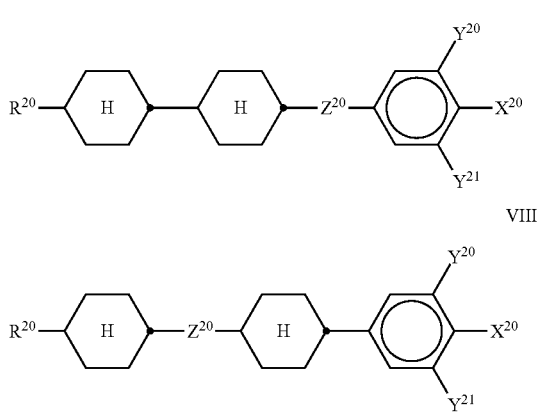

wherein $R^{20}$, $X^{20}$ and $Y^{20-23}$ have the meanings indicated above, and $Z^{20}$ denotes —$C_2H_4$—, —$(CH_2)_4$—, —CH=CH—, —CF=CF—, —$C_2F_4$—, —$CH_2CF_2$—, —$CF_2CH_2$—, —$CH_2O$—, —$OCH_2$—, —COO— or —$OCF_2$—, in formulae V and VI also a single bond, in formulae V and VIII also —$CF_2O$—, r denotes 0 or 1, and s denotes 0 or 1;

The compounds of the formula IV are preferably selected from the following formulae:

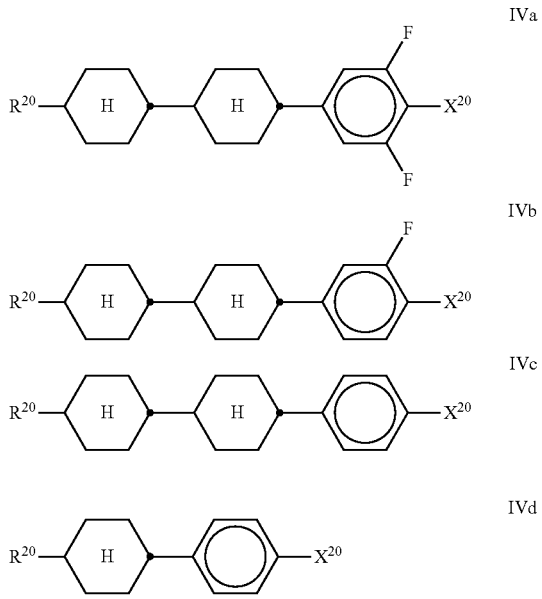

wherein $R^{20}$ and $X^{20}$ have the meanings indicated above. $R^{20}$ preferably denotes alkyl having 1 to 6 C atoms. $X^{20}$ preferably denotes F or $OCF_3$, furthermore OCF=$CF_2$ or Cl;

The compounds of the formula V are preferably selected from the following formulae:

Va
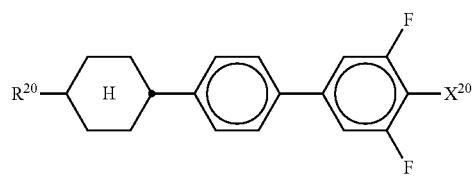

Vb
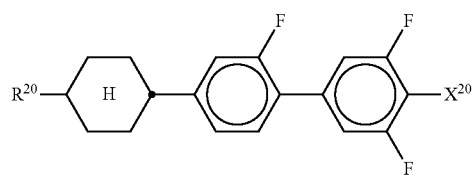

Vc
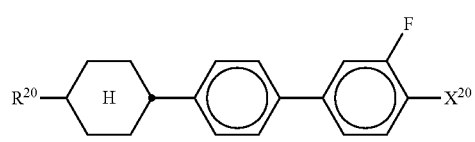

Vd
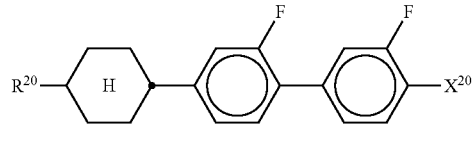

Ve
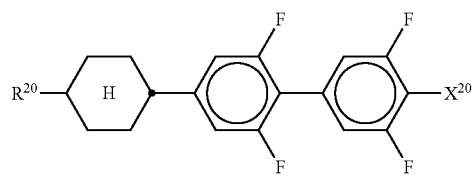

Vf

Vg
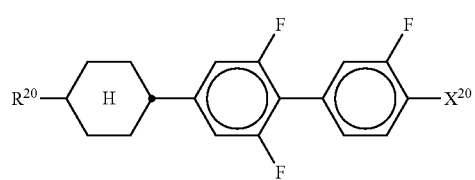

Vh
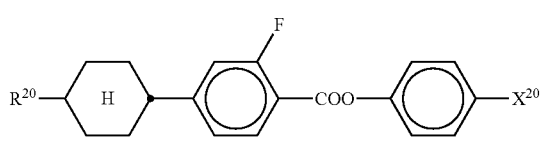

wherein $R^{20}$ and $X^{20}$ have the meanings indicated above. $R^{20}$ preferably denotes alkyl having 1 to 6 C atoms. $X^{20}$ preferably denotes F and $OCF_3$, furthermore $OCHF_2$, $CF_3$, $OCF{=}CF_2$ and $OCH{=}CF_2$;

The compounds of the formula VI are preferably selected from the following formulae:

VIa
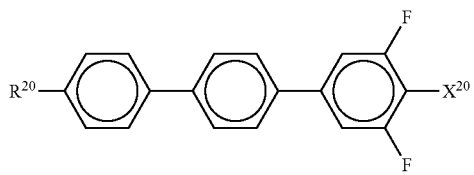

VIb
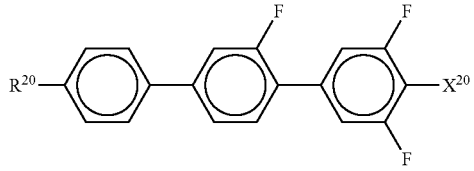

VIc
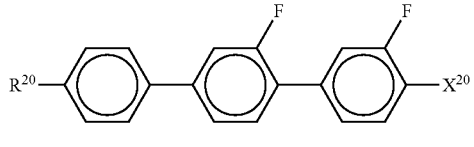

VId
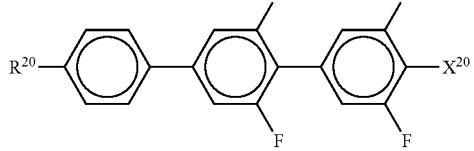

wherein $R^{20}$ and $X^{20}$ have the meanings indicated above. $R^{20}$ preferably denotes alkyl having 1 to 6 C atoms. $X^{20}$ preferably denotes F, furthermore $OCF_3$, $CF_3$, $CF{=}CF_2$, $OCHF_2$ and $OCH{=}CF_2$;

The compounds of the formula VII are preferably selected from the following formulae:

VIIa
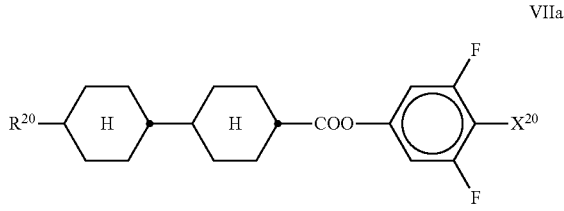

VIIb
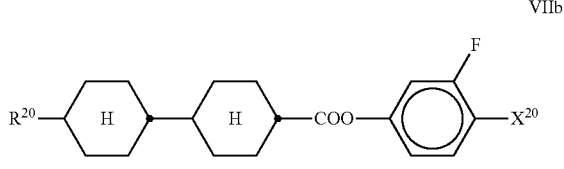

wherein $R^{20}$ and $X^{20}$ have the meanings indicated above. $R^{20}$ preferably denotes alkyl having 1 to 6 C atoms. $X^{20}$ preferably denotes F, furthermore $OCF_3$, $OCHF_2$ and $OCH{=}CF_2$.

cc) The medium additionally comprises one or more compounds selected from the formulae ZK1 to ZK10 given above. Especially preferred are compounds of formula ZK1 and ZK3. Particularly preferred compounds of formula ZK are selected from the sub-formulae ZK1a, ZK1b, ZK1c, ZK3a, ZK3b, ZK3c and ZK3d.

dd) The medium additionally comprises one or more compounds selected from the formulae DK1 to DK12 given above. Especially preferred compounds are DK3.

ee) The medium additionally comprises one or more compounds selected from the following formulae:

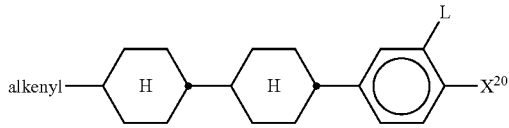

IX wherein $X^{20}$ has the meanings indicated above, and L denotes H or F,
"alkenyl" denotes $C_{2-6}$-alkenyl.

ff) The compounds of the formulae DK-3a and IX are preferably selected from the following formulae:

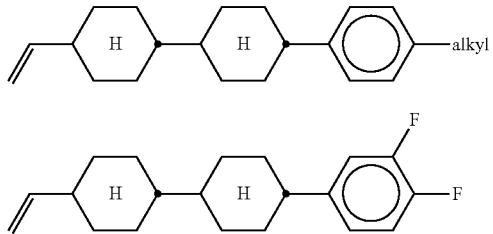

DK3a

IXa wherein "alkyl" denotes $C_{1-6}$-alkyl, preferably n-$C_3H_7$, n-$C_4H_9$ or n-$C_5H_{11}$, in particular n-$C_3H_7$.

gg) The medium additionally comprises one or more compounds selected from the formulae B1, B2 and B3 given above, preferably from the formula B2. The compounds of the formulae B1 to B3 are particularly preferably selected from the formulae B1a, B2a, B2b and B2c.

hh) The medium additionally comprises one or more compounds selected from the following formula:

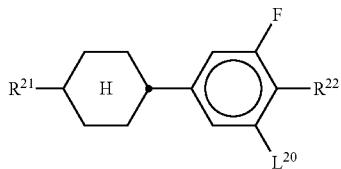

X wherein $L^{20}$ denotes H or F, and $R^{21}$ and $R^{22}$ each, identically or differently, denote n-alkyl, alkoxy, oxaalkyl, fluoroalkyl or alkenyl, each having up to 6 C atoms, and preferably each, identically or differently, denote alkyl having 1 to 6 C atoms.

ii) The medium comprises one or more compounds of the following formulae:

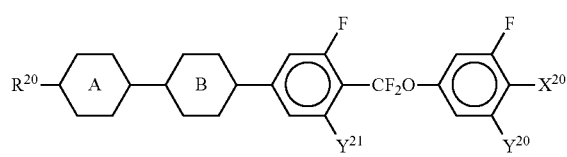

XI

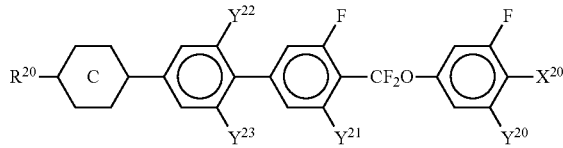

XII wherein $R^{20}$, $X^{20}$ and $Y^{20-23}$ have the meanings indicated in formula I, and

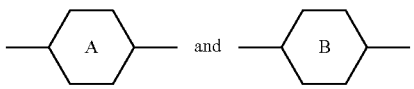

each, independently of one another, denote

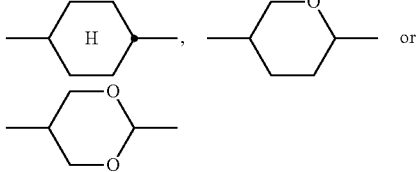

and

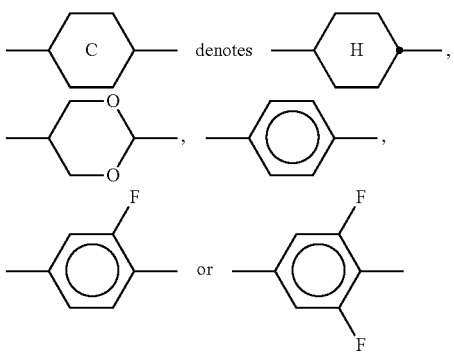

The compounds of the formulae XI and XII are preferably selected from the following formulae:

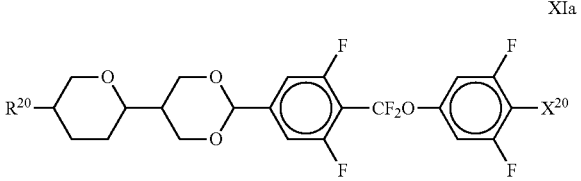

XIa

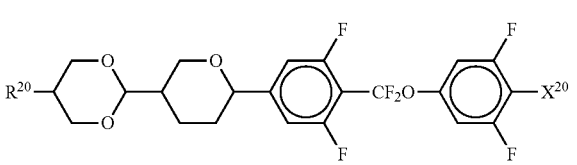

XIb

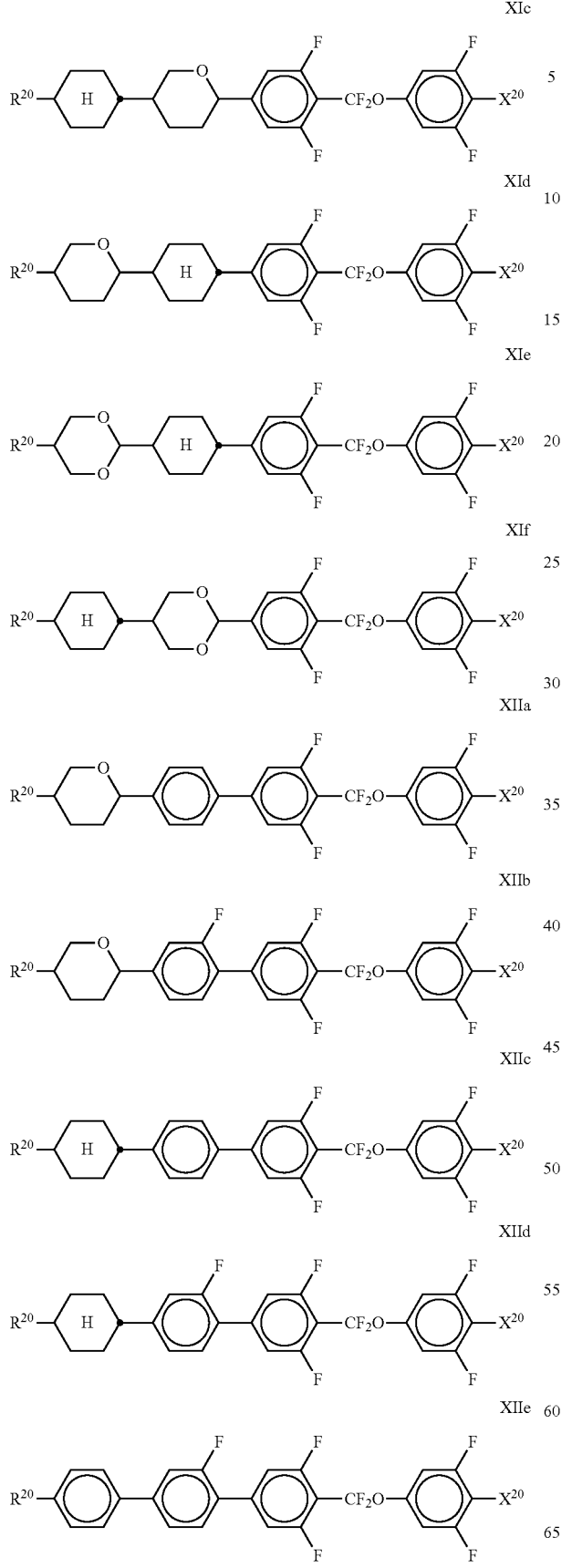
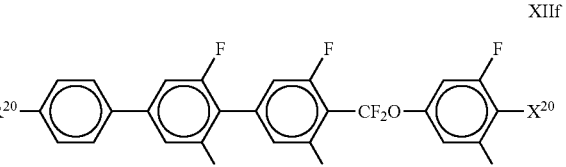

wherein $R^{20}$ and $X^{20}$ have the meaning indicated above and preferably $R^{20}$ denotes alkyl having 1 to 6 C atoms and $X^{20}$ denotes F.

The mixture according to the invention particularly preferably comprises at least one compound of the formula XIIa and/or XIIe.

jj) The medium comprises one or more compounds of formula T given above, preferably selected from the group of compounds of the formulae T21 to T23 and T25 to T27.

Particular preference is given to the compounds of the formulae T21 to T23. Very particular preference is given to the compounds of the formulae

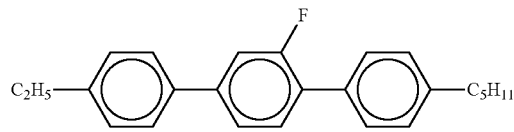
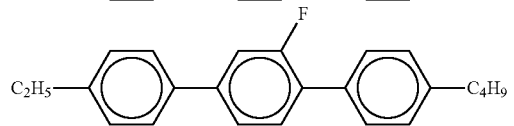
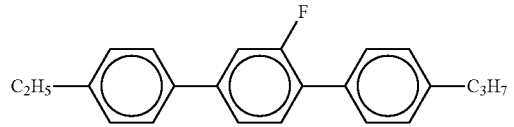
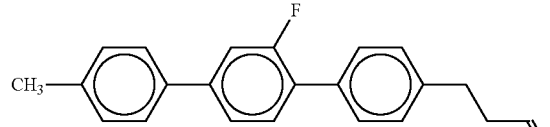
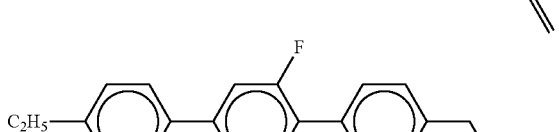
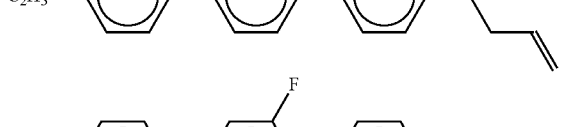
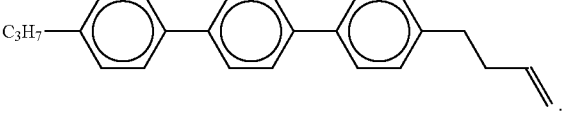

kk) The medium comprises one or more compounds selected from the group of formulae DK9, DK10 and DK11 given above.

ll) The medium additionally comprises one or more compounds selected from the following formulae:

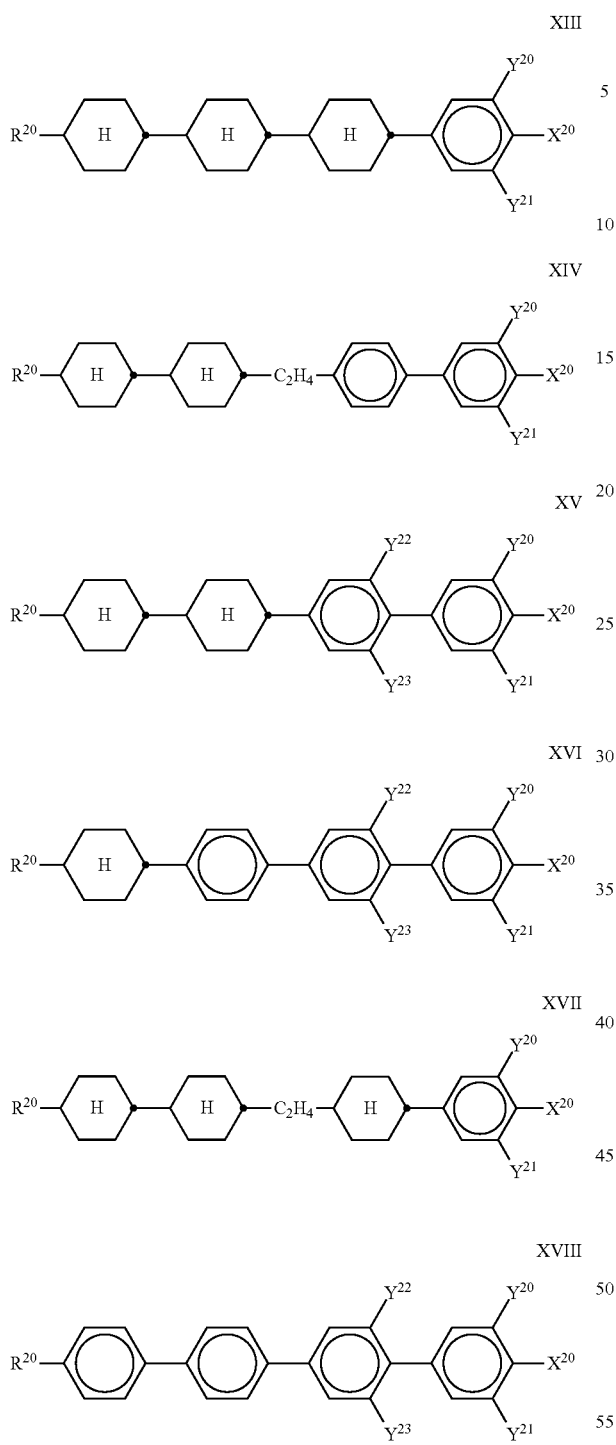

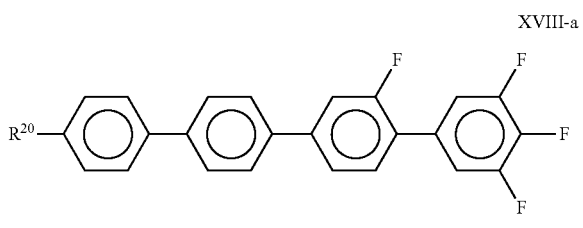

wherein $R^{20}$ and $X^{20}$ each, independently of one another, have one of the meanings indicated above, and $Y^{20-23}$ each, independently of one another, denote H or F. $X^{20}$ is preferably F, Cl, $CF_3$, $OCF_3$ or $OCHF_2$. $R^{20}$ preferably denotes alkyl, alkoxy, oxaalkyl, fluoroalkyl or alkenyl, each having up to 6 C atoms.

The mixture according to the invention particularly preferably comprises one or more compounds of the formula XVIII-a, wherein $R^{20}$ has the meanings indicated above. $R^{20}$ preferably denotes straight-chain alkyl, in particular ethyl, n-propyl, n-butyl and n-pentyl and very particularly preferably n-propyl. The compound(s) of the formula XVIII, in particular of the formula XVIII-a, is (are) preferably employed in the mixtures according to the invention in amounts of 0.5-20% by weight, particularly preferably 1-15% by weight.

mm) The medium additionally comprises one or more compounds of the formula XIX,

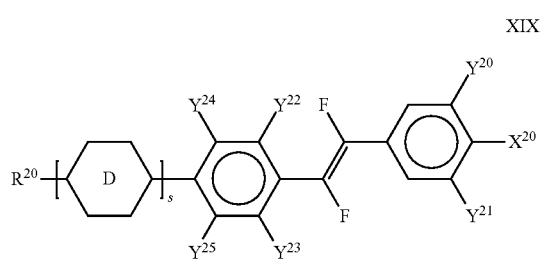

wherein $R^{20}$, $X^{20}$ and $Y^{20-25}$ have the meanings indicated in formula I, s denotes 0 or 1, and

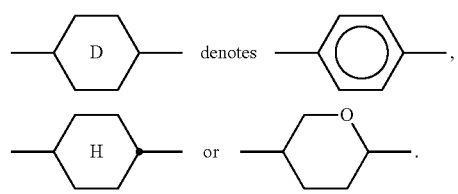

In the formula XIX, $X^{20}$ may also denote an alkyl radical having 1-6 C atoms or an alkoxy radical having 1-6 C atoms. The alkyl or alkoxy radical is preferably straight-chain.

$R^{20}$ preferably denotes alkyl having 1 to 6 C atoms. $X^{20}$ preferably denotes F;

The compounds of the formula XIX are preferably selected from the following formulae:

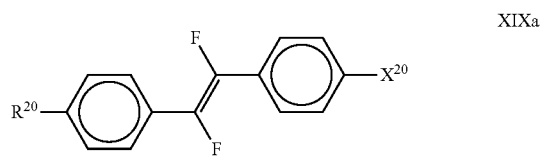

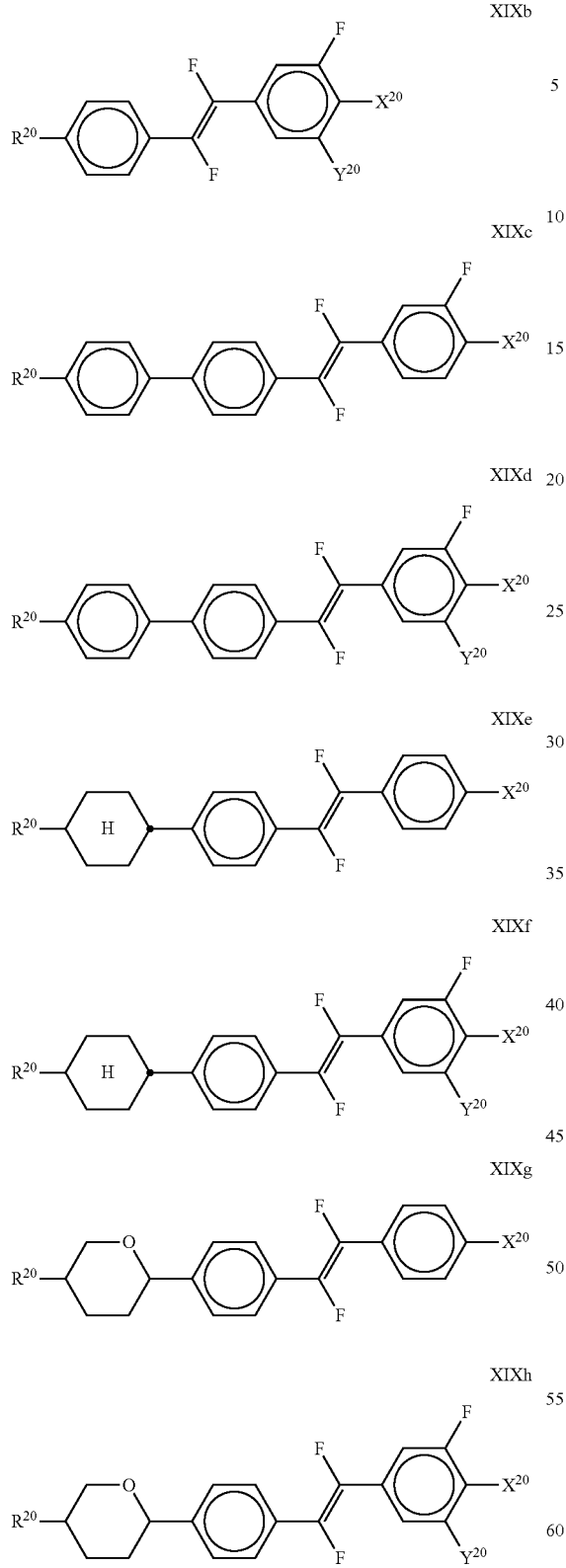
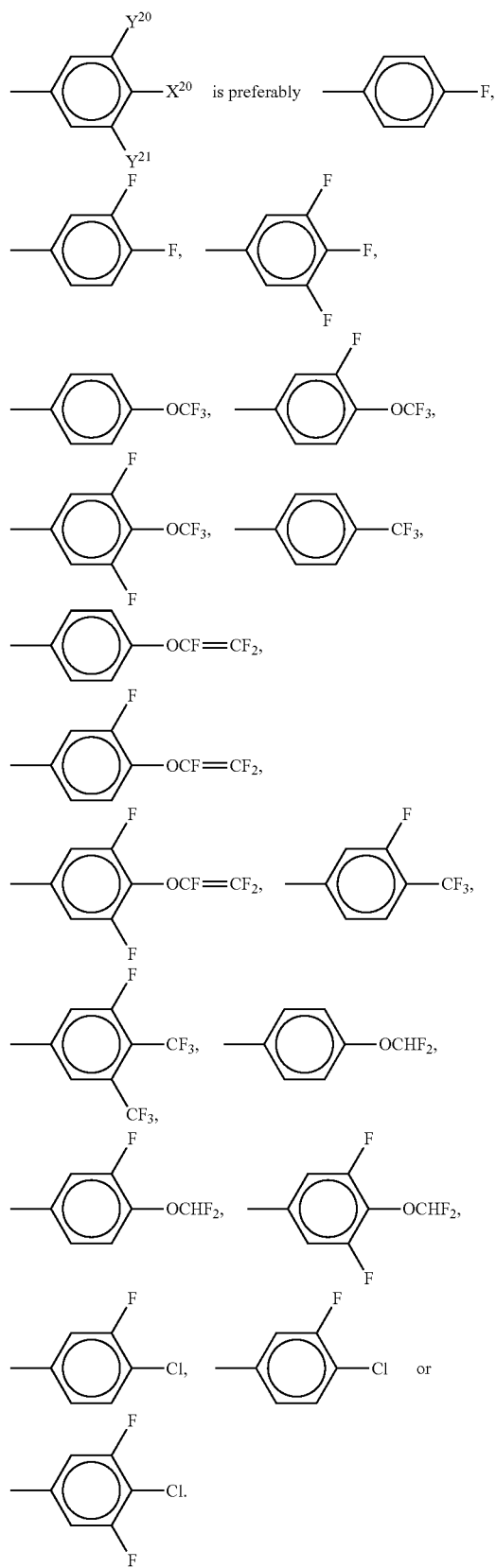
wherein $R^{20}$, $X^{20}$ and $Y^{20}$ have the meanings indicated above. $R^{20}$ preferably denotes alkyl having 1 to 6 C atoms. $X^{20}$ preferably denotes F, and $Y^{20}$ is preferably F;
$R^{20}$ is straight-chain alkyl or alkenyl having 2 to 6 C atoms;

nn) The medium comprises one or more compounds of the formulae G1 to G4 given above, preferably selected from G1 and G2 wherein alkyl denotes $C_{1-6}$-alkyl, $L^x$ denotes H and X denotes F or Cl. In G2, X particularly preferably denotes Cl.

oo) The medium comprises one or more compounds of the following formulae:

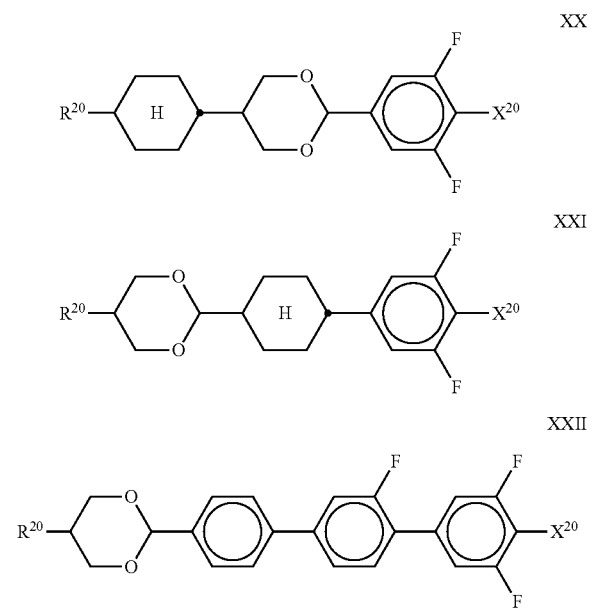

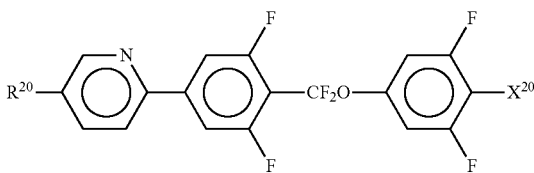

wherein $R^{20}$ and $X^{20}$ have the meanings indicated above. $R^{20}$ preferably denotes alkyl having 1 to 6 C atoms. $X^{20}$ preferably denotes F. The medium according to the invention particularly preferably comprises one or more compounds of the formula XXII wherein $X^{20}$ preferably denotes F. The compound(s) of the formulae XX-XXII is (are) preferably employed in the mixtures according to the invention in amounts of 1-20% by weight, particularly preferably 1-15% by weight. Particularly preferred mixtures comprise at least one compound of the formula XXII.

pp) The medium comprises one or more compounds of the following pyrimidine or pyridine compounds of the formulae

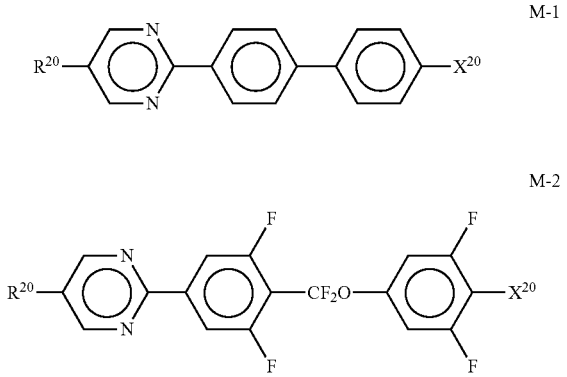

wherein $R^{20}$ and $X^{20}$ have the meanings indicated above. $R^{20}$ preferably denotes alkyl having 1 to 6 C atoms. $X^{20}$ preferably denotes F. The medium according to the invention particularly preferably comprises one or more compounds of the formula M-1, wherein $X^{20}$ preferably denotes F. The compound(s) of the formulae M-1-M-3 is (are) preferably employed in the mixtures according to the invention in amounts of 1-20% by weight, particularly preferably 1-15% by weight.

Further preferred embodiments are indicated below:

qq) The medium comprises two or more compounds of the formula IA, in particular of the formula IA-b;

rr) The medium comprises 2-30% by weight, preferably 3-20% by weight, particularly preferably 3-15% by weight, of compounds of the formula IA;

ss) Besides the compounds of the formulae IA and IB, the medium comprises further compounds selected from the group of the compounds of the formulae II, III, IX-XIII, XVII and XVIII;

tt) The proportion of compounds of the formulae II, III, IX-XIII, XVII and XVIII in the mixture as a whole is 40 to 95% by weight;

uu) The medium comprises 10-50% by weight, particularly preferably 12-40% by weight, of compounds of the formulae II and/or III;

vv) The medium comprises 20-70% by weight, particularly preferably 25-65% by weight, of compounds of the formulae IX-XIII;

ww) The medium comprises 4-30% by weight, particularly preferably 5-20% by weight, of compounds of the formula XVII;

xx) The medium comprises 1-20% by weight, particularly preferably 2-15% by weight, of compounds of the formula XVIII;

yy) The medium comprises at least two compounds of the formulae

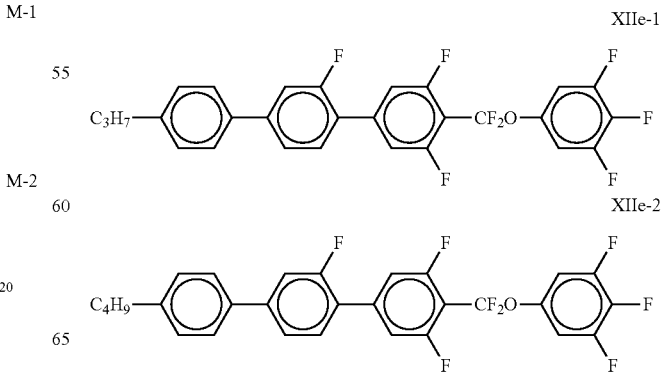

-continued

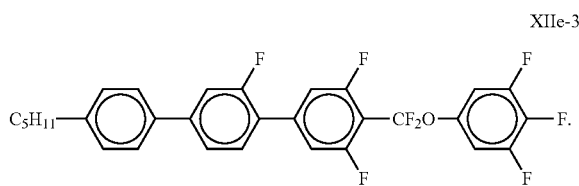
XIIe-3 zz) The medium comprises at least two compounds of the formulae

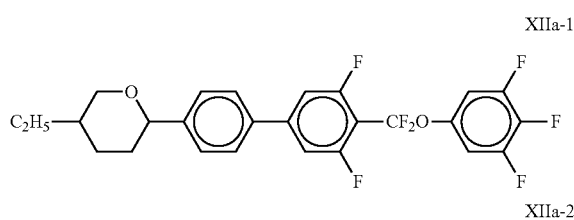
XIIa-1

XIIa-2

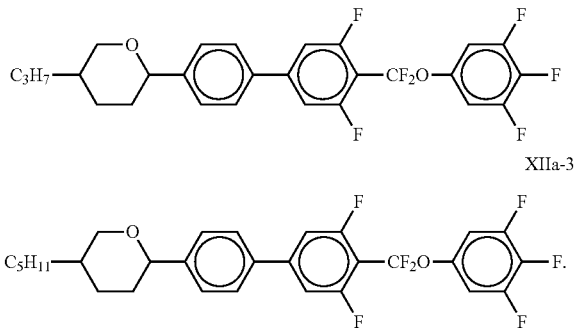
XIIa-3 aaa) The medium comprises at least two compounds of the formula XIIa and at least two compounds of the formula XIIe.

bbb) The medium comprises at least one compound of the formula XIIa and at least one compound of the formula XIIe and at least one compound of the formula IIIa.

ccc) The medium comprises at least two compounds of the formula XIIa and at least two compounds of the formula XIIe and at least one compound of the formula IIIa.

ddd) The medium comprises in total ≥25% by weight, preferably ≥30% by weight, of one or more compounds of the formula XII.

eee) The medium comprises ≥20% by weight, preferably ≥24% by weight, preferably 25-60% by weight, of compounds of the formula ZK3, in particular the compound of the formula ZK3a,

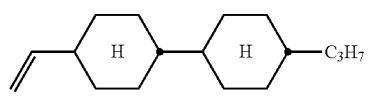
ZK3a fff) The medium comprises at least one compound selected from the group of compounds ZK3a, ZK3b and ZK3c, preferably ZK3a, in combination with compound ZK3d

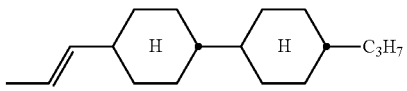
ZK3d ggg) The medium comprises at least one compound of the formula DPGU-n-F.

hhh) The medium comprises at least one compound of the formula CDUQU-n-F.

iii) The medium comprises at least one compound of the formula CPU-n-OXF.

jjj) The medium comprises at least one compound of the formula CPGU-3-OT.

kkk) The medium comprises at least one compound of the formula PPGU-n-F.

lll) The medium comprises at least one compound of the formula PGP-n-m, preferably two or three compounds.

mmm) The medium comprises at least one compound of the formula PGP-2-2V having the structure

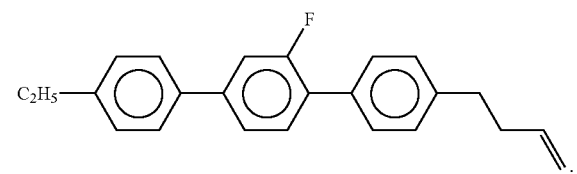

The compounds used in the present invention are prepared by methods known per se, as described in the literature (for example in the standard works, such as Houben-Weyl, Methoden der organischen Chemie [Methods of Organic Chemistry], Georg-Thieme-Verlag, Stuttgart), to be precise under reaction conditions which are known and suitable for the said reactions. Use can also be made here of variants known per se, which are not mentioned here in greater detail.

According to the present invention, an alkyl radical and/or an alkoxy radical may be straight-chain or branched. It is preferably straight-chain, has 2, 3, 4, 5, 6 or 7 C atoms and accordingly preferably denotes ethyl, propyl, butyl, pentyl, hexyl, heptyl, ethoxy, propoxy, butoxy, pentoxy, hexyloxy or -heptyloxy, furthermore methyl, octyl, nonyl, decyl, undecyl, dodecyl, tridecyl, tetradecyl, pentadecyl, methoxy, octyloxy, nonyloxy, decyloxy, undecyloxy, dodecyloxy, tridecyloxy or tetradecyloxy.

Oxaalkyl preferably denotes straight-chain 2-oxapropyl (=methoxymethyl), 2-(=ethoxymethyl) or 3-oxabutyl (=2-methoxyethyl), 2-, 3- or 4-oxapentyl, 2-, 3-, 4- or 5-oxahexyl, 2-, 3-, 4-, 5- or 6-oxaheptyl, 2-, 3-, 4-, 5-, 6- or 7-oxaoctyl, 2-, 3-, 4-, 5-, 6-, 7- or 8-oxanonyl, 2-, 3-, 4-, 5-, 6-, 7-, 8- or 9-oxa-decyl.

An alkyl radical in which one $CH_2$ group has been replaced by —CH=CH—, may be straight-chain or branched. It is preferably straight-chain and has 2 to 10 C atoms. Accordingly, it denotes, in particular, vinyl, prop-1- or -2-enyl, but-1-, -2- or -3-enyl, pent-1-, -2-, -3- or -4-enyl, hex-1-, -2-, -3-, -4- or -5-enyl, hept-1-, -2-, -3-, -4-, -5- or -6-enyl, oct-1-, -2-, -3-, -4-, -5-, -6- or -7-enyl, non-1-, -2-, -3-, -4-, -5-, -6-, -7- or -8-enyl, dec-1-, -2-, -3-, -4-, -5-, -6-, -7-, -8- or -9-enyl.

An alkyl or alkenyl radical which is at least monosubstituted by halogen is preferably straight-chain, and halogen is preferably F or Cl. In the case of polysubstitution, halogen is preferably F. The resultant radicals also include perfluorinated radicals. In the case of monosubstitution, the fluorine or chlorine substituent may be in any desired position, but is preferably in the ω-position.

In the formulae above and below, polar end groups (substituents X) are preferably F, Cl or a mono- or polyfluorinated alkyl or alkoxy radical having 1, 2 or 3 C atoms or a mono- or polyfluorinated alkenyl radical having 2 or 3 C atoms. They are particularly preferably F, Cl, $CF_3$, $CHF_2$, $OCF_3$, $OCHF_2$, $OCFHCF_3$, $OCFHCHF_2$, $OCFHCHF_2$, $OCF_2CH_3$, $OCF_2CHF_2$, $OCF_2CHF_2$, $OCF_2CF_2CHF_2$, $OCF_2CF_2CHF_2$, $OCFHCF_2CF_3$, $OCFHCF_2CHF_2$, $OCF_2CF_2CF_3$, $OCF_2CF_2CClF_2$, $OCClFCF_2CF_3$, $OCH{=}CF_2$ or $CH{=}CF_2$, very particularly preferably F or $OCF_3$, furthermore $CF_3$, $OCF{=}CF_2$, $OCHF_2$ or $OCH{=}CF_2$.

The media according to the invention are prepared in a manner conventional per se. In general, the components are dissolved in one another, preferably at elevated temperature. By means of suitable additives, the liquid-crystalline phases of the present invention can be modified in such a way that they can be used in all types of liquid-crystal display element that have been disclosed hitherto. Additives of this type are known to the person skilled in the art and are described in detail in the literature (H. Kelker/R. Hatz, Handbook of Liquid Crystals, Verlag Chemie, Weinheim, 1980). For example, pleochroic dyes can be added for the production of coloured guest-host systems or substances can be added in order to modify the dielectric anisotropy, the viscosity and/or the alignment of the nematic phases.

The present invention also relates to electro-optical liquid-crystal display elements containing a liquid-crystalline medium according to the invention.

Further combinations of the embodiments and variants of the invention in accordance with the description arise from the claims.

The Synthesis of compounds of formula S-1 is disclosed in JP, 05-230072 A. A similar compound is published in K. Ichimura, *Langmuir* 1993, 9, 3298-3304.

The present invention furthermore relates to compounds of formula S, preferably of formula S-2.

Compounds of formula S-2 are preferably synthesised as shown in scheme 1 below.

Scheme 1.

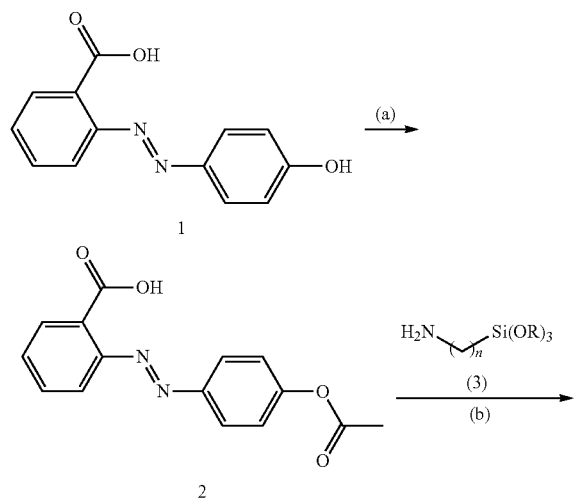

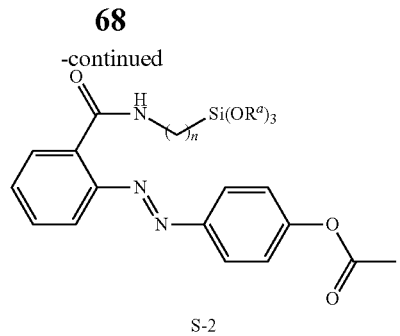

S-2

Reagents: (a) Pyridine, Acetic Anhydride (b) N-hydroxysuccinimide, dicyclohexylcarbodiimide. n denotes an interger from 2 to 12.

The starting material, 2-[2-(4-hydroxyphenyl)-diazenyl] benzoic acid (1) is commercially available. Acetylation gives the acetate 2 which can be converted into amides according to the invention using suitable amine derivatives following standard transformations as for example reaction with the commercially available 3-(trimethoxysilyl)-1-propanamine in the presence of N-hydroxysuccinamide and dicyclohexylcarbodiimide.

The invention is explained in greater detail below with reference to working examples, but without intending to be restricted thereby. The person skilled in the art will be able to glean from the examples working details that are not given in detail in the general description, generalise them in accordance with general expert knowledge and apply them to a specific problem.

Besides the usual and well-known abbreviations, the following abbreviations are used:

C: crystalline phase; N: nematic phase; Sm: smectic phase; I: isotropic phase. The numbers between these symbols show the transition temperatures of the substance concerned.

Temperature data are in ° C., unless indicated otherwise.

Physical, physicochemical or electro-optical parameters are determined by generally known methods, as described, inter alia, in the brochure "Merck Liquid Crystals—Licristal®—Physical Properties of Liquid Crystals—Description of the Measurement Methods", 1998, Merck KGaA, Darmstadt.

Above and below, Δn denotes the optical anisotropy (589 nm, 20° C.) and Δε denotes the dielectric anisotropy (1 kHz, 20° C.). The dielectric anisotropy Δε is determined at 20° C. and 1 kHz. The optical anisotropy Δn is determined at 20° C. and a wavelength of 589.3 nm.

The Δε and Δn values and the rotational viscosity ($γ_1$) of the compounds according to the invention are obtained by linear extrapolation from liquid-crystalline mixtures consisting of 5 to 10% of the respective compound according to the invention and 90-95% of the commercially available liquid-crystal mixture ZLI-2857 (for Δε) or ZLI-4792 (for Δn, $γ_1$) (mixtures, Merck KGaA, Darmstadt).

In the present invention and especially in the following examples, the structures of the mesogenic compounds are indicated by means of abbreviations, also called acronyms. In these acronyms, the chemical formulae are abbreviated as follows using Tables A to C below. All groups $C_nH_{2n+1}$, $C_mH_{2m+1}$ and $C_lH_{2l+1}$ or $C_nH_{2n-1}$, $C_mH_{2m-1}$ and $C_lH_{2l-1}$ denote straight-chain alkyl or alkenyl, preferably 1E-alkenyl, each having n, m and l C atoms respectively. Table A lists the codes used for the ring elements of the core structures of the compounds, while Table B shows the linking groups. Table C gives the meanings of the codes for the left-hand or right-hand end groups. The acronyms are composed of the codes for the ring elements with optional linking groups, followed by a first hyphen and the codes for the left-hand end group, and a second hyphen and the codes for the right-hand end group. Table D shows illustrative structures of compounds together with their respective abbreviations.

TABLE A

| Ring elements | |
|---|---|
| C | 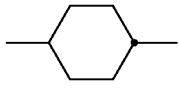 |
| P | 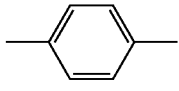 |
| D | 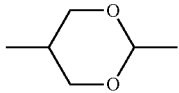 |
| DI | 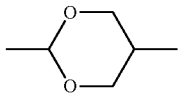 |
| A | 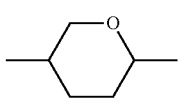 |
| AI | 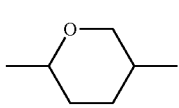 |
| G | 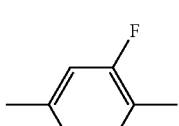 |
| GI | 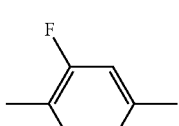 |
| U | 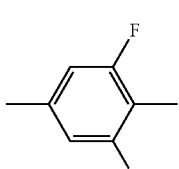 |
| UI | 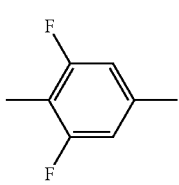 |
| Y | 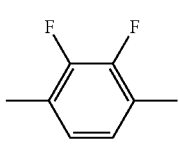 |

TABLE A-continued

| Ring elements | |
|---|---|
| M |  |
| MI | 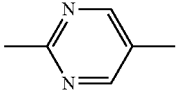 |
| N | 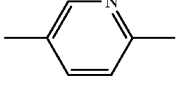 |
| NI | 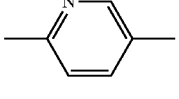 |
| Np | 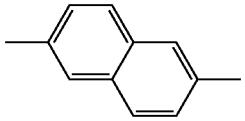 |
| dH |  |
| N3f | 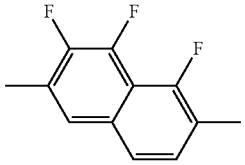 |
| N3fI | 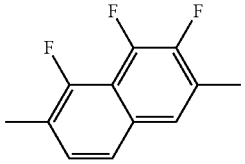 |
| tH | 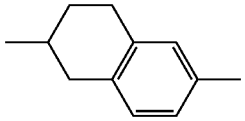 |
| tHI | 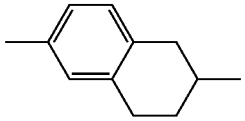 |
| tH2f | 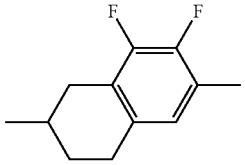 |

TABLE A-continued

Ring elements tH2fI 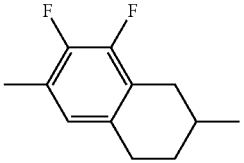

K 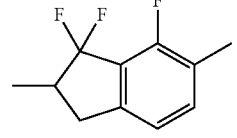

KI 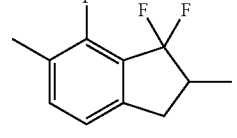

L 

LI 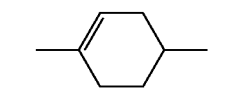

F 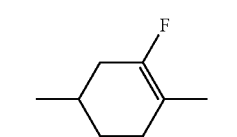

FI 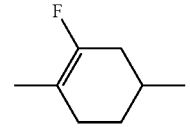

Nf 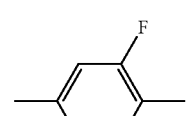

NfI 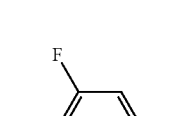

TABLE B

Linking groups

| | | | |
|---|---|---|---|
| E | —CH$_2$CH$_2$— | Z | —CO—O— |
| V | —CH═CH— | ZI | —O—CO— |
| X | —CF═CH— | O | —CH$_2$—O— |
| XI | —CH═CF— | OI | —O—CH$_2$— |
| B | —CF═CF— | Q | —CF$_2$—O— |
| T | —C≡C— | QI | —O—CF$_2$— |
| W | —CF$_2$CF$_2$— | T | —C≡C— |

TABLE C

End groups

| Left-hand side | | Right-hand side | |
|---|---|---|---|
| | Use alone | | |
| -n- | C$_n$H$_{2n+1}$— | -n | —C$_n$H$_{2n+1}$ |
| -nO- | C$_n$H$_{2n+1}$—O— | -nO | —O—C$_n$H$_{2n+1}$ |
| -V- | CH$_2$═CH— | -V | —CH═CH$_2$ |
| -nV- | C$_n$H$_{2n+1}$—CH═CH— | -nV | —C$_n$H$_{2n}$—CH═CH$_2$ |
| -Vn- | CH$_2$═CH—C$_n$H$_{2n+1}$— | -Vn | —CH═CH—C$_n$H$_{2n+1}$ |
| -nVm- | C$_n$H$_{2n+1}$—CH═CH—C$_m$H$_{2m}$— | -nVm | —C$_n$H$_{2n}$—CH═CH—C$_m$H$_{2m+1}$ |
| -N- | N≡C— | -N | —C≡N |
| -S- | S═C═N— | -S | —N═C═S |
| -F- | F— | -F | —F |
| -CL- | Cl— | -CL | —Cl |
| -M- | CFH$_2$— | -M | —CFH$_2$ |
| -D- | CF$_2$H— | -D | —CF$_2$H |
| -T- | CF$_3$— | -T | —CF$_3$ |
| -MO- | CFH$_2$O— | -OM | —OCFH$_2$ |
| -DO- | CF$_2$HO— | -OD | —OCF$_2$H |
| -TO- | CF$_3$O— | -OT | —OCF$_3$ |
| -FXO- | CF$_2$═CH—O— | -OXF | —O—CH═CF$_2$ |
| -A- | H—C≡C— | -A | —C≡C—H |
| -nA- | C$_n$H$_{2n+1}$—C≡C— | -An | —C≡C—C$_n$H$_{2n+1}$ |
| -NA- | N≡C—C≡C— | -AN | —C≡C—C≡N |

TABLE C-continued

| End groups | | | |
|---|---|---|---|
| Left-hand side | | Right-hand side | |
| Use together with one another and with others | | | |
| -...A...- | —C≡C— | -...A... | —C≡C— |
| -...V...- | CH=CH— | -...V... | —CH=CH— |
| -...Z...- | —CO—O— | -...Z... | —CO—O— |
| -...ZI...- | —O—CO— | -...ZI... | —O—CO— |
| -...K...- | —CO— | -...K... | —CO— |
| -...W...- | —CF=CF— | -...W... | —CF=CF— | wherein n and m each denote integers, and the three dots "..." are place-holders for other abbreviations from this table.

The following table shows illustrative structures together with their respective abbreviations. These are shown in order to illustrate the meaning of the rules for the abbreviations. They furthermore represent compounds which are preferably used.

TABLE D

Illustrative structures

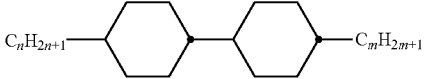

CC-n-m

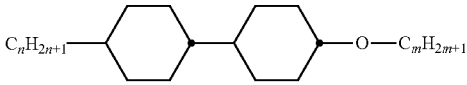

CC-n-Om

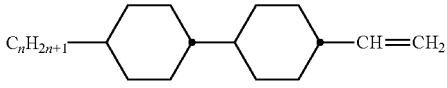

CC-n-V

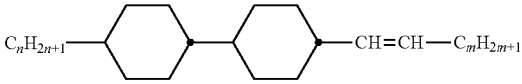

CC-n-Vm

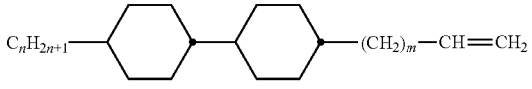

CC-n-mV

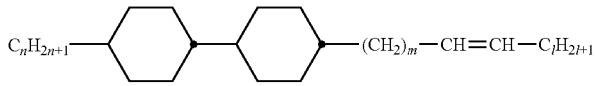

CC-n-mVl

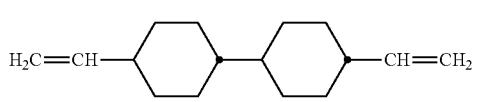

CC-V-V

TABLE D-continued

Illustrative structures $CH_2=CH-$⟨cyclohexyl⟩-⟨cyclohexyl⟩$-(CH_2)_m-CH=CH_2$

CC-V-mV $CH_2=CH-$⟨cyclohexyl⟩-⟨cyclohexyl⟩$-CH=CH-C_mH_{2m+1}$

CC-V-Vm $CH_2=CH-(CH_2)_n-$⟨cyclohexyl⟩-⟨cyclohexyl⟩$-(CH_2)_m-CH=CH_2$

CC-Vn-mV $C_nH_{2n+1}-CH=CH-$⟨cyclohexyl⟩-⟨cyclohexyl⟩$-(CH_2)_m-CH=CH_2$

CC-nV-mV $C_nH_{2n+1}-CH=CH-$⟨cyclohexyl⟩-⟨cyclohexyl⟩$-CH=CH-C_mH_{2m+1}$

CC-nV-Vm $C_nH_{2n+1}-$⟨cyclohexyl⟩-⟨phenyl⟩$-C_mH_{2m+1}$

CP-n-m $C_nH_{2n+1}O-$⟨cyclohexyl⟩-⟨phenyl⟩$-C_mH_{2m+1}$

CP-nO-m $C_nH_{2n+1}-$⟨cyclohexyl⟩-⟨phenyl⟩$-OC_mH_{2m+1}$

CP-n-Om $CH_2=CH-$⟨cyclohexyl⟩-⟨phenyl⟩$-C_mH_{2m+1}$

CP-V-m $CH_2=CH-(CH_2)_n-$⟨cyclohexyl⟩-⟨phenyl⟩$-C_mH_{2m+1}$

CP-Vn-m $C_nH_{2n+1}-CH=CH-$⟨cyclohexyl⟩-⟨phenyl⟩$-C_mH_{2m+1}$

CP-nV-m

TABLE D-continued
Illustrative structures
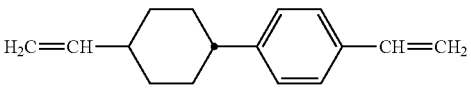
CP-V-V
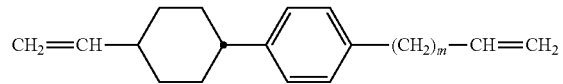
CP-V-mV
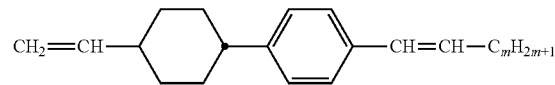
CP-V-Vm
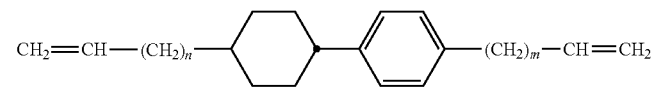
CP-Vn-mV
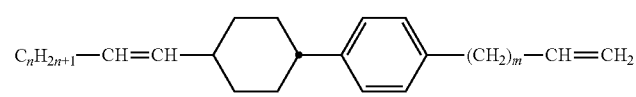
CP-nV-mV
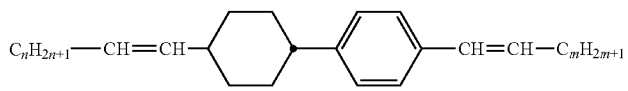
CP-nV-Vm
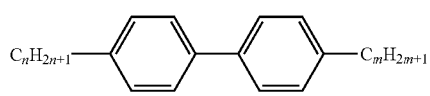
PP-n-m
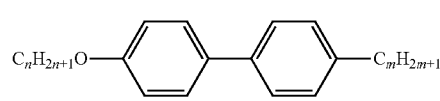
PP-nO-m
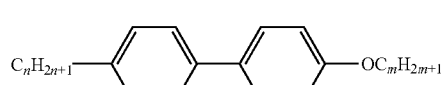
PP-n-Om
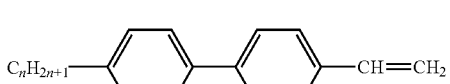
PP-n-V
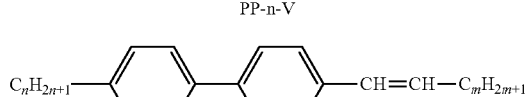
PP-n-Vm TABLE D-continued Illustrative structures $C_nH_{2n+1}$—⬡—⬡—$(C_mH_{2m})$—CH=CH$_2$ PP-n-mV $C_nH_{2n+1}$—⬡—⬡—$(CH_2)_m$—CH=CH—$C_lH_{2l+1}$ PP-n-mVI $C_nH_{2n+1}$—⬢—⬢—⬡—$C_mH_{2m+1}$ CCP-n-m $C_nH_{2n+1}O$—⬢—⬢—⬡—$C_mH_{2m+1}$ CCP-nO-m $C_nH_{2n+1}$—⬢—⬢—⬡—$OC_mH_{2m+1}$ CCP-n-Om $C_nH_{2n+1}$—⬢—⬢—⬡—CH=CH$_2$ CCP-n-V $C_nH_{2n+1}$—⬢—⬢—⬡—CH=CH—$C_mH_{2m+1}$ CCP-n-Vm $C_nH_{2n+1}$—⬢—⬢—⬡—$(C_mH_{2m})$—CH=CH$_2$ CCP-n-mV $C_nH_{2n+1}$—⬢—⬢—⬡—$(C_mH_{2m})$—CH=CH—$C_lH_{2l+1}$ CCP-n-mVI $H_2C$=CH—⬢—⬢—⬡—$C_mH_{2m+1}$ CCP-V-m $C_nH_{2n+1}$—CH=CH—⬢—⬢—⬡—$C_mH_{2m+1}$ CCP-nV-m TABLE D-continued
Illustrative structures
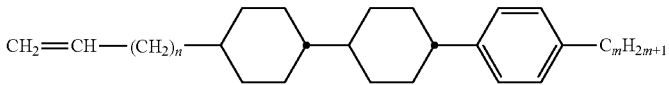
CCP-Vn-m
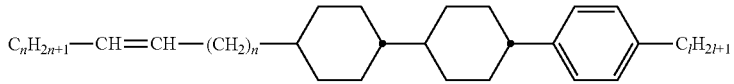
CCP-nVm-I
CPP-n-m
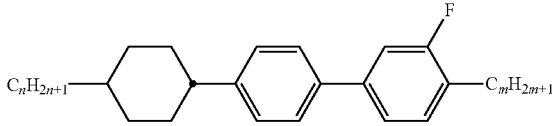
CPG-n-m
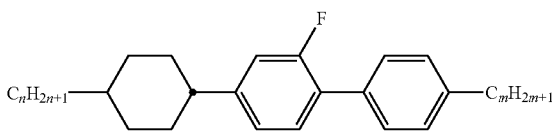
CGP-n-m
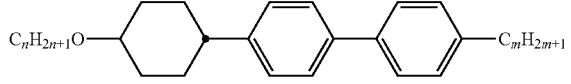
CPP-nO-m
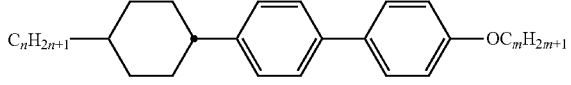
CPP-n-Om
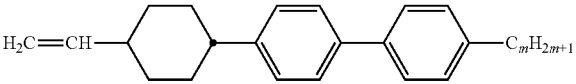
CPP-V-m
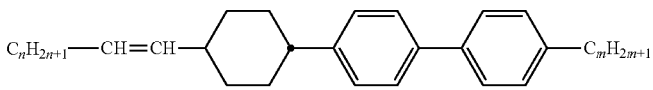
CPP-nV-m
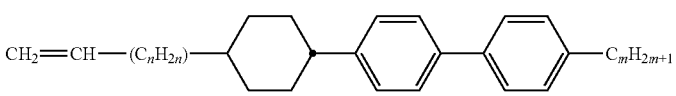
CPP-Vn-m TABLE D-continued
Illustrative structures
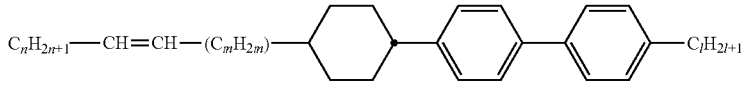
CPP-nVm-I
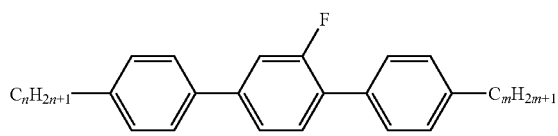
PGP-n-m
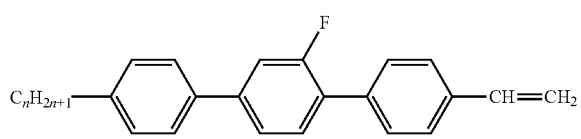
PGP-n-V
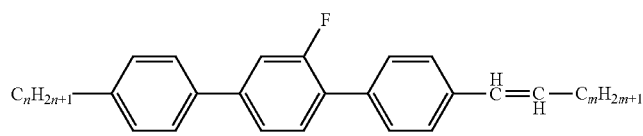
PGP-n-Vm
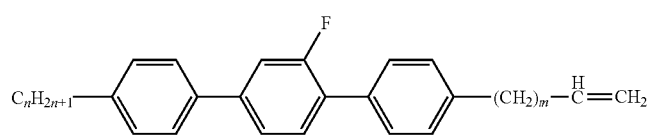
PGP-n-mV
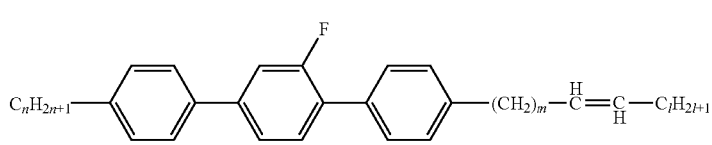
PGP-n-mVl
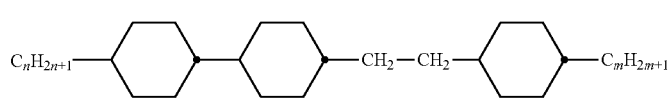
CCEC-n-m
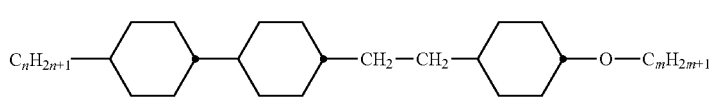
CCEC-n-Om
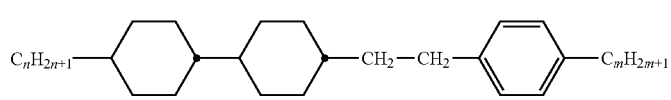
CCEP-n-m TABLE D-continued Illustrative structures $C_nH_{2n+1}$—⟨cyclohexyl⟩—⟨cyclohexyl⟩—$CH_2$—$CH_2$—⟨phenyl⟩—O—$C_mH_{2m+1}$ CCEP-n-Om $C_nH_{2n+1}$—⟨cyclohexyl⟩—⟨phenyl⟩—⟨phenyl⟩—⟨cyclohexyl⟩—$C_mH_{2m+1}$ CPPC-n-m $C_nH_{2n+1}$—⟨cyclohexyl⟩—⟨phenyl⟩—⟨phenyl-F⟩—⟨cyclohexyl⟩—$C_mH_{2m+1}$ CGPC-n-m $C_nH_{2n+1}$—⟨cyclohexyl⟩—⟨cyclohexyl⟩—⟨phenyl⟩—⟨cyclohexyl⟩—$C_mH_{2m+1}$ CCPC-n-m $C_nH_{2n+1}$—⟨cyclohexyl⟩—⟨cyclohexyl⟩—CO—O—⟨phenyl⟩—⟨cyclohexyl⟩—$C_mH_{2m+1}$ CCZPC-n-m $C_nH_{2n+1}$—⟨cyclohexyl⟩—⟨phenyl⟩—⟨phenyl-F⟩—⟨phenyl⟩—$C_mH_{2m+1}$ CPGP-n-m $C_nH_{2n+1}$—⟨cyclohexyl⟩—⟨phenyl⟩—⟨phenyl-F⟩—⟨phenyl⟩—$(CH_2)_m$—$CH$=$CH_2$ CPGP-n-mV $C_nH_{2n+1}$—⟨cyclohexyl⟩—⟨phenyl⟩—⟨phenyl-F⟩—⟨phenyl⟩—$(CH_2)_m$—$CH$=$CH$—$C_lH_{2l+1}$ CPGP-n-mVI $C_nH_{2n+1}$—⟨phenyl-F⟩—⟨phenyl⟩—⟨phenyl-F⟩—⟨phenyl⟩—$C_mH_{2m+1}$ PGIGP-n-m TABLE D-continued
Illustrative structures
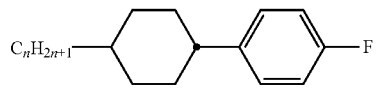
CP-n-F
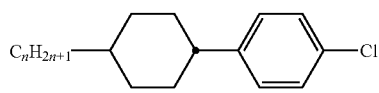
CP-n-CL
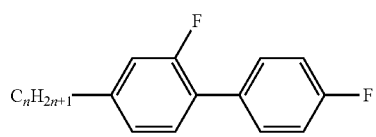
GP-n-F
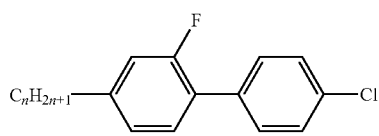
GP-n-CL
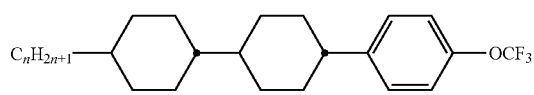
CCP-n-OT
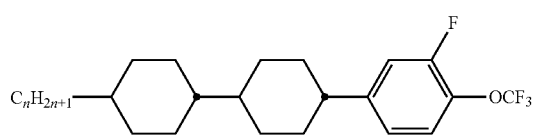
CCG-n-OT
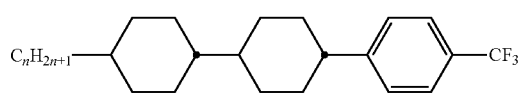
CCP-n-T
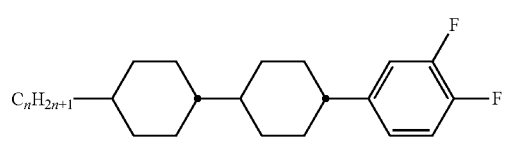
CCG-n-F
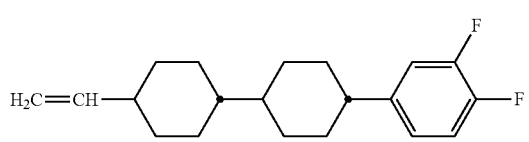
CCG-V-F TABLE D-continued
Illustrative structures
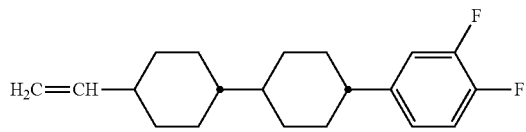
CCG-V-F
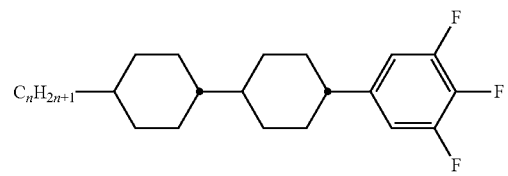
CCU-n-F
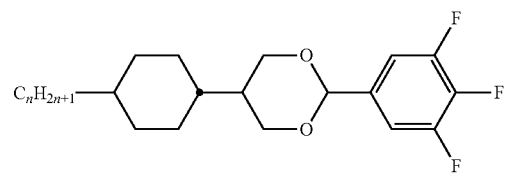
CDU-n-F
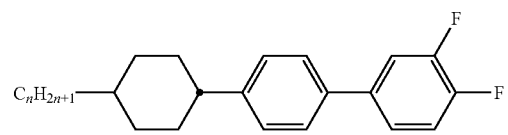
CPG-n-F
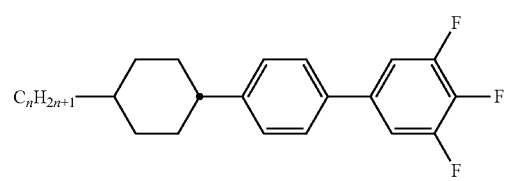
CPU-n-F
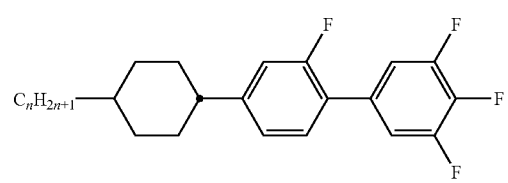
CGU-n-F
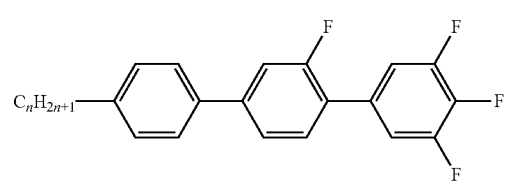
PGU-n-F TABLE D-continued
Illustrative structures
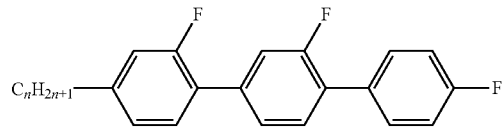
GGP-n-F
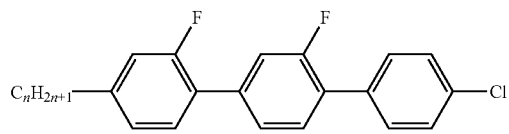
GGP-n-CL
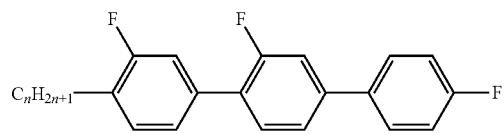
PGIGI-n-F
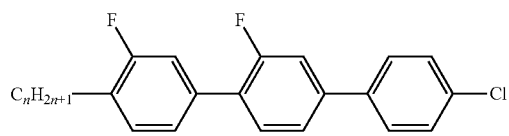
PGIGI-n-CL
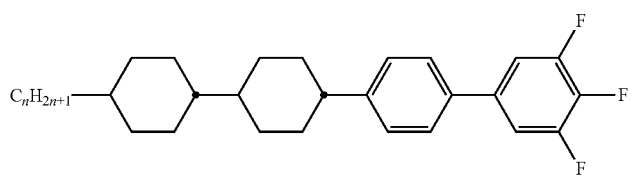
CCPU-n-F
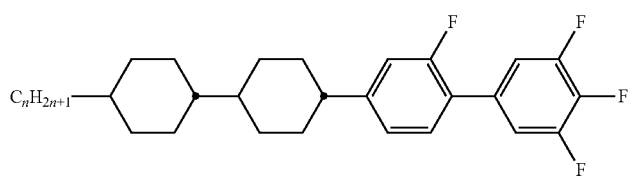
CCGU-n-F
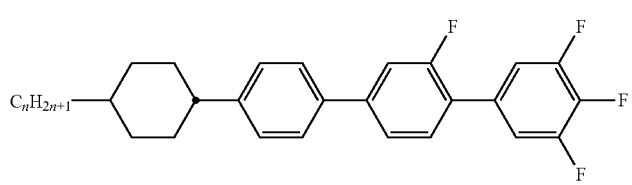
CPGU-n-F TABLE D-continued
Illustrative structures
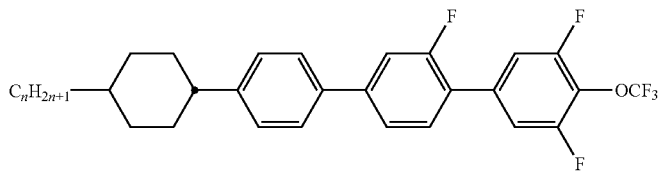
CPGU-n-OT
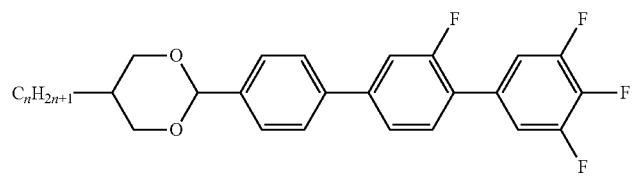
DPGU-n-F
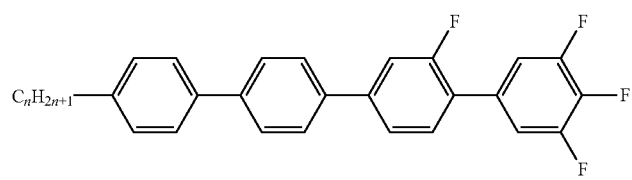
PPGU-n-F
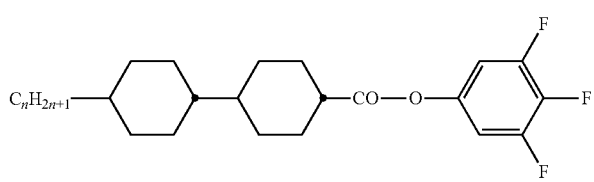
CCZU-n-F
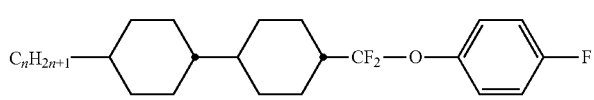
CCQP-n-F
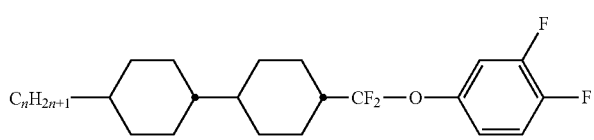
CCQG-n-F
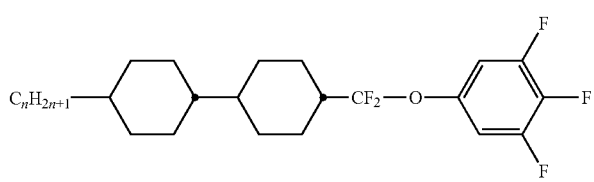
CCQU-n-F TABLE D-continued
Illustrative structures
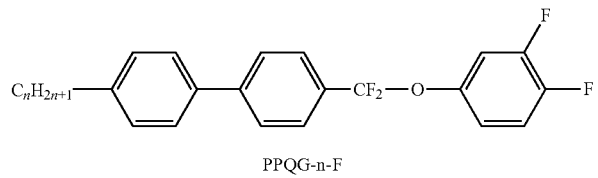
PPQG-n-F
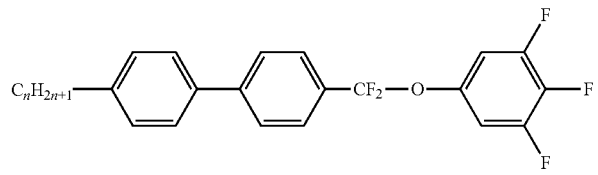
PPQU-n-F
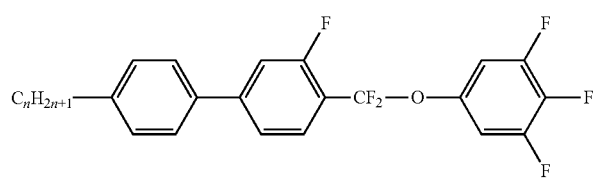
PGQU-n-F
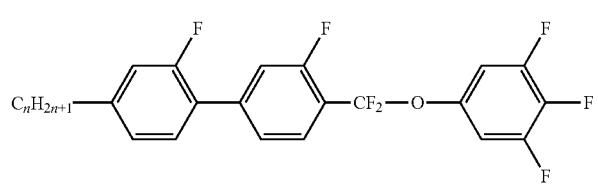
GGQU-n-F
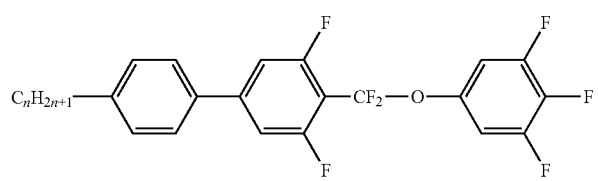
PUQU-n-F
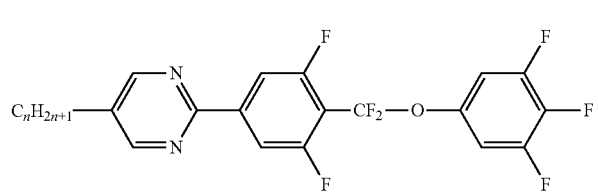
MUQU-n-F
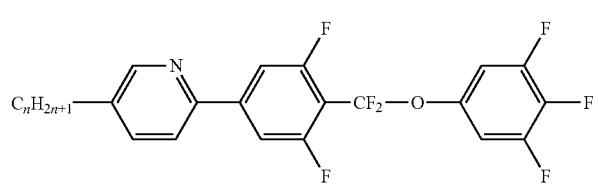
NUQU-n-F TABLE D-continued
Illustrative structures
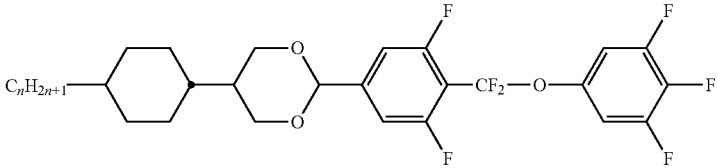
CDUQU-n-F
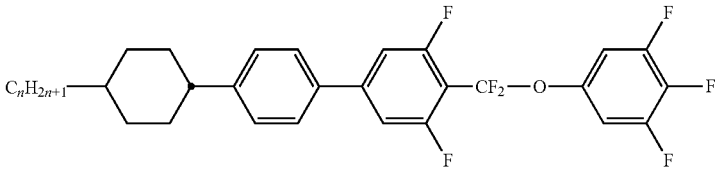
CPUQU-n-F
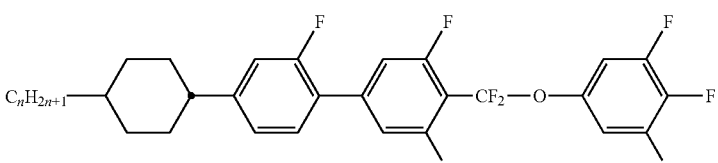
CGUQU-n-F
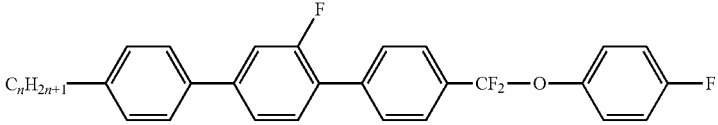
PGPQP-n-F
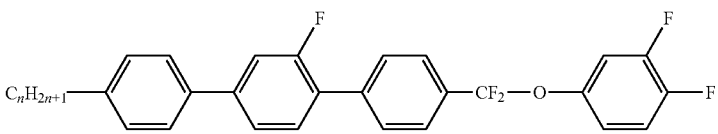
PGPQG-n-F
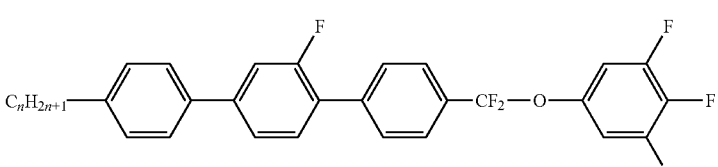
PGPQU-n-F
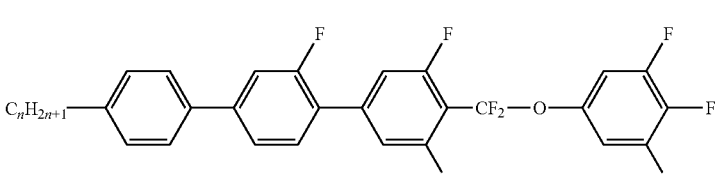
PGUQU-n-F TABLE D-continued
Illustrative structures
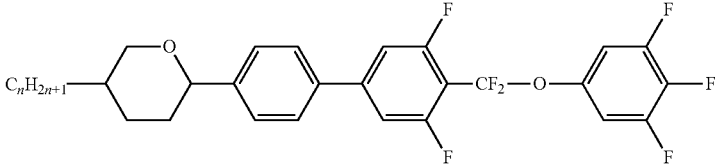
APUQU-n-F
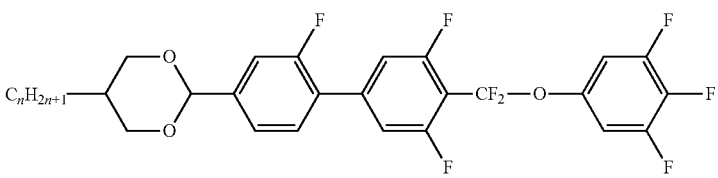
DGUQU-n-F
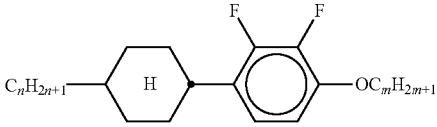
CY-n-Om
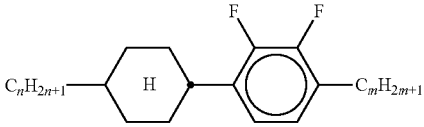
CY-n-m
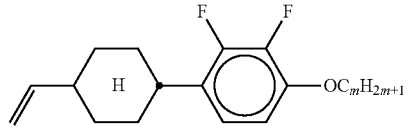
CY-V-Om
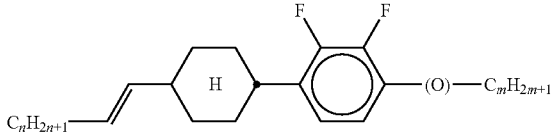
CY-nV-(O)m
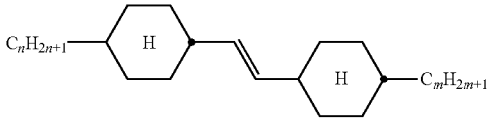
CVC-n-m
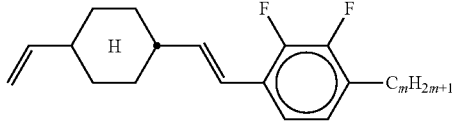
CVY-V-m TABLE D-continued
Illustrative structures
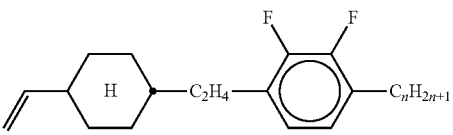
CEY-V-m
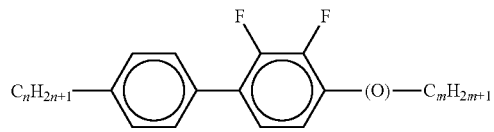
PY-n-(O)m
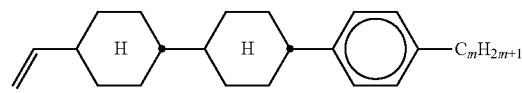
CCP-V-m
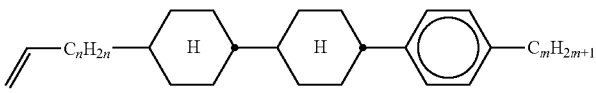
CCP-Vn-m
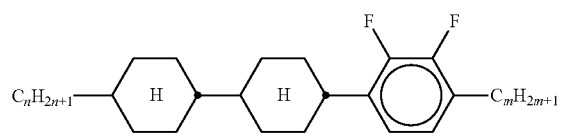
CCY-n-m
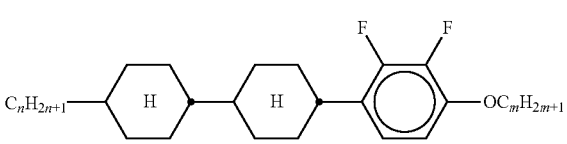
CCY-n-Om
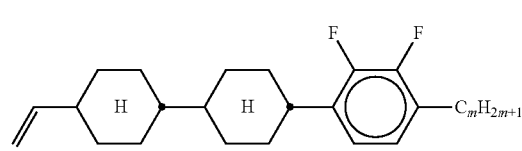
CCY-V-m
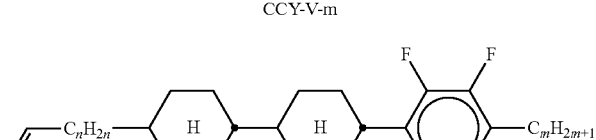
CCY-Vn-m
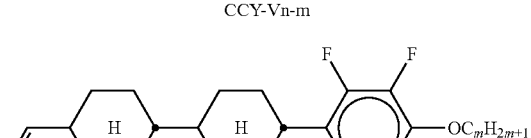
CCY-V-Om TABLE D-continued
Illustrative structures
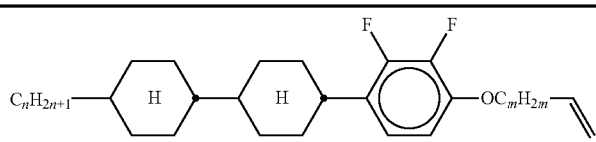
CCY-n-OmV
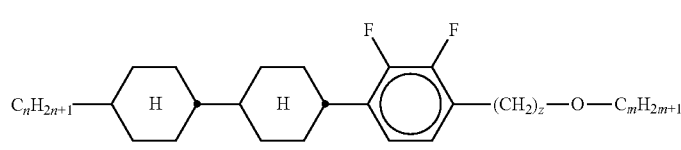
CCY-n-zOm
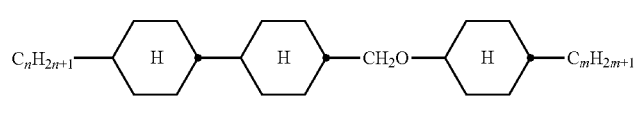
CCOC-n-m
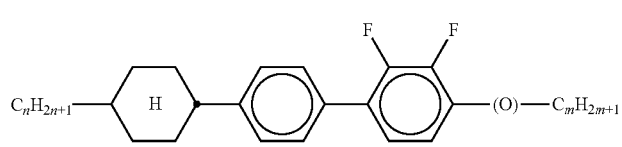
CPY-n-(O)m
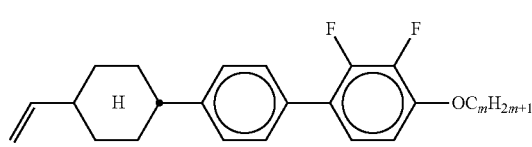
CPY-V-Om
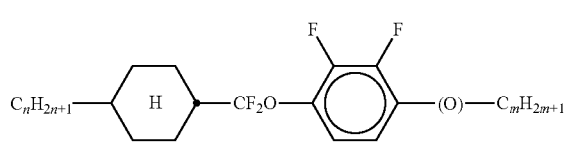
CQY-n-(O)m
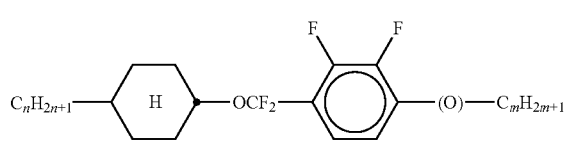
CQIY-n-(O)m
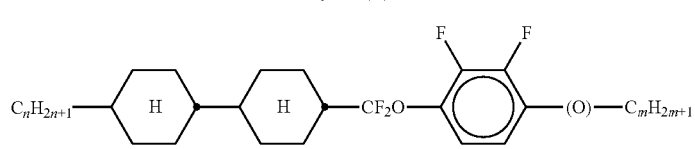
CCQY-n-(O)m
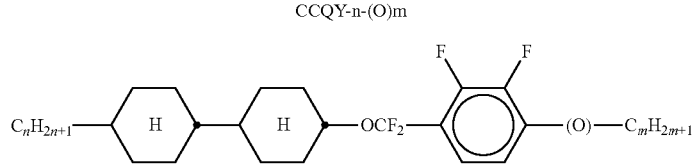
CCQIY-n-(O)m TABLE D-continued
Illustrative structures
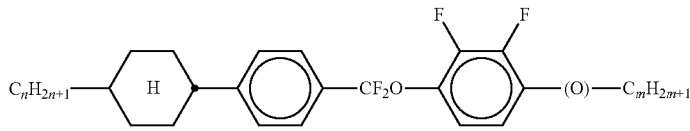
CPQY-n-(O)m
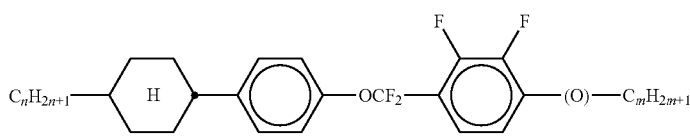
CPQIY-n-Om
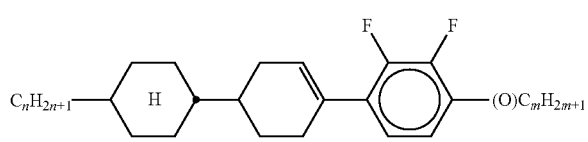
CLY-n-(O)m
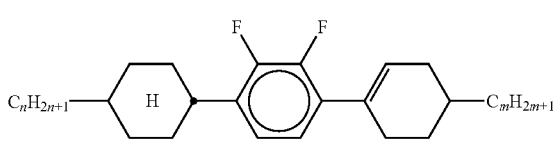
CYLI-n-m
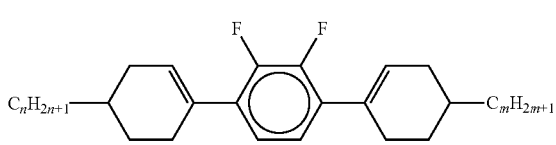
LYLI-n-m
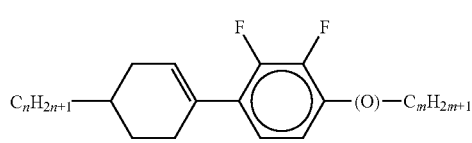
LY-n-(O)m
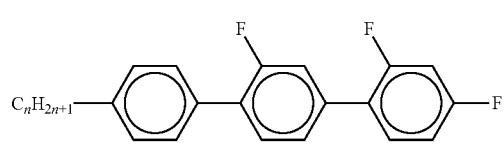
PGIGI-n-F
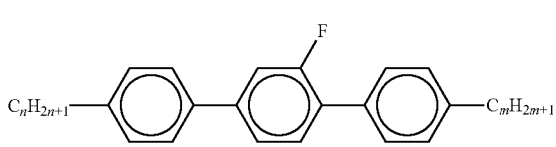
PGP-n-m TABLE D-continued
Illustrative structures
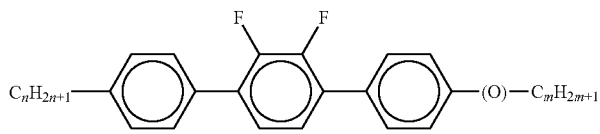
PYP-n-(O)m
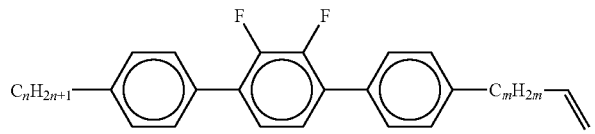
PYP-n-mV
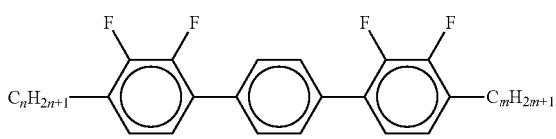
YPY-n-m
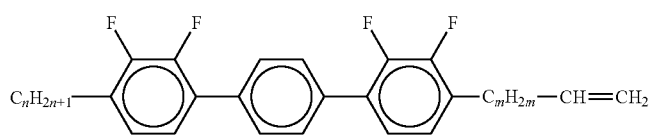
YPY-n-mV
BCH-nm
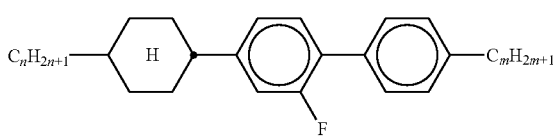
BCH-nmF
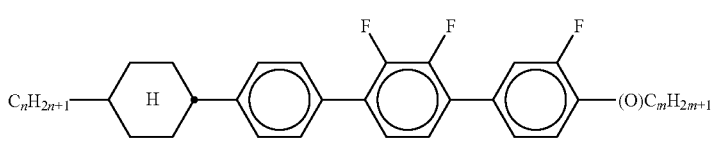
CPYP-n-(O)m
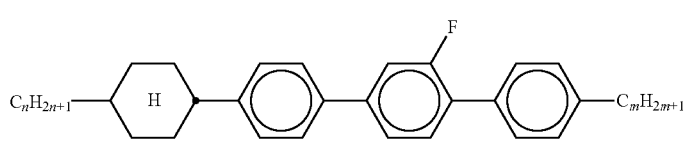
CPGP-n-m TABLE D-continued
Illustrative structures
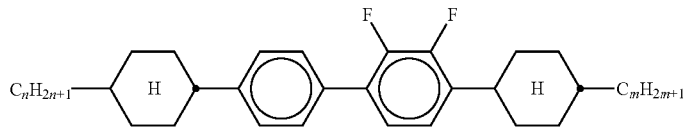
CPYC-n-m
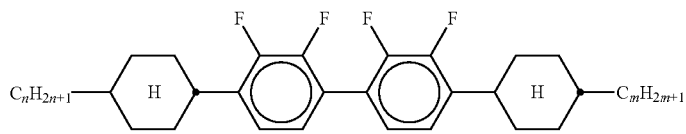
CYYC-n-m
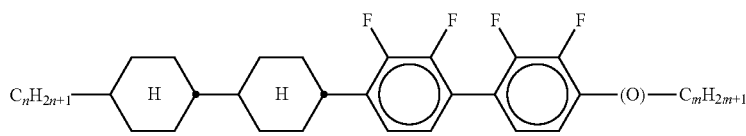
CCYY-n-m
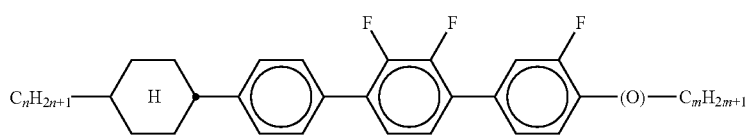
CPYG-n-(O)m
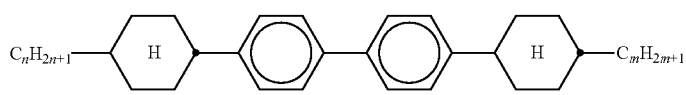
CBC-nm
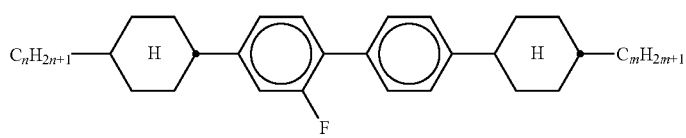
CBC-nmF
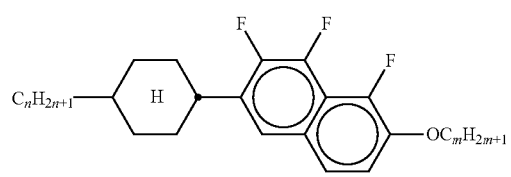
CNap-n-Om
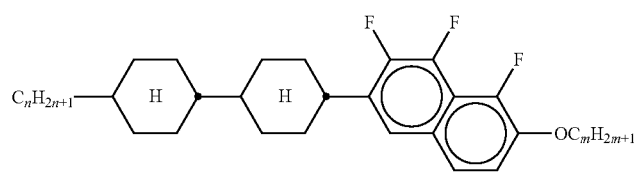
CCNap-n-Om

TABLE D-continued

Illustrative structures

CENap-n-Om

CTNap-n-Om

CETNap-n-Om

CK-n-F

DFDBC-n(O)-(O)m

C-DFDBF-n-(O)m wherein n, m and l preferably, independently of one another, denote 1 to 7.

The following table, Table E, shows illustrative compounds which can be used as additional stabilisers in the mesogenic media according to the present invention.
TABLE E
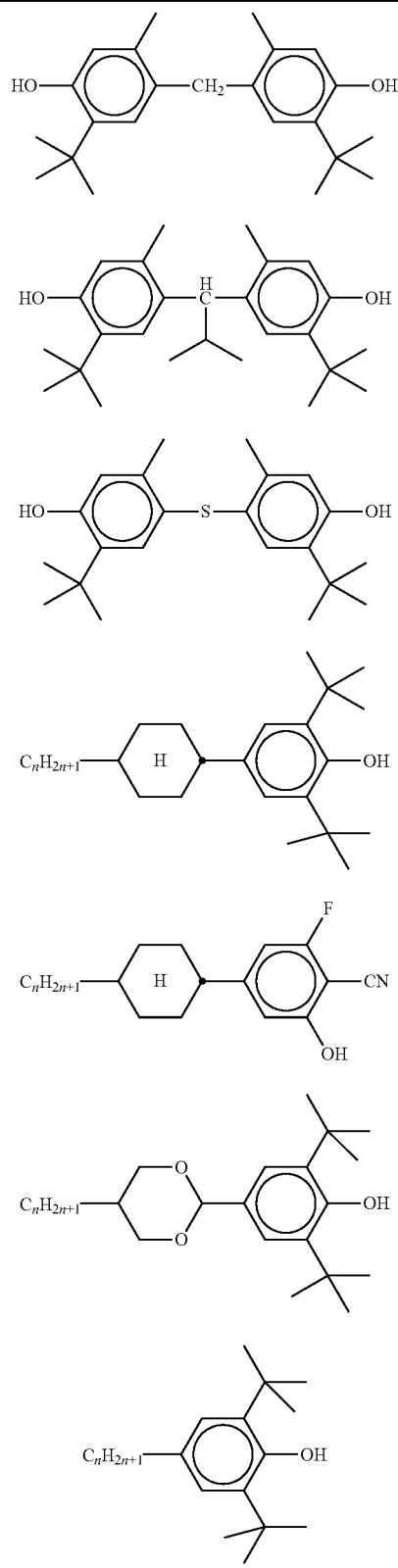

TABLE E-continued

TABLE E-continued
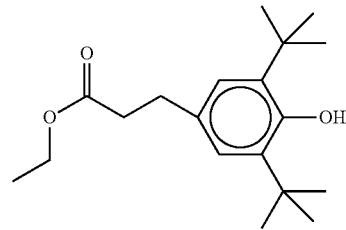
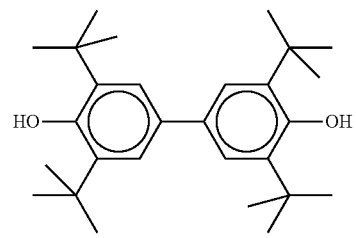
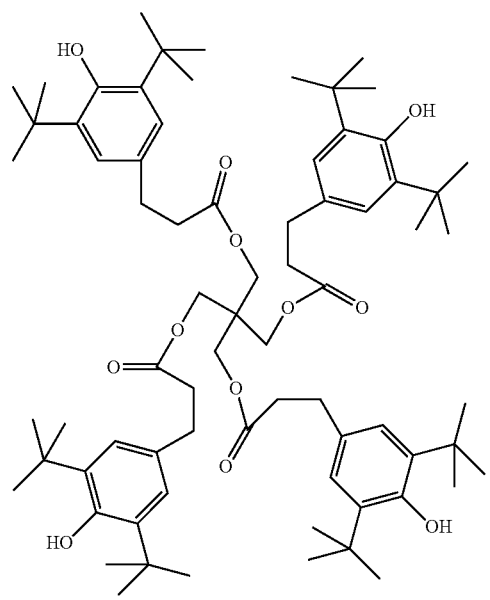 [SMILES: CC(C)(C)c1cc(CCC(=O)OCC(COC(=O)CCc2cc(C(C)(C)C)c(O)c(C(C)(C)C)c2)(COC(=O)CCc2cc(C(C)(C)C)c(O)c(C(C)(C)C)c2)COC(=O)CCc2cc(C(C)(C)C)c(O)c(C(C)(C)C)c2)cc(C(C)(C)C)c1O]
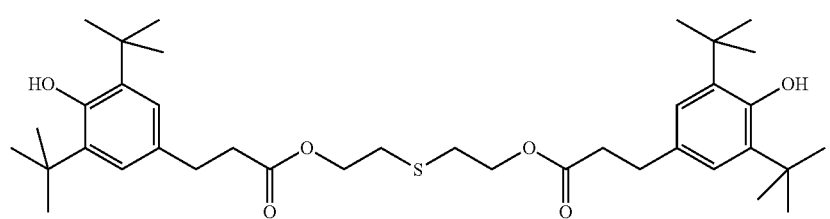 [SMILES: CC(C)(C)c1cc(CCC(=O)OCCSCCOC(=O)CCc2cc(C(C)(C)C)c(O)c(C(C)(C)C)c2)cc(C(C)(C)C)c1O]

TABLE E-continued
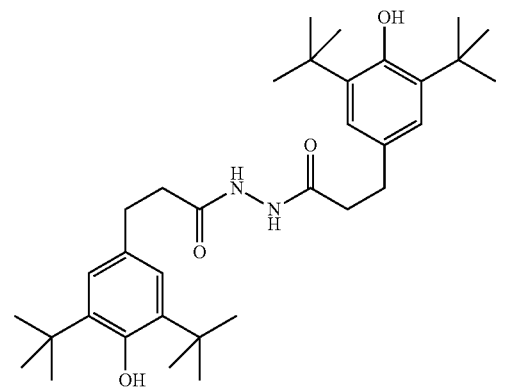 [SMILES: CC(C)(C)c1cc(CCC(=O)NNC(=O)CCc2cc(C(C)(C)C)c(O)c(C(C)(C)C)c2)cc(C(C)(C)C)c1O]
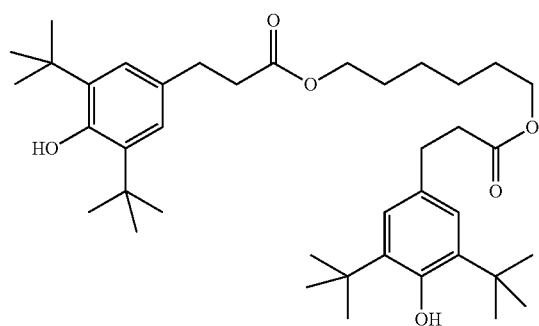 [SMILES: CC(C)(C)c1cc(CCC(=O)OCCCCCCOC(=O)CCc2cc(C(C)(C)C)c(O)c(C(C)(C)C)c2)cc(C(C)(C)C)c1O]
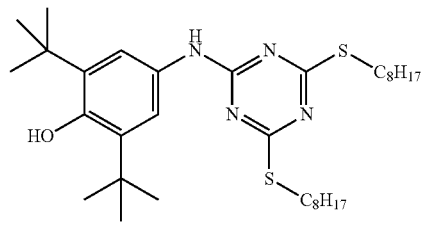
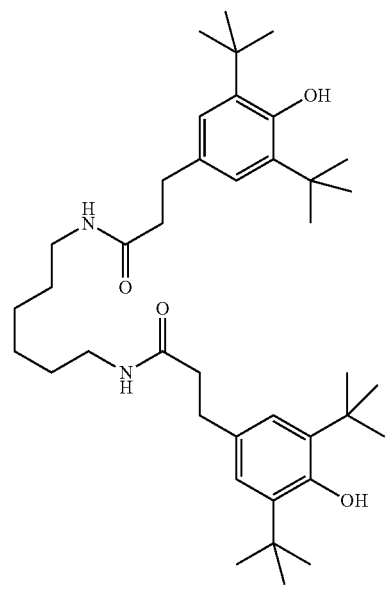 [SMILES: CC(C)(C)c1cc(CCC(=O)NCCCCCCNC(=O)CCc2cc(C(C)(C)C)c(O)c(C(C)(C)C)c2)cc(C(C)(C)C)c1O]

TABLE E-continued
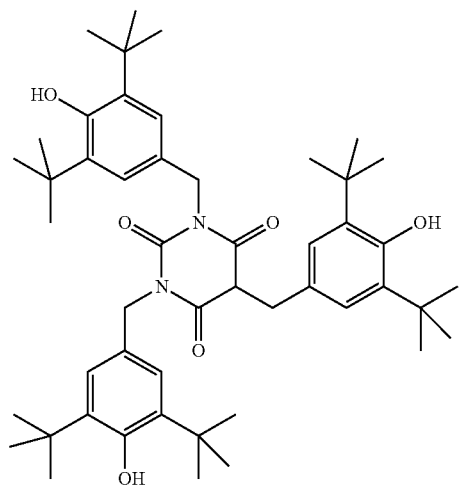 [SMILES: CC(C)(C)c1cc(CC2C(=O)N(Cc3cc(C(C)(C)C)c(O)c(C(C)(C)C)c3)C(=O)N(Cc3cc(C(C)(C)C)c(O)c(C(C)(C)C)c3)C2=O)cc(C(C)(C)C)c1O]
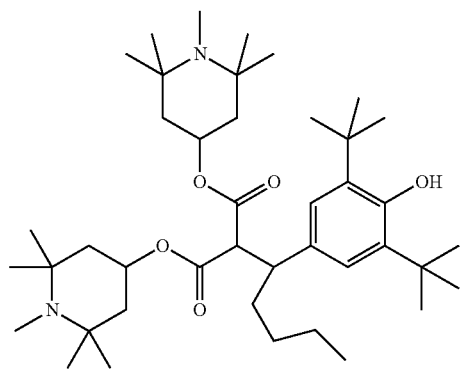 [SMILES: CCCCC(c1cc(C(C)(C)C)c(O)c(C(C)(C)C)c1)C(C(=O)OC1CC(C)(C)N(C)C(C)(C)C1)C(=O)OC1CC(C)(C)N(C)C(C)(C)C1]
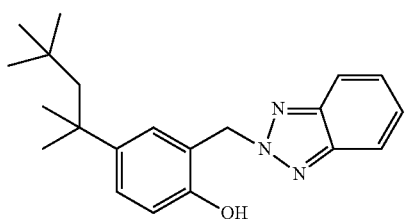 [SMILES: CC(C)(C)CC(C)(C)c1ccc(O)c(Cn2nc3ccccc3n2)c1]
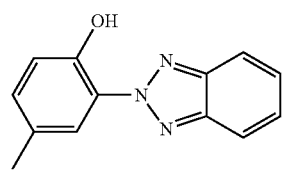 [SMILES: Cc1ccc(O)c(-n2nc3ccccc3n2)c1]
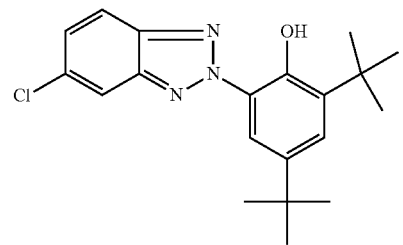 [SMILES: CC(C)(C)c1cc(-n2nc3ccc(Cl)cc3n2)c(O)c(C(C)(C)C)c1]

TABLE E-continued
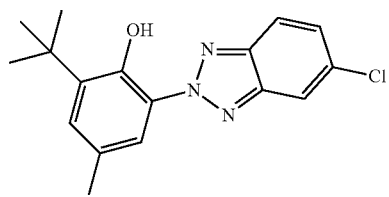 [SMILES: Cc1cc(-n2nc3ccc(Cl)cc3n2)c(O)c(C(C)(C)C)c1]
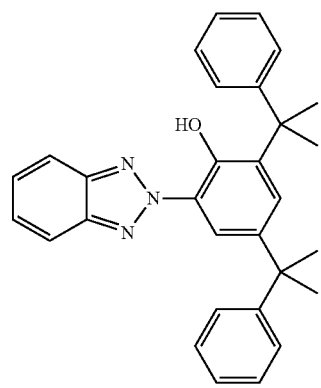 [SMILES: CC(C)(c1ccccc1)c1cc(-n2nc3ccccc3n2)c(O)c(C(C)(C)c2ccccc2)c1]
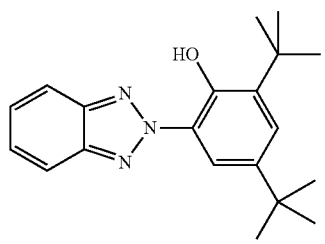 [SMILES: CC(C)(C)c1cc(-n2nc3ccccc3n2)c(O)c(C(C)(C)C)c1]
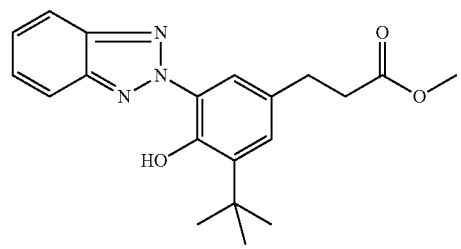 [SMILES: COC(=O)CCc1cc(-n2nc3ccccc3n2)c(O)c(C(C)(C)C)c1]
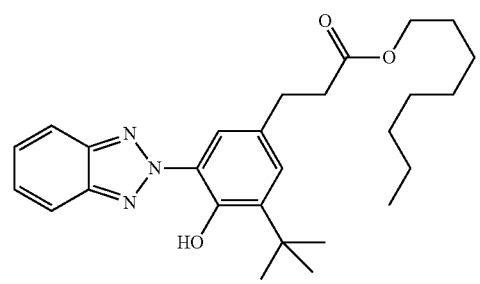 [SMILES: CCCCCCCCOC(=O)CCc1cc(-n2nc3ccccc3n2)c(O)c(C(C)(C)C)c1]

TABLE E-continued
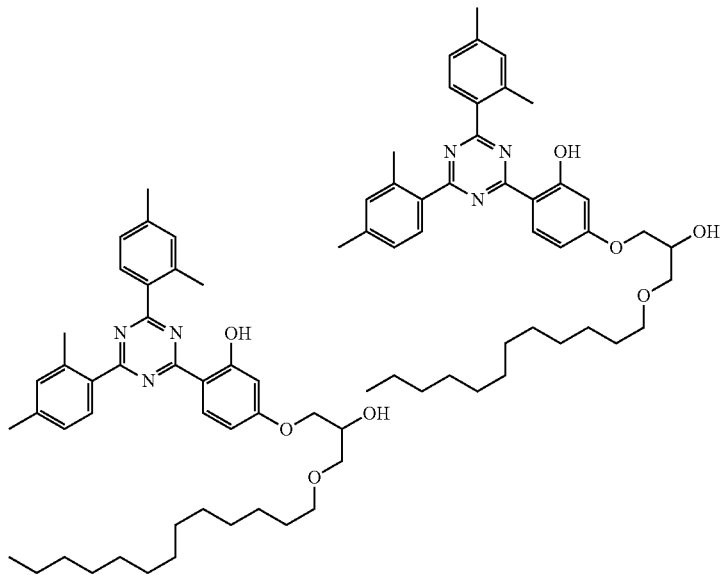
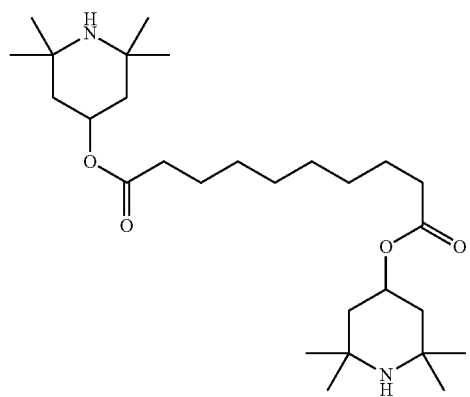
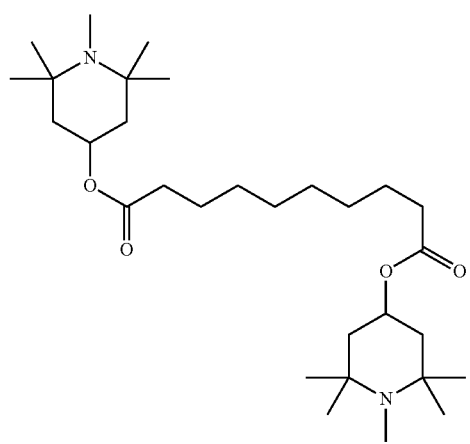

TABLE E-continued
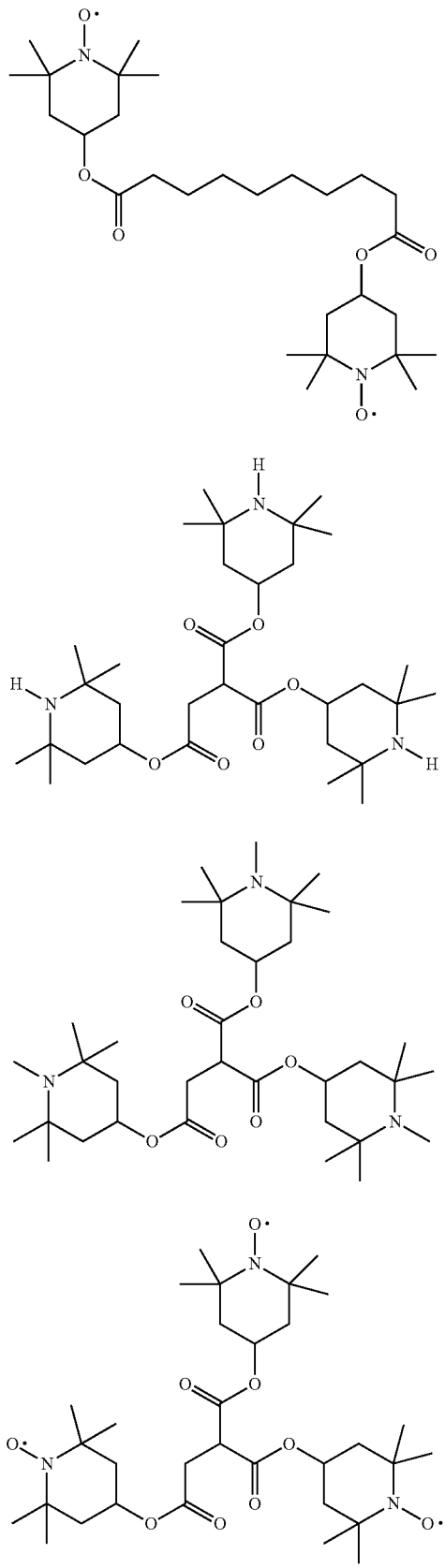

TABLE E-continued

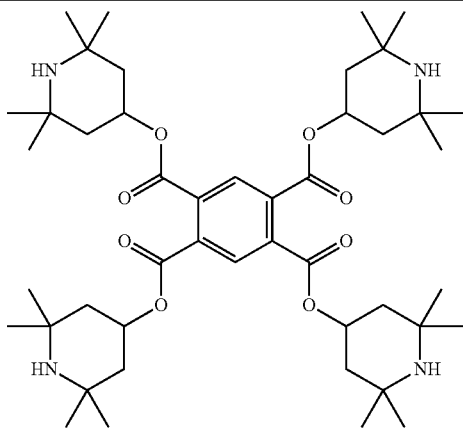

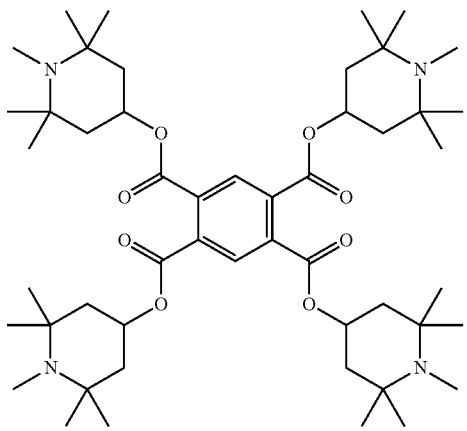

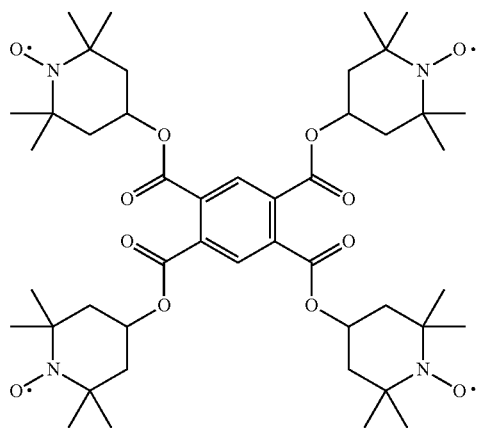

Table E shows possible stabilisers which can be added to the LC media according to the invention.

(n here denotes an integer from 1 to 12, preferably 1, 2, 3, 4, 5, 6, 7 or 8, terminal methyl groups are not shown).

The LC media preferably comprise 0 to 10% by weight, in particular 1 ppm to 5% by weight, particularly preferably 1 ppm to 1% by weight, of stabilisers.

Table F below shows illustrative compounds which can preferably be used as chiral dopants in the mesogenic media according to the present invention.

TABLE F
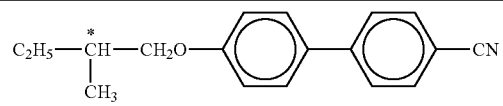
C 15
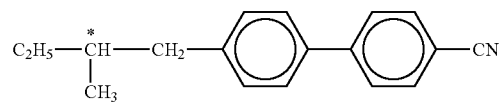
CB 15
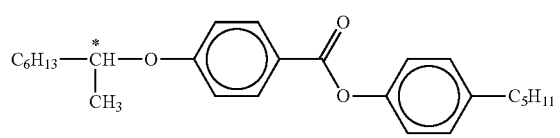
CM 21
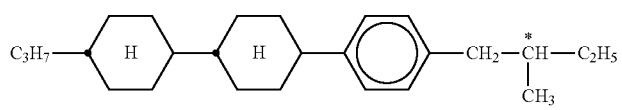
CM 44
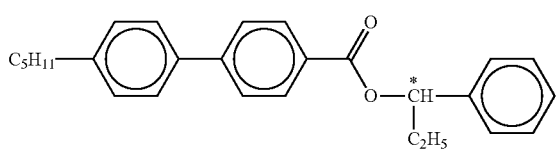
CM 45
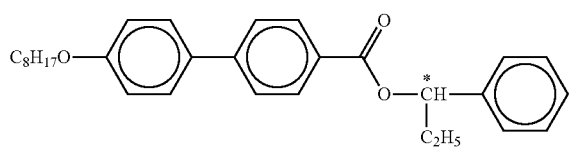
CM 47
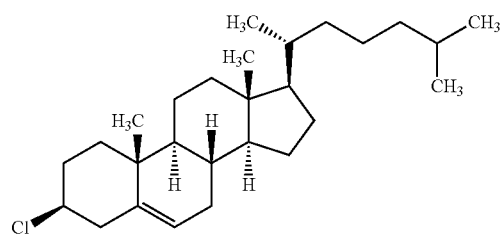
CC
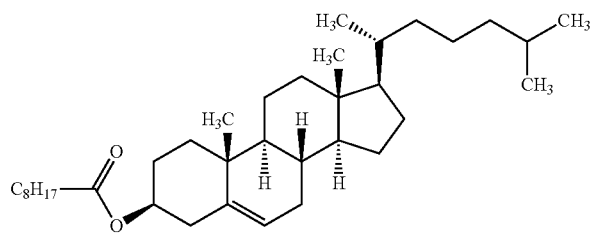
CN TABLE F-continued

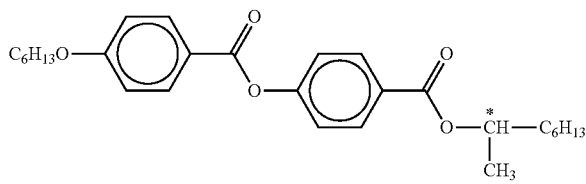

R/S-811

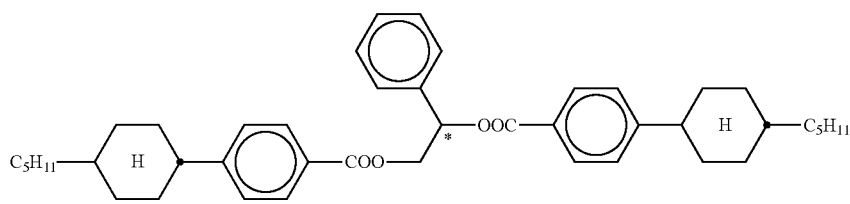

R/S-1011

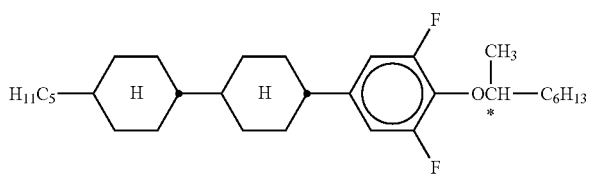

R/S-2011

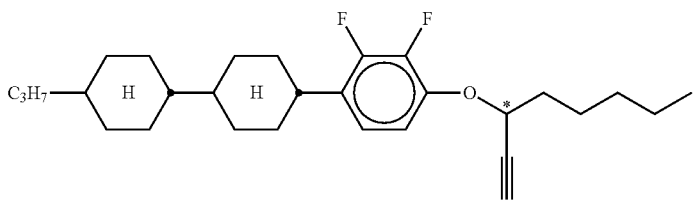

R/S-3011

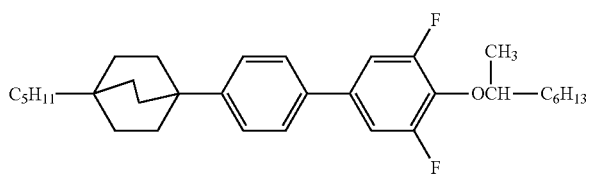

R/S-4011

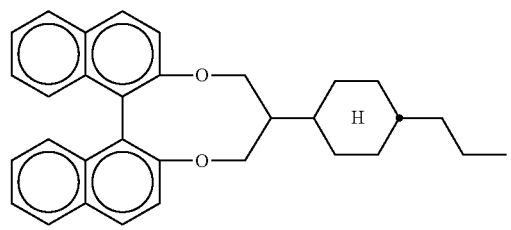

R/S-5011

In a preferred embodiment of the present invention, the mesogenic media comprise one or more compounds selected from the group of the compounds from Table F.

The mesogenic media according to the present application preferably comprise two or more, preferably four or more, compounds selected from the group consisting of the compounds from the above tables.

The liquid-crystal media according to the present invention preferably comprise seven or more, preferably eight or more, individual compounds, preferably of three or more, particularly preferably of four or more, different formulae, selected from the group of the compounds from Table D.

EXAMPLES

Hereinafter, the present invention is described in more detail and specifically with reference to the Examples, which however are not intended to limit the present invention.

Synthesis

Synthesis of Example S-2

Stage 1: 2-[2-(4-acetoxyphenyl)-diazenyl]benzoic acid

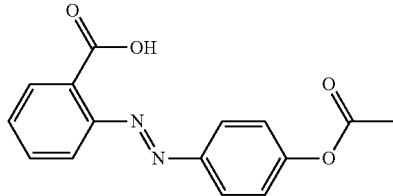 [SMILES: CC(=O)Oc1ccc(/N=N/c2ccccc2C(=O)O)cc1]

To a solution of 2-[2-(4-hydroxyphenyl)-diazenyl]benzoic acid (20.0 g, 0.083 mol) in dichloromethane (150 ml) and pyridine (43 ml) was added acetic anhydride (17.3 g; 0.17 mol). After stirring overnight at ambient temperature the mixture was partitioned between dichloromethane (500 ml) and 2M hydrochloric acid (500 ml). The aqueous layer was re-extracted with dichloromethane (300 ml) and the combined organic layers were dried over sodium sulphate, filtered and then evaporated in vacuo. The residue was purified by chromatography on silica gel (300 g) eluting with 0-5% ethyl acetate in dichloromethane to yield the product as an orange solid.

Stage 2

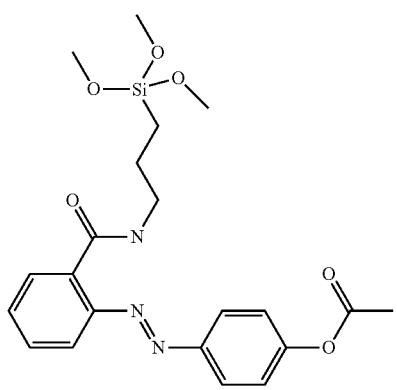 [SMILES: CO[Si](CCCNC(=O)c1ccccc1/N=N/c1ccc(OC(C)=O)cc1)(OC)OC]

To a solution of 2-[2-(4-acetoxyphenyl)-diazenyl]benzoic acid (2.58 g; 0.0092 mol) and N-hydroxysuccinimide (1.15 g; 0.01 mol) in anhydrous dichloromethane (24 ml) was added dicyclohexylcarbodiimide (1M in dichloromethane; 9.5 ml; 0.0095 mol). After 30 minutes, (3-aminopropyl) trimethoxysilane (2.13 g; 2.1 ml; 0.012 moles) was added to the red slurry. After 20 hours, the reaction mixture was evaporated, slurried in 1:1 ethyl acetate/petroleum ether (70 ml), filtered and the solids were washed with 1:1 ethyl acetate:40/60 petroleum ether (2×50 ml). The filtrate was evaporated in vacuo to a dark red oil and layered onto a 60 g silica gel column. Elution with 20-33% ethyl acetate in 40/60 petroleum ether afforded Example S:2 as a red oil.

Fabrication of Display Cells

The display cells are made with raw untreated alkali-free glass using 5 μm spacer beads in Norland 65 adhesive. The cells are assembled by hand and then cured using a high pressure mercury lamp at 50 mW/cm$^2$ and 3000mJ/cm$^2$.

Cell Filling and Curing

The LC mixtures are capillary filled on a hot plate at 100° C., then left to stand for a further hour at 100° C. and then irradiated with linearly polarised UV light (50 mW/cm$^2$) for 60s. The cells are cooled slowly to room temperature at a cooling rate of 5° C. per minute.

Mixture Examples

A nematic LC host mixture N-1 was prepared as follows:

| Mixture N-1: | | |
|---|---|---|
| Composition Compound | | |
| No. | Abbreviation | c/% |
| 1 | CC-3-V | 37.00 |
| 2 | CCY-3-O1 | 5.00 |
| 3 | CCY-3-O2 | 9.50 |
| 4 | CCY-4-O2 | 5.00 |
| 5 | CPY-2-O2 | 10.00 |
| 6 | CPY-3-O2 | 10.00 |
| 7 | CY-3-O2 | 11.50 |
| 8 | PY-3-O2 | 12.00 |
| Σ | | 100.0 |
| Physical properties | | |
| $T(N, I) = 73.5°$ C. | | |
| $n_e$ (20° C., 589.3 nm) = 1.583 | | |
| $\Delta n$ (20° C., 589.3 nm) = 0.1005 | | |
| $\varepsilon_{\parallel}$ (20° C., 1 kHz) = 3.70 | | |
| $\Delta\varepsilon$ (20° C., 1 kHz) = −3.65 | | |
| $k_1$(20° C.) = 12.7 | | |
| $k_3$(20° C.) = 14.7 | | |
| $\gamma_1$ (20° C.) = 93 | | |

A nematic LC host mixture N-2 was prepared as follows:

| Mixture N-2: | | |
|---|---|---|
| Composition Compound | | |
| No. | Abbreviation | c/% |
| 1 | APUQU-2-F | 6.00 |
| 2 | APUQU-3-F | 6.00 |
| 3 | CC-3-V | 44.5 |
| 4 | CC-3-V1 | 4.00 |
| 5 | CCP-3OCF$_3$ | 7.00 |
| 6 | CCP-V-1 | 5.00 |
| 7 | CPGU-3-OT | 3.00 |
| 8 | PGP-2-2V | 5.50 |
| 9 | PGUQU-3-F | 3.00 |
| 10 | PGUQU-4-F | 7.00 |
| 11 | PGUQU-5-F | 3.00 |
| 12 | PUQU-3-F | 6.00 |
| Σ | | 100.0 |
| Physical properties | | |
| $T(N, I) = 73.5°$ C. | | |
| $n_e$ (20° C., 589.3 nm) = 1.5902 | | |

-continued

Mixture N-2:

Δn (20° C., 589.3 nm) = 0.1086
$\epsilon_{\|}$ (20° C., 1 kHz) = 12.9
Δε (20° C., 1 kHz) = 9.6
$k_1$(20° C.) = 12.4
$k_3$(20° C.) = 13.8
$\gamma_1$ (20° C.) = 67

Example 1

A test display is fabricated according to the procedure described above without the UV-irradiation step, using 1% of S-2 in nematic host mixture N-1. The cell is placed between crossed polarisers on a light table and aligned so that a dark state is achieved. Rotation by 45° gives the bright state. Both dark and bright state appear uniform which proves uniform planar alignment.

The alignment is reversible when the cell is heated above the clearing point of the liquid crystal host mixture for 30 min.

Example 2

To fix the alignment, 3% of compound 10-1-1a are added to the mixture from Example 1 and the fabrication process was performed in the same way.

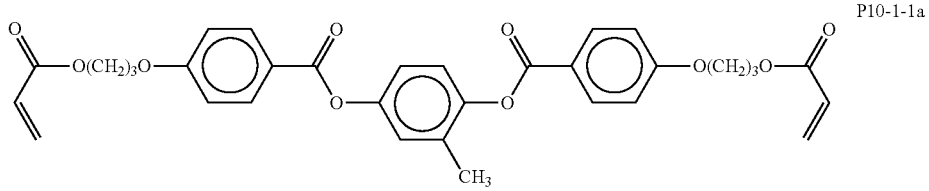

P10-1-1a

The cell is investigated in the same way as described in Example 1 and uniform planar alignment is observed. Afterwards the cell is heated at 100° C. and at the same time illuminated with polarised white light for 30 min. Investigation between crossed polarizer show no change of the uniform planar alignment nor rotation of the alignment direction.

Example 3

A test display is fabricated according to the procedure described above without the UV-irradiation step, using 1% of S-2 in nematic host mixture N-2. The cell is placed between crossed polarisers on a light table and aligned so that a dark state is achieved. Rotation by 45° gives the bright state. Both dark and bright state appear uniform which proves uniform planar alignment.

In each case the alignment can be equally achieved using either UV or white linearly polarised light.

The invention claimed is:

1. A method for manufacturing a liquid crystal display device comprising at least the steps of:
   providing a first substrate which includes a pixel electrode and a common electrode;
   providing a second substrate, the second substrate being disposed opposite to the first substrate;
   interposing a liquid crystal mixture between the first substrate and the second substrate, the liquid crystal mixture comprising liquid crystal molecules, at least one self assembling photoalignment compound of formula S below and at least one polymerisable compound of formula P below;
   irradiating the liquid crystal mixture with linearly polarised light causing photoalignment of the liquid crystal mixture;
   curing the polymerisable compound by irradiation with ultraviolet light causing fixation of alignment;
   wherein formula S is

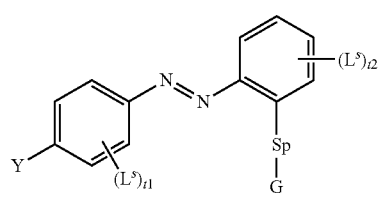

S wherein
Y denotes $(R^b)_2N$—, $R^cC(O)O$—, or a group $L^s$,
Sp denotes a spacer group,
G denotes —OH or $Si(OR^a)_3$,
$R^a$, $R^b$, $R^c$ each denote, identically or differently, straight chain or branched alkyl with 1 to 6 C atoms,
$L^s$ each, identically or differently, denotes F, Cl, CN, SCN, $SF_5$, or straight-chain or branched, in each case optionally fluorinated, alkyl, alkoxy, alkylcarbonyl, alkoxycarbonyl, alkylcarbonyloxy or alkoxycarbonyloxy having up to 12 C atoms,
t1, t2 denote 0, 1, 2, 3 or 4,
and formula P is

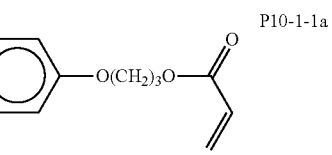

P wherein
$P^a$, $P^b$ each, independently of one another, denote a polymerisable group,
$Sp^a$, $Sp^b$ on each occurrence, identically or differently, denote a spacer group,
s1, s2 each, independently of one another, denote 0 or 1,
$A^1$, $A^2$ each, independently of one another, denote a radical selected from the following groups:
   a) the group consisting of trans-1,4-cyclohexylene, 1,4-cyclohexenylene and 4,4'-bicyclohexylene, in which one or more non-adjacent $CH_2$ groups may be replaced by —O— and/or —S— and wherein one or more H atoms may be replaced by F,
   b) the group consisting of 1,4-phenylene and 1,3-phenylene, in which one or two CH groups may be replaced by N and wherein one or more H atoms may be replaced by L, c) the group consisting of tetrahydropyran-2,5-diyl, 1,3-dioxane-2,5-diyl, tetrahydrofuran-2,5-diyl, cyclobutane-1,3-diyl, piperidine-1,4-diyl, thiophene-2,5-diyl and selenophene-2,5-diyl, each of which may also be mono- or polysubstituted by L, d) the group consisting of saturated, partially unsaturated or fully unsaturated, and optionally substituted, polycyclic radicals having 5 to 20 cyclic C atoms, one or more of which may be replaced by heteroatoms, n2 denotes 0, 1, 2 or 3, $Z^1$ in each case, independently of one another, denotes —CO—O—, —O—CO—, —CH$_2$O—, —OCH$_2$—, —CF$_2$O—, —OCF$_2$—, or —(CH$_2$)$_n$—, where n is 2, 3 or 4, —O—, —CO—, —C(R$^0$R$^{00}$)—, —CH$_2$CF$_2$—, —CF$_2$CF$_2$— or a single bond, L on each occurrence, identically or differently, denotes F, Cl, CN, SCN, SF$_5$ or straight-chain or branched, in each case optionally fluorinated, alkyl, alkoxy, alkylcarbonyl, alkoxycarbonyl, alkylcarbonyloxy or alkoxycarbonyloxy having up to 12 C atoms, $R^0$, $R^{00}$ each, independently of one another, denote H, F or straight-chain or branched alkyl having 1 to 12 C atoms, wherein one or more H atoms may be replaced by F, M denotes —O—, —S—, —CH$_2$—, —CHY$^1$— or —CY$^1$Y$^2$—, and $Y^1$ and $Y^2$ each, independently of one another, have one of the meanings indicated above for $R^0$ or denote Cl or CN.

2. The method according to claim 1, wherein the linearly polarised light is linearly polarised ultraviolet light.

3. The method according to claim 1, wherein the total concentration of the at least one compound of formula S in the liquid crystal mixture is 0.01 to 10%.

4. The method according to claim 1, wherein the total concentration of the at least one or compound of formula P in the liquid crystal mixture is in the range of from 0.01 to 10%.

5. The method according to claim 1, wherein the LC mixture comprises at least one compound selected from the group of compounds of formulae P10-1-1 and P10-1-2

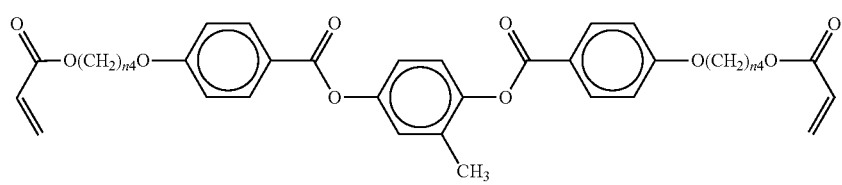

P10-1-1

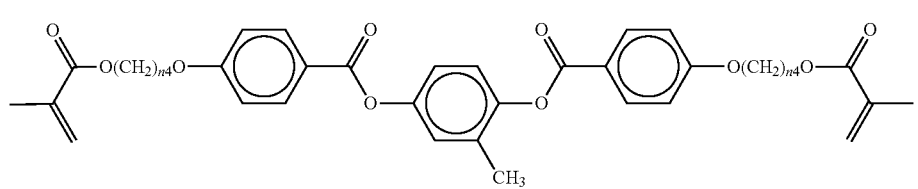

P10-1-2 wherein
n4 denotes an integer between 2 and 10.

6. The method according to claim 1, wherein the at least one compound of formula S is of formula S-1

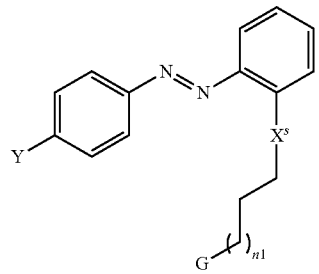

S-1 wherein

Y and G have the meaning as defined for formula S, $X^s$ denotes O, —C(O)O—, C(O)NH— or a single bond, and n1 is an integer from 0 to 10.

7. The method according to claim 1, wherein the LC mixture has negative dielectric anisotropy.

8. The method according to claim 7, wherein the LC mixture comprises at least one compound selected from the group of the following formulae:

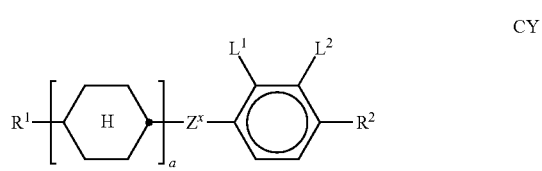

CY

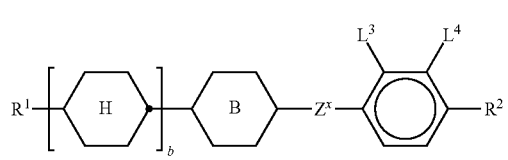

PY wherein
a denotes 1 or 2,
b denotes 0 or 1,

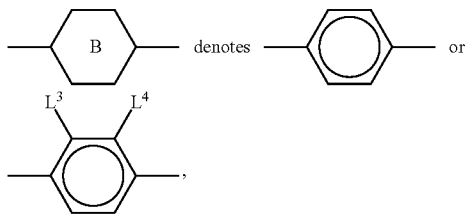

R$^1$ and R$^2$ each, independently of one another, denote alkyl having 1 to 12 C atoms, in which one or two non-adjacent CH$_2$ groups may be replaced by —O—, —CH=CH—, —CO—, —O—CO— or —CO—O— in such a way that O atoms are not linked directly to one another, Z$^x$ denotes —CH=CH—, —CH$_2$O—, —OCH$_2$—, —CF$_2$O—, —OCF$_2$—, —O—, —CH$_2$—, —CH$_2$CH$_2$— or a single bond, and L$^{1-4}$ each, independently of one another, denote F, Cl, OCF$_3$, CF$_3$, CH$_3$, CH$_2$F, or CHF$_2$.

9. The method according to claim 1, wherein the LC mixture has positive dielectric anisotropy.

10. The method according to claim 9, wherein the LC mixture comprises at least one compound selected from the group of compounds of formulae II and III,

II

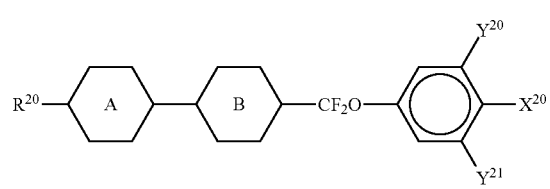

III

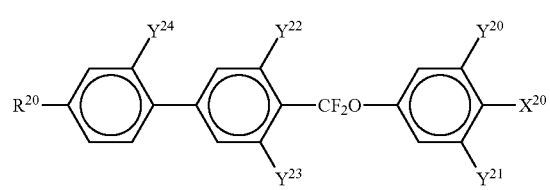

wherein
R$^{20}$ each, identically or differently, denotes a halogenated or unsubstituted alkyl or alkoxy radical having 1 to 15 C atoms, in which one or more CH$_2$ groups may each be replaced, independently of one another, by —C≡C—, —CF$_2$O—, —CH=CH—,

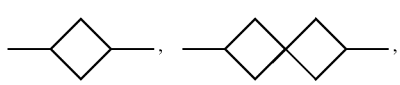

—O—, —CO—O— or —O—CO— in such a way that O atoms are not linked directly to one another, X$^{20}$ each, identically or differently, denote F, Cl, CN, SF$_5$, SCN, NCS, a halogenated alkyl radical, a halogenated alkenyl radical, a halogenated alkoxy radical or a halogenated alkenyloxy radical, each having up to 6 C atoms, Y$^{20-24}$ each, identically or differently, denote H or F, and

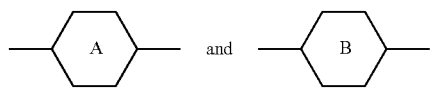

each, identically or differently, denote

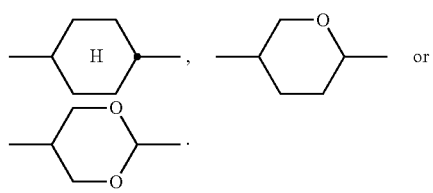

11. The method according to claim 9, wherein the liquid crystal mixture comprises at least one compound selected from the group of compounds of formulae XI and XII

XI

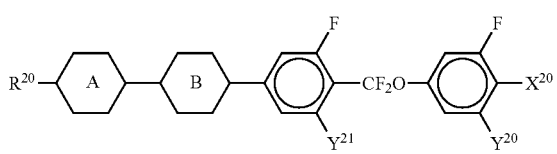

XII

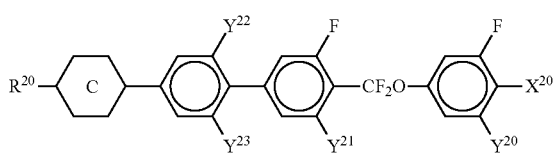

wherein

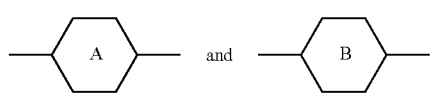

and each, independently of one another, denote

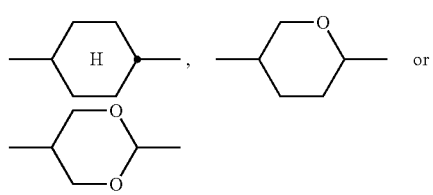

143

-continued

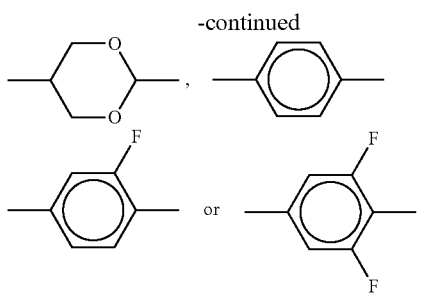

$R^{20}$ each, identically or differently, denotes a halogenated or unsubstituted alkyl or alkoxy radical 1 to 15 C atoms, in which one or more $CH_2$ groups may each be replaced, independently of one another, by —C≡C—, —$CF_2O$—, —CH=CH—,

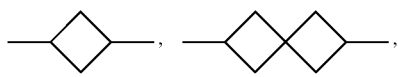

—O—, —CO—O— or —O—CO— in such a way that O atoms are not linked directly to one another, $X^{20}$ each, identically or differently, denote F, Cl, CN, $SF_5$, SCN, NCS, a halogenated alkyl radical, a halogenated alkenyl radical, a halogenated alkoxy radical or a halogenated alkenyloxy radical, each having up to 6 C atoms, and $Y^{20-23}$ each, identically or differently, denotes H or F.

12. The method according to claim 1, wherein the LC mixture comprises at least one compound of formula D:

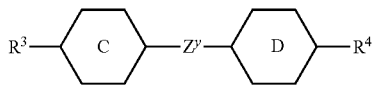

D wherein

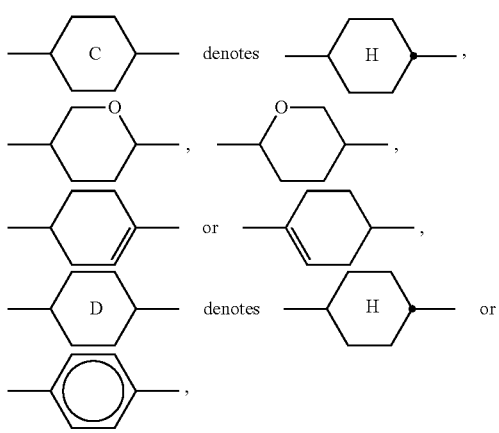

$R^3$ and $R^4$ each, independently of one another, denote alkyl having 1 to 12 C atoms, in which one or two non-adjacent $CH_2$ groups may be replaced by —O—, —CH=CH—, —CO—, —O—CO— or —CO—O— in such a way that O atoms are not linked directly to one another, and

144

$Z^y$ denotes —$CH_2CH_2$—, —CH=CH—, —$CF_2O$—, —$OCF_2$—, —$CH_2O$—, —$OCH_2$—, —COO—, —OCO—, —$C_2F_4$—, —CF=CF— or a single bond.

13. The method according to claim 1, wherein the LC mixture comprises at least one compound selected from the following formulae:

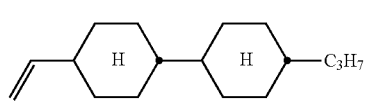
D1a

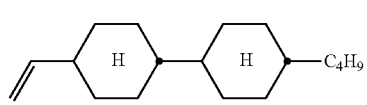
D1b

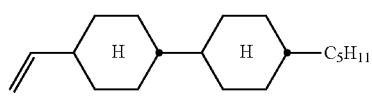
D1c

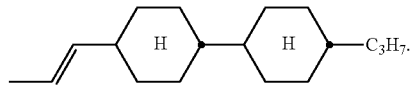
D1d

14. A liquid crystal display, which is manufactured according to the method of claim 1.

15. The liquid crystal display according to claim 14, which is an IPS or FFS display.

16. A compound of formula S

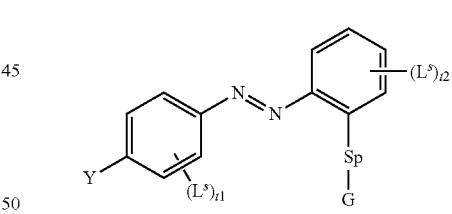
S wherein

Y denotes $(R^b)_2N$—, $R^cC(O)O$—, or a group $L^s$,

Sp denotes a spacer group,

G denotes —OH or $Si(OR^a)_3$, $R^a$, $R^b$, $R^c$ each denote, identically or differently, straight chain or branched alkyl with 1 to 6 C atoms, $L^s$ each, identically or differently, denotes F, Cl, CN, SCN, $SF_5$, or straight-chain or branched, in each case optionally fluorinated, alkyl, alkoxy, alkylcarbonyl, alkoxycarbonyl, alkylcarbonyloxy or alkoxycarbonyloxy have up to 12 C atoms, and t1, t2 denotes 0, 1, 2, 3 or 4, with the proviso that the following compound is excluded:

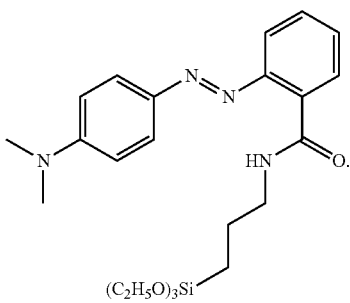

17. An LC mixture, comprising a compound of formula S according to claim 16 and liquid crystal molecules and a polymerisable compound of formula P

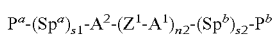

wherein
- $P^a$, $P^b$ each, independently of one another, denote a polymerisable group,
- $Sp^a$, $Sp^b$ on each occurrence, identically or differently, denote a spacer group,
- s1, s2 each, independently of one another, denote 0 or 1,
- $A^1$, $A^2$ each, independently of one another, denote a radical selected from the following groups:
  a) the group consisting of trans-1,4-cyclohexylene, 1,4-cyclohexenylene and 4,4'-bicyclohexylene, in which one or more non-adjacent $CH_2$ groups may be replaced by —O— and/or —S— and wherein one or more H atoms may be replaced by F,
  b) the group consisting of 1,4-phenylene and 1,3-phenylene, in which one or two CH groups may be replaced by N and wherein one or more H atoms may be replaced by L,
  c) the group consisting of tetrahydropyran-2,5-diyl, 1,3-dioxane-2,5-diyl, tetrahydrofuran-2,5-diyl, cyclobutane-1,3-diyl, piperidine-1,4-diyl, thiophene-2,5-diyl and selenophene-2,5-diyl, each of which may also be mono- or polysubstituted by L,
  d) the group consisting of saturated, partially unsaturated or fully unsaturated, and optionally substituted, polycyclic radicals having 5 to 20 cyclic C atoms, one or more of which may be replaced by heteroatoms,
- n2 denotes 0, 1, 2 or 3,
- $Z^1$ in each case, independently of one another, denotes —CO—O—, —O—CO—, —CH$_2$O—, —OCH$_2$—, —CF$_2$O—, —OCF$_2$—, or —(CH$_2$)$_n$—, where n is 2, 3 or 4, —O—, —CO—, —C(R$^0$R$^{00}$)—, —CH$_2$CF$_2$—, —CF$_2$CF$_2$— or a single bond,
- L on each occurrence, identically or differently, denotes F, Cl, CN, SCN, SF$_5$ or straight-chain or branched, in each case optionally fluorinated, alkyl, alkoxy, alkylcarbonyl, alkoxycarbonyl, alkylcarbonyloxy or alkoxycarbonyloxy having up to 12 C atoms,
- R$^0$, R$^{00}$ each, independently of one another, denote H, F or straight-chain or branched alkyl having 1 to 12 C atoms, in which one or more H atoms may be replaced by F,
- M denotes —O—, —S—, —CH$_2$—, —CHY$^1$— or —CY$^1$Y$^2$—, and
- Y$^1$ and Y$^2$ each, independently of one another, have one of the meanings indicated above for R$^0$ or denote Cl or CN.

18. A process for preparing an LC mixture according to claim 17, comprising mixing at least one mesogenic or liquid crystalline compound with at least one self assembling photoalignment compound of formula S and at least one polymerisable compound of formula P.

19. A liquid crystal display, comprising an LC mixture according to claim 17.

20. The liquid crystal display according to claim 19, which is an IPS or FFS display.

* * * * *